United States Patent [19]

Moy et al.

[11] Patent Number: 4,928,245

[45] Date of Patent: May 22, 1990

[54] AUTOMATED CARTRIDGE SYSTEM

[75] Inventors: Michael E. Moy, Lafayette; Kelly J. Beavers, Boulder; Stuart W. Bray, Louisville; Frank A. Goodknight, Boulder; Paul Kummli, Boulder; Eugene Kutasy, Boulder; Raymond L. Lucchesi; Frederick G. Munro, both of Broomfield; Richard G. Sellke, Denver; Thomas J. Studebaker, Boulder, all of Colo.

[73] Assignee: Storage Technology Corporation, Louisville, Colo.

[21] Appl. No.: 398,280

[22] Filed: Aug. 24, 1989

Related U.S. Application Data

[62] Division of Ser. No. 7,047, Jan. 27, 1987, Pat. No. 4,864,511.

[51] Int. Cl.⁵ .................. G11B 15/00; G11B 23/00
[52] U.S. Cl. ..................... 364/513; 364/478; 369/39; 360/71; 360/92; 242/180
[58] Field of Search .............. 364/468, 478, 513; 369/39; 242/180; 360/71, 92

[56] References Cited

U.S. PATENT DOCUMENTS

| | | | |
|---|---|---|---|
| 3,812,537 | 5/1974 | Grae et al. | 242/180 |
| 3,831,197 | 8/1974 | Beach et al. | 360/71 |
| 3,920,195 | 11/1975 | Sills et al. | 242/180 |
| 3,938,190 | 2/1976 | Semmlow et al. | 360/92 |
| 4,271,440 | 6/1981 | Jenkins et al. | 360/92 |
| 4,273,342 | 6/1981 | Gilson et al. | 369/39 |
| 4,519,055 | 5/1985 | Gilson | 369/39 |
| 4,527,262 | 7/1985 | Manto | 369/39 |
| 4,607,354 | 8/1986 | Ishibashi et al. | 369/39 |
| 4,608,679 | 8/1986 | Rudy et al. | 369/39 |
| 4,654,727 | 3/1987 | Blum et al. | 360/71 |

FOREIGN PATENT DOCUMENTS

| | | | |
|---|---|---|---|
| 700213 | 12/1964 | Canada | 360/92 |
| 170953 | 8/1986 | Japan | 360/92 |
| 1499320 | 2/1978 | United Kingdom | 360/92 |

OTHER PUBLICATIONS

IBM Technical Disclosure Bulletin; vol. 16, No. 10; Mar. 1984; Tape Library Apparatus; R. L. Schaaf.

*Primary Examiner*—Allen MacDonald
*Attorney, Agent, or Firm*—Dorr, Carson, Sloan & Peterson

[57] ABSTRACT

A storage and retrieval subsystem in a data processing system includes a plurality or magnetic tape cartridges, a host computer, and a library storage module storing the plurality of magnetic tape cartridges in substantially upright positions. The library storage module includes a first cylindrical array of storage cells centered about a vertical axis, a second cylindrical array concentrically arranged about the first array, and a library tape unit including a plurality of tape drives, each of the tape drives being adapted to receive one of the magnetic tape cartridges in a substantially horizontal transducing position. A robot within the library storage module is used to transfer selected ones of the magnetic tape cartridges between their substantially upright positions and the substantially horizontal transducing positions at a selected tape drive. A first controller outboard the channel communicating with the host computer is adapted to receive commands from the host computer for interfacing between the host computer and the library storage module, and a second controller inboard of the channel is adapted to receive commands from the outboard controller for interfacing between the outboard controller and the robot.

15 Claims, 56 Drawing Sheets

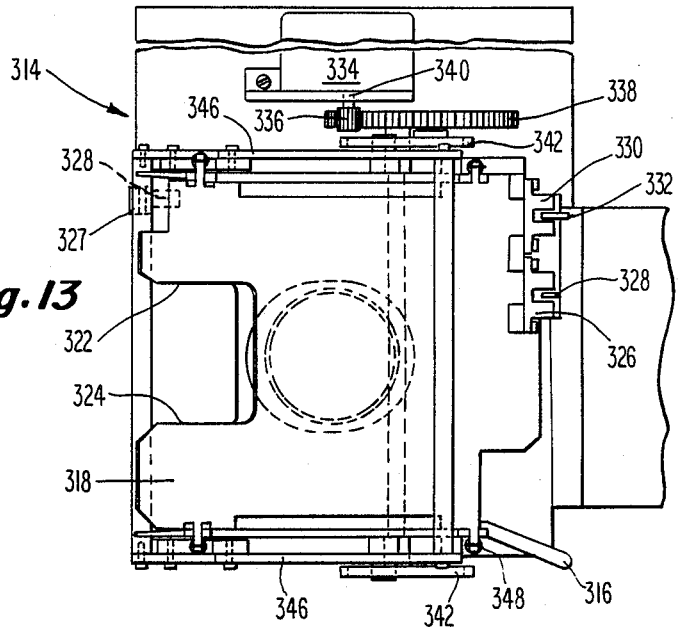
_Fig. 13_
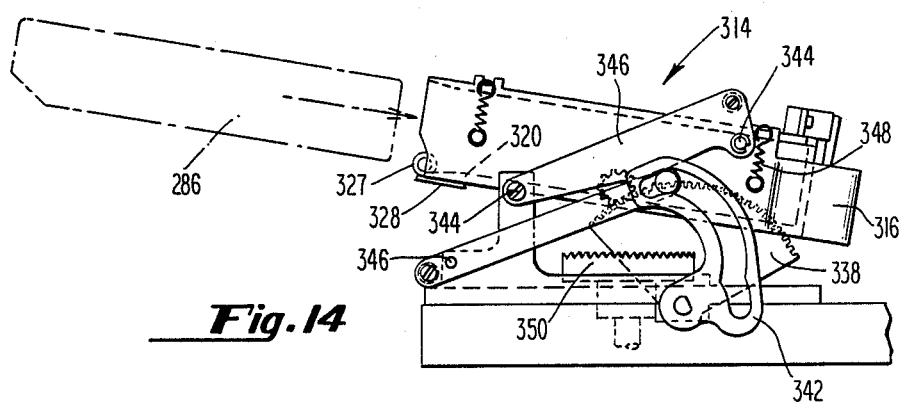
_Fig. 14_
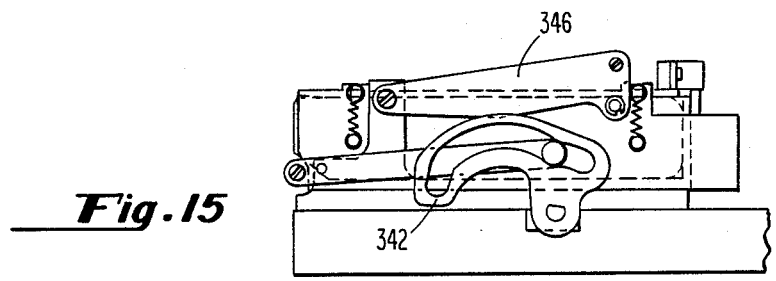
_Fig. 15_

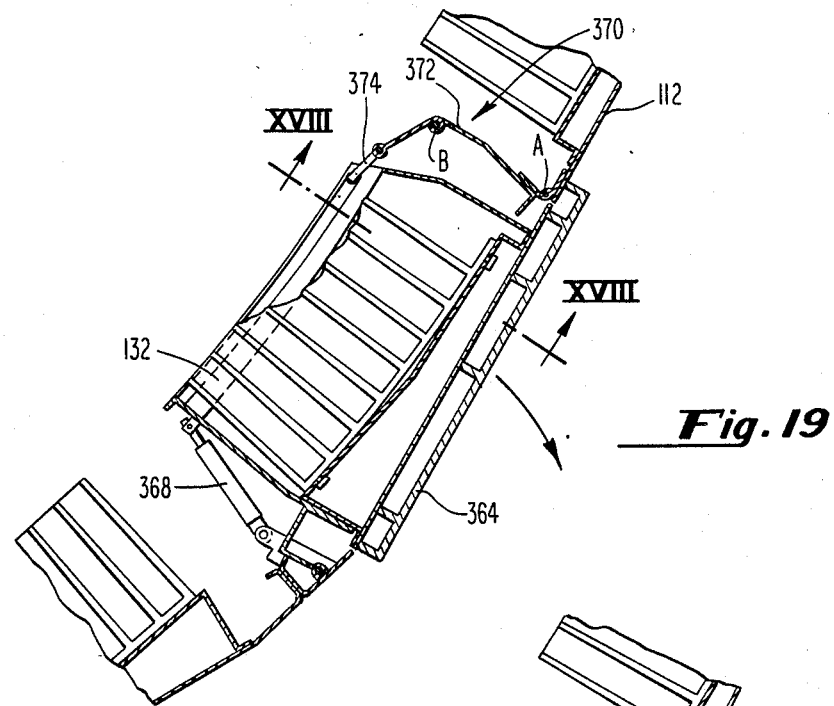
*Fig. 19*
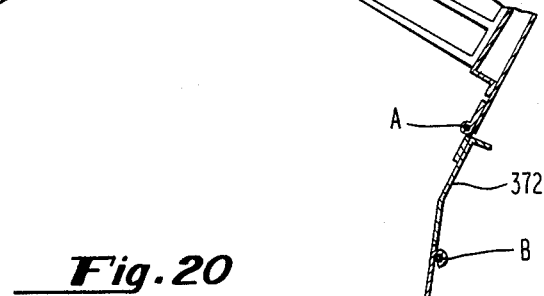
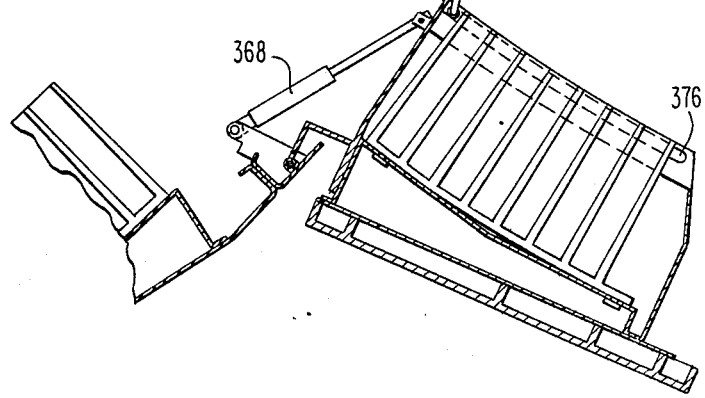
*Fig. 20*

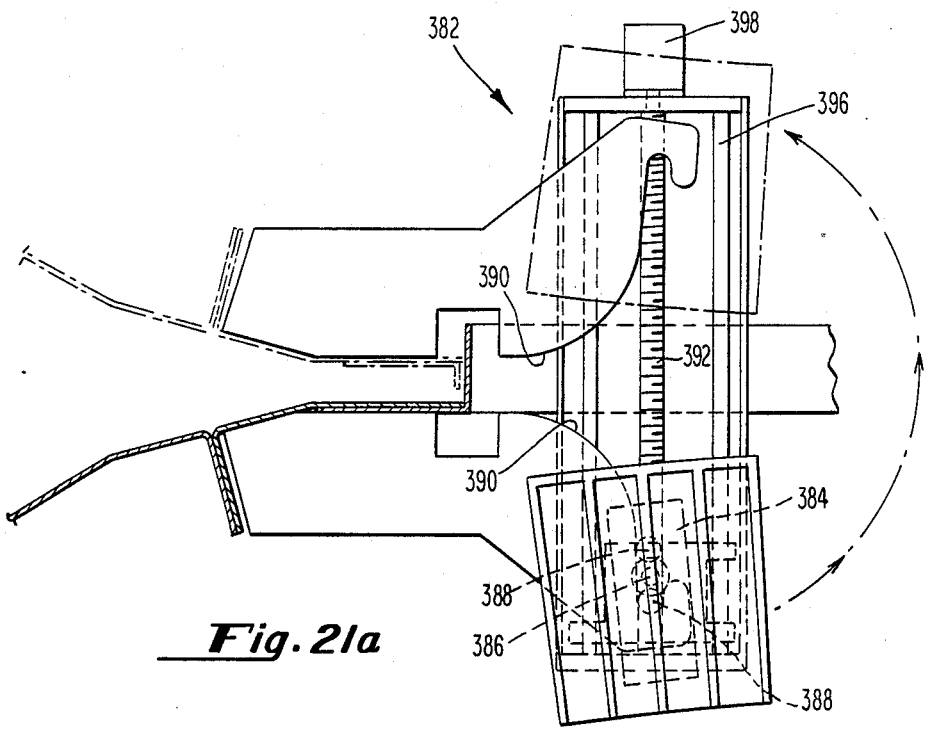
_Fig. 21a_
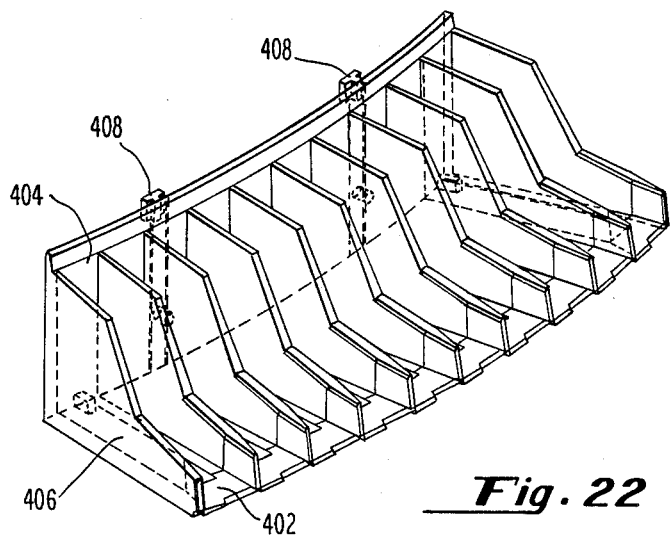
_Fig. 22_

ARRAY FLIP

Fig. 26a

| ADDRS | TYPE | SIZE | REGISTER DESCRIPTION |
|---|---|---|---|
| FF01 | R/W | B | LMU BUS CONTROL |
| FF02 | RO | B/W | LMU BUS STATUS |
| FF05 | R/W | B | INFO IN / INFO OUT |
| FF07 | R/W | B | FIFO IN / FIFO OUT |
| FF09 | R/W | B | MODULE ADDRESS IN / MODULE ADDRESS OUT |
| FF0B | NO | | SPARE |
| FF0C | R/W | B/W | IMP RESET |
| FF0F | R/W | B | LMU RESET |
| FF11 | R/W | B | LED'S |
| FF13 | RO | B | PE SOURCE |
| FF15 | R/W | B | MARGIN CONTROL REGISTER |
| FF17 | NO | | SPARE |
| FF18 | R/W | B/W | FRU CHIP SELECT IPM'S |
| FF1B | R/W | B | FRU ID NVRAM CONTROL AND CHIP SELECTS |
| FF1D | RO | B | MISC READ |
| FF1F | R/W | B | MISC CONTROL |
| FF21 | R/W | B | FLOPPY DISC INTERFACE CONTROL |
| FF23 | RO | B | FLOPPY DISC INTERFACE STATUS |
| FF25 | R/W | B | FLOPPY DISC INTERFACE INPUT / OUTPUT FIFO'S |
| FF27 | NO | | SPARE |
| FF29 | R/W | B | RESET/ACTIVATE ALARM |
| FF2b | WO | B | ENABLE VECTORED INTERRUPTS (IN HARDWARE) |
| FF2C | WO | LW | DISABLE VECTORED INTERRUPTS (IN HARDWARE) |
| FF2F | WO | | RESERVED (PART OF FF2D LONG WORD) |

| ADRS | TYPE | SIZE | REGISTER DESCRIPTION |
|---|---|---|---|
| FF3x | NO | | SPARE |
| FF41 | R/W | B | NMI-A INTERRUPT CONTROLLER DATA |
| FF43 | R/W | B | NMI-A INTERRUPT CONTROLLER CONTROL |
| FF45 | R/W | B | VI-B INTERRUPT CONTROLLER DATA |
| FF47 | R/W | B | VI-B INTERRUPT CONTROLLER CONTROL |
| FF49 | R/W | B | VI-C INTERRUPT CONTROLLER DATA |
| FF4B | R/W | B | VI-C INTERRUPT CONTROLLER CONTROL |
| FF4D | NO | | SPARE |
| FF4F | NO | | SPARE |
| FF51 | R/W | | COUNTER 0 |
| FF53 | R/W | | COUNTER 1 |
| FF55 | R/W | | FDI SECTOR LENGTH (COUNTER @) |
| FF57 | WO | B | CONTROL REGISTER (8254) |
| FF59-FF5F | NO | | SPARES |
| FF61 | RO | B | FDC STATUS |
| FF63 | R/W | B | FDC DATA |
| FF65-FF6f | NO | | SPARES |
| FF70 | R/W | B/W | PAGE REGISTER |
| FF73-FF7F | NO | | SPARES |
| FF81-FFFF | | | PIM REGISTERS (REFER TO PIM CARD DESIGN REVIEW) |

*Fig. 26b*

| | REGISTER NAME (CPM REGISTERS) | READ/WRITE | REGISTER | RESET |
|---|---|---|---|---|
| 1 | PHYSICAL ADDRESS & ERROR | READ | 00000000 | NO |
| 2 | IPM STATUS | READ | 00000001 | YES |
| 3 | IPM BUS INFORMATION IN | READ | 00000010 | NO |
| 4 | STI READ DATA | READ | 00000011 | NO |
| 5 | 3270 RECEIVER DATA | READ | 00000100 | NO |
| 6 | 3270 EXTERNAL STATUS | READ | 00000101 | NO |
| 7 | FIFO IN REGISTER | READ | 00000110 | NO |
| 8 | IPM CONTROL | WRITE | 00010000 | YES |
| 9 | IPM ENABLE | WRITE | 00010000 | YES |
| 10 | LMU BUS INFORMATION OUT | WRITE | 00010010 | YES |
| 11 | SCREEN MEMORY PAGE | WRITE | 00010011 | NO |
| 12 | STI ADDRESS | WRITE | 00010100 | YES |
| 13 | STI WRITE DATA | WRITE | 00010101 | YES |
| 14 | STI CONTROL | WRITE | 00010110 | YES |
| 15 | FIFO OUT REGISTER | WRITE | 00010111 | NO |
| 16 | C3270 TRANSMITTER DATA | WRITE | 00011000 | YES |
| 17 | 3270 CONTROL | WRITE | 00011001 | NO |
| 18 | TRACE REGISTER | WRITE | 00011010 | YES |
| 19 | RESET PAR ERR PSEUDO REG | WRITE | 0001110 | --- |
| 20 | RST BUS STAT PSEUDO REG | WRITE | 00011101 | --- |
| 21 | TEST 1 PSEUDO REG | WRITE | 00011110 | --- |
| 22 | TEST 2 PSEUDO REG | WRITE | 00011111 | --- |

*Fig. 28*

| PRIORITY | INTERRUPT |
|---|---|
| 1 (HIGH) | 3270 RECEIVER ERROR |
| 2 | 3270 PARITY ERROR |
| 3 | TIMER A |
| 4 | USART RECEIVE BUFFER FULL |
| 5 | USART RECEIVE ERROR |
| 6 | USART TRANSMIT BUFFER EMPTY |
| 7 | USART TRANSMIT ERROR |
| 8 | TIMER B |
| 9 | LMU BUS PARITY ERROR |
| 10 | LMU BUS NACK |
| 11 | TIMER C |
| 12 | TIMER D |
| 13 | INPUT BUFFER FULL |
| 14 | BUS IN PARITY ERROR |
| 15 | FIFO IN PARITY ERROR |
| 16 (LOW) | NOT USED |

*Fig. 29*

| REG | MSB 0 | 1 | 2 | 3 | 4 | 5 | 6 | LSB 7 |
|---|---|---|---|---|---|---|---|---|
| IPM PHYS ADRS REG | PA3 | PA2 | PA1 | PA0 | NOT USED | NACK | BUS IN PE | FIFO IN PE |

| REG | MSB 0 | 1 | 2 | 3 | 4 | 5 | 6 | LSB 7 |
|---|---|---|---|---|---|---|---|---|
| IPM STAT REG | MOD BUSY | 8X310 STACK FULL | FIFO OUT FULL | FIFO IN FULL | FIFO OUT EMPTY | FIFO IN EMPTY | IN BUS FULL | OUT BUS FULL |

| REG | MSB 0 | 1 | 2 | 3 | 4 | 5 | 6 | LSB 7 |
|---|---|---|---|---|---|---|---|---|
| 3270 EXT STAT REG | NOT USED | 3270 EXT PE | 3270 DATA AVAIL | 3270 XMIT ACTIVE | 3270 XMIT REG FULL | 3270 RCV ERROR | 3270 RCV ACTIVE | 3270 COMD |

| REG | MSB 0 | 1 | 2 | 3 | 4 | 5 | 6 | LSB 7 |
|---|---|---|---|---|---|---|---|---|
| IPM CNTL REG | DATA XFER | IPM REQ | 3270 ENAB/ -WRAP | FIFO WRAP | IPM REQ WRAP | 8X310 INTRPT ENABLE | FORCE BAD PARITY | FIFO RESET |

| REG | MSB 0 | 1 | 2 | 3 | 4 | 5 | 6 | LSB 7 |
|---|---|---|---|---|---|---|---|---|
| IPM ENAB REG | INDIC 3 | INDIC 2 | INDIC 1 | INDIC 0 | NOT USED | NOT USED | ENAB LMU BUS | ENAB AUX BUS |

|   | MSB | | | | | | | LSB |
|---|---|---|---|---|---|---|---|---|
| PAGE | 0 | 1 | 2 | 3 | 4 | 5 | 6 | 7 |
| 0  | X | X | X | X | 0 | 0 | 0 | 0 |
| 1  | X | X | X | X | 0 | 0 | 0 | 1 |
| 2  | X | X | X | X | 0 | 0 | 1 | 0 |
| 3  | X | X | X | X | 0 | 0 | 1 | 1 |
| 4  | X | X | X | X | 0 | 1 | 0 | 0 |
| 5  | X | X | X | X | 0 | 1 | 0 | 1 |
| 6  | X | X | X | X | 0 | 1 | 1 | 0 |
| 7  | X | X | X | X | 0 | 1 | 1 | 1 |
| 8  | X | X | X | X | 1 | 0 | 0 | 0 |
| 9  | X | X | X | X | 1 | 0 | 0 | 1 |
| 10 | X | X | X | X | 1 | 0 | 1 | 0 |
| 11 | X | X | X | X | 1 | 0 | 1 | 1 |
| 12 | X | X | X | X | 1 | 1 | 0 | 0 |
| 13 | X | X | X | X | 1 | 1 | 0 | 1 |
| 14 | X | X | X | X | 1 | 1 | 1 | 0 |
| 15 | X | X | X | X | 1 | 1 | 1 | 1 |

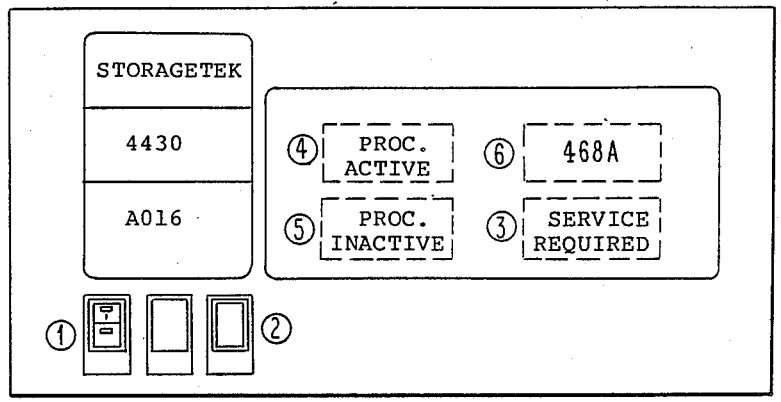

| ITEM | LABEL | TYPE | FUNCTION |
|------|-------|------|----------|
| 1 | DC POWER | ROCKER SWITCH/ INDICATOR | SWITCH - APPLIES DC POWER TO LMU AND INITIATES CONTROLLED POWER DOWN INDICATOR - ON WHEN +5Vdc POWER IS APPLIED TO LMU. OFF WHEN DC POWER IS NOT APPLIED TO LMU |
| 2 | EMERGENCY POWER | MOMENTARY SWITCH | REMOVES ALL POWER IMMEDIATELY FROM LMU AC POWER SUPPLY [2] |
| 3 | SERVICE REQUIRED | INDICATOR | ON WHEN FE ATTENTION IS NEEDED |
| 4 | PROCESSOR ACTIVE | INDICATOR | INDICATES THAT PROCESSOR IS CYCLING |
| 5 | PROCESSOR INACTIVE | INDICATOR | INDICATES THAT PROCESSOR IS NOT CYCLING |
| 6 | NA | ALPHA- NUMERIC DISPLAY | FOUR DIGITS DISPLAY ERROR CODES AND LMU MODES |

[1] ITEM NUMBER CORRESPONDS TO CALLOUT IN FIGURE 2-6
[2] CAN BE RESET ONLY BE FE

Fig. 33

| BYTE | MOUNT REQUEST |
|---|---|
| 0 - 9 | TRANSACTION HEADER |
| 10 | REQUEST CODE = B |
| 11 | LABEL MODIFIER<br>   1 = VERIFY VOLSER LABEL<br>   2 = VERIFY UNLABELLED<br>   3 = BYPASS LABEL<br>   4 = RECOVERY CARTRIDGE NR. SPECIFIED |
| 12 | SOURCE MODIFIER<br>   1 = NORMAL<br>   2 = IN TRANSIT |
| 13 - 18 | SOURCE VOLSER |
| 19 - 20 | SOURCE LSM |
| 21 | SOURCE CELL TYPE<br>   1 = NORMAL CELL<br>   2 = CAP CELL |
| 22 - 27 | SOURCE CELL ADDRESS |
| 28 - 29 | DESTINATION LSM |
| 30 - 31 | DESTINATION DRIVE |

*Fig. 36a*

| BYTE | MOUNT RESPONSE |
|---|---|
| 0 - 9 | TRANSACTION HEADER |
| 10 | RESPONSE CODE = B |
| 11 - 12 | LSM PASSES REQUIRED |

*Fig. 36b*

| BYTE | DISMOUNT REQUEST |
|---|---|
| 0 - 9 | TRANSACTION HEADER |
| 10 | REQUEST CODE = C |
| 11 | LABEL MODIFIER<br>    1 = VERIFY VOLSER LABEL<br>    2 = VERIFY UNLABELLED<br>    3 = BYPASS LABEL<br>    4 = RECOVERY CARTRIDGE NR. SPECIFIED |
| 12 | SOURCE MODIFIER<br>    1 = NORMAL<br>    2 = IN TRANSIT |
| 13 - 18 | DESTINATION VOLSER |
| 19 - 20 | DESTINATION LSM |
| 21 | DESTINATION CELL TYPE<br>    1 = NORMAL CELL<br>    2 = CAP CELL |
| 22 - 27 | DESTINATION CELL ADDRESS |
| 28 - 29 | SOURCE LSM |
| 30 - 31 | SOURCE DRIVE |

*Fig. 37a*

| BYTE | DISMOUNT RESPONSE |
|---|---|
| 0 - 9 | TRANSACTION HEADER |
| 10 | RESPONSE CODE = C |
| 11 - 12 | LSM PASSES REQUIRED |

*Fig. 37b*

| BYTE | SWAP REQUEST |
|---|---|
| 0 - 9 | TRANSACTION HEADER |
| 10 | REQUEST CODE = D |
| 11 | LABEL MODIFIER<br>   1 = VERIFY VOLSER LABEL<br>   2 = VERIFY UNLABELLED<br>   3 = BYPASS LABEL<br>   4 = RECOVERY CARTRIDGE NR. SPECIFIED |
| 12 | SOURCE MODIFIER<br>   1 = NORMAL<br>   2 = IN TRANSIT |
| 13 - 18 | SOURCE VOLSER |
| 19 - 20 | SOURCE LSM |
| 21 - 22 | SOURCE DRIVE |
| 23 - 24 | DESTINATION LSM |
| 25 - 26 | DESTINATION DRIVE |

*Fig. 38a*

| BYTE | SWAP RESPONSE |
|---|---|
| 0 - 9 | TRANSACTION HEADER |
| 10 - | RESPONSE CODE = D |
| 11 - 12 | LSM PASSES REQUIRED |

*Fig. 38b*

| BYTE | MOVE REQUEST |
|---|---|
| 0 - 9 | TRANSACTION HEADER |
| 10 | REQUEST CODE = E |
| 11 | LABEL MODIFIER<br>   1 = VERIFY VOLSER LABEL<br>   2 = VERIFY UNLABELLED<br>   3 = BYPASS LABEL<br>   4 = RECOVERY CARTRIDGE NR. SPECIFIED |
| 12 | SOURCE MODIFIER<br>   1 = NORMAL<br>   2 = IN TRANSMIT |
| 13 - 18 | SOURCE VOLSER |
| 19 - 20 | SOURCE LSM |
| 21 | SOURCE CELL TYPE<br>   1 = NORMAL CELL<br>   2 = CAP CELL |
| 22 - 27 | SOURCE CELL ADDRESS |
| 28 - 29 | DESTINATION LSM |
| 30 | DESTINATION CELL TYPE<br>   1 = NORMAL CELL<br>   2 = CAP CELL |
| 31-36 | DESTINATION CELL ADDRESS |

*Fig. 39a*

| BYTE | MOVE RESPONSE |
|---|---|
| 0 - 9 | TRANSACTION HEADER |
| 10 | RESPONSE CODE = E |
| 11 - 12 | LSM PASSES REQUIRED |

*Fig. 39b*

| BYTE | CATALOG REQUEST |
|---|---|
| 0 - 9 | TRANSACTION HEADER |
| 10 | REQUEST CODE = K |
| 11 | CATALOG OPTION<br>1 = CATALOG CELLS - FULL PANELS<br>2 = CATALOG CELLS - SUBPANELS<br>3 = CATALOG CAP<br>4 = CATALOG DRIVES |
| 12 - 13 | LSM |
| 14 - 19 | BEGINNING ADDRESS |
| 20 - 25 | ENDING ADDRESS<br><br>BEGINNING AND ENDING ADDRESS FORMATS:<br><br>FOR FULL PANELS<br>   PANEL (2 BYTES)<br>   (ENDING PANEL IS '0')<br>   ROW   (2 BYTES)<br>   COLUMN (2 BYTES)<br><br>FOR SUBPANELS<br>   PANEL (2 BYTES)<br>   (ENDING PANEL IS '0')<br>   ROW (2 BYTES)<br>   COLUMN (2 BYTES)<br><br>FOR CAP<br>   '0' (2 BYTES)<br>   ROW (2 BYTES)<br>   COLUMN (2 BYTES)<br><br>FOR DRIVES<br>   '0' (2 BYTES)<br>   DRIVE (2 BYTES) |

*Fig. 41a*

| BYTE # | CATALOG RESPONSE |
|---|---|
| 0-9 | TRANSACTION HEADER |
| 10 | RESPONSE CODE = K |
| 11-12 | RESPONSE COUNT (0-n) |
| 13-18 | STARTING ADDRESS<br>   FOR THIS RESPONSE |
| 19 | POSITION STATUS<br>   1 = READABLE VOLSER<br>   2 = UNREADABLE VOLSER<br>   3 = NO CARTRIDGE PRESENT<br>   4 = NO CELL AT THIS ADDRESS<br>   5 = NO DRIVE AT THIS ADDR.<br>   6 = CART. NOT ACC IN DRIVE |
| 20-25 | VOLSER CHARACTERS<br><br>POSITION STATUS AND VOLSER N - 1 TIMES<br>WHERE N = NUMBER OF POSITIONS |
| 17+(Nx7) | END OF LAST VOLSER |

*Fig. 41b*

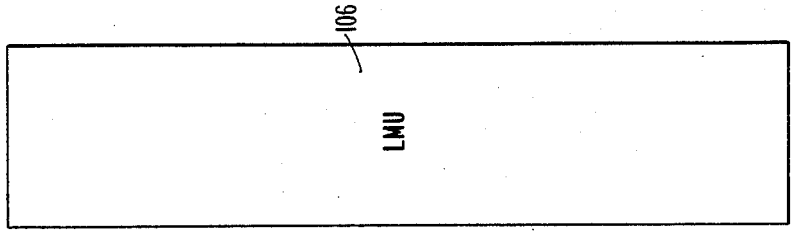

TO LSM:

REQUEST LSM STATE COMMAND
    INFORMATION DESIRED SPECIFIER

FROM LSM:

REQUEST LSM STATE RESPONSE
COMMAND SPECIFIERS OF CURRENT ACTIVE COMMANDS
INIT/POSITION/MOTION HEALTH STATUS OF ARM
INIT/POSITION/MOTION/SELECT/EMPTY STATUS OF HANDS
INIT/POSITION/MOTION/SELECT/EMPTY STATUS OF FINGERS
INIT/POSITION/MOTION/SELECTION HEALTH STATUS OF ROLL
INIT/POSITION/MOTION/SELECTION HEALTH STATUS OF WRIST
POSITION/MOTION HEALTH STATUS OF PASS THRU PORTS
CAMERA SELECTION STATUS
ON/OFF HEALTH STATUS OF LAMPS
OPEN/CLOSED STATUS OF DOOR
DOOR HAS BEEN OPENED INDICATOR
LSM MODE
LOCATION/INSTALLED/INITIALIZED/CLEAN STATUS OF DRIVE
OPEN/CLOSED/CANISTER STATUS OF THE CAP WRAP COUNT

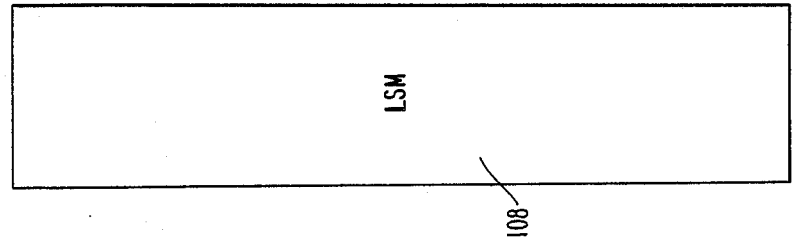

*Fig. 46*

QUEUE NAMES

*Fig. 49*

| | |
|---|---|
| DrqQ | - DIAGNOSTIC REQUEST QUEUE |
| DCmdQ | - DIAGNOSTIC COMMAND QUEUE |
| HIWrQ | - HOST INTERFACE WRITE QUEUE |
| HIRdQ | - HOST INTERFACE READ QUEUE |
| HRsQ | - HOST RESPONSE QUEUE |
| HMsQ | - HOST MESSAGE QUEUE |
| HARqQ | - HOST PATH ALLOC REQUEST QUEUE |
| HAIQ | - HOST ALLOCATION INFORMATION QUEUE |
| LAIQ | - LSM ALLOCATION INFORMATION QUEUE |
| LARqQ | - LSM PATH ALLOC REQUEST QUEUE |
| LCmdQ | - LSM COMMAND QUEUE |
| LMRqQ | - LSM MESSAGE REQUEST QUEUE |
| lan tbuf | - LAN TRANSMIT BUFFERS |
| lan rbufs | - LAN RECEIVE BUFFERS |

MAILBOX NAMES

| | |
|---|---|
| DRs | - DIAGNOSTIC RESPONSE MAILBOX |
| DLRs | - DIAGNOSTIC LSM RESPONSE MAILBOX |
| HRq | - HOST REQUEST MAILBOX |
| HMRp | - HOST ALLOCATION RESPONSE MAILBOX |
| LARs | - LSM ALLOCATION RESPONSE MAILBOX |
| LRs | - LSM RESPONSE MAILBOX |
| LMs | - LSM MESSAGE MAILBOX |

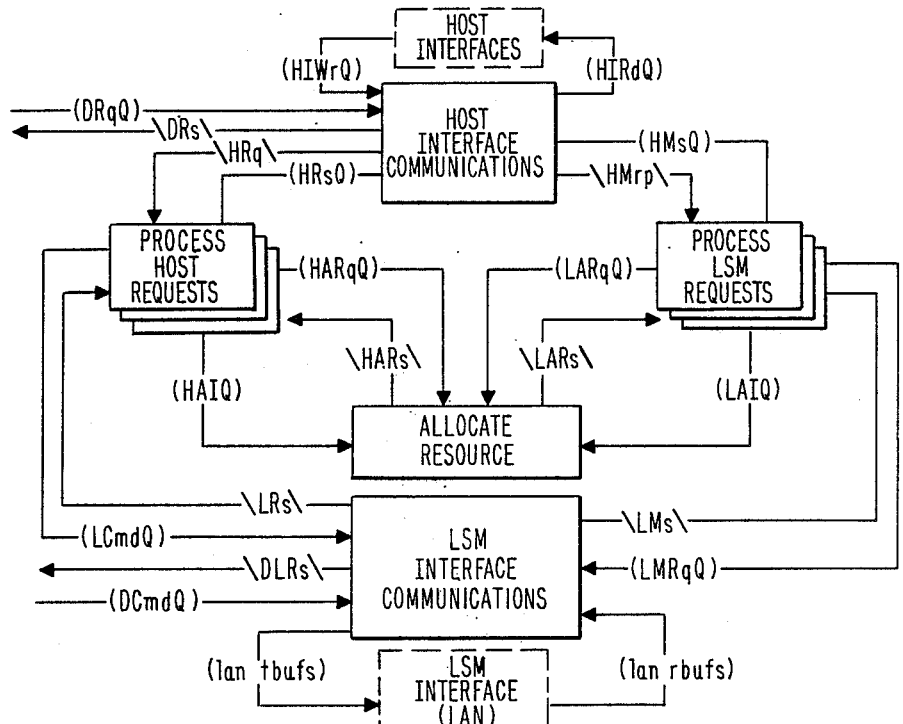

NOTE: ( ) = QUEUE NAME \ \ = MAILBOX NAME

| SYMBOL | USAGE | MEANING |
|---|---|---|
|  | a b | 'b' FOLLOWS 'a' SEQUENTIALLY |
| = | a = b | 'a' IS EQUIVALENT TO 'b' |
| => | a => b | 'a' IS TRANSFORMED INTO 'b' |
| ( ) | (q) | 'q' IS A QUEUE |
| \ \ | \m\ | 'a' IS A MAILBOX |
| -> | a ->(r)<br>a ->\r\<br>(r) -> a<br>\r\ -> a | 'a' IS POSTED TO QUEUE 'r' BY THE TASK<br>'a' IS POSTED TO MAILBOX 'r' BY THE TASK<br>TASK PENDS ON QUEUE 'r' WAITING FOR 'a'<br>TASK PENDS ON MAILBOX 'r' WAITING FOR 'a' |
| * | a* | 0 OR MORE OCCURRENCES OF 'a' |
| + | a+ | 1 OR MORE OCCURRENCES OF 'a' |
| [ ] | a b<br>[ ab ] | 'a' OR 'b' BUT NOT BOTH<br>'a' OR 'b' ARE LOGICALLY GROUPED FOR USE WITH OPERATORS (EG., *) |
| < / > | <a / b> | 'a' AND 'b' ARE TEMPORALLY INDEPENDENT; SYNCHRONIZATION OCCURS AT '<' and '>' |
| /* */ | /* c */ | 'c' IS A COMMENT |

```
 (1)                                 /*  MULTIPLE LSM DISMOUNT*/
 (2)    (HRqQ) - > Dismount = >
 (3)                                 REWIND UNLOAD DRIVE  -> (LRqQ)
 (4)                                 PATH ALLOC REQUEST   -> (PARqQ)
 (5)                <\LRs\       -> DRIVE UNLOADED
 (6)                /
 (7)                \PAR\        -> PATH ALLOCATED                   >
 (8)                                 MOVE GET (DRIVE)     -> (LrQq)
 (9)                \LRs\        -> MOVE GET COMPLETE
(10)                                 TAPE DISMOUNTED      -> (HRsQ)
(11)                                 MOVE PUT (SLOT)      -> (LRqQ)
(12)                \LRs\        -> MOVE PUT COMPLETE
(13)                [                MOVE GET (SLOT)      -> (LRqQ)
(14)                \LRs\        -> MOVE GET COMPLETE
(15)                                 MOVE PUT (SLOT)      -> (LRqQ)
(16)                \LRs\        -> MOVE PUT COMPLETE                ]*
(17)                                 MOVE GET (SLOT)      -> (LRqQ)
(18)                \LRs\        -> MOVE GET COMPLETE
(19)                                 MOVE PUT (SLOT)      -> (LRqQ)
(20)                \LRs\        -> MOVE PUT COMPLETE
(21)                                 CELL FULL            -> (HRsQ)
```

*Fig. 50*

TASK MANAGEMENT

TASK CREATE
    TASK DELETE
    ENABLE TASK RESCHEDULING
    DISABLE TASK RESCHEDULING

MEMORY ALLOCATION

GET MEMORY BLOCK
    RELEASE MEMORY BLOCK
    CREATE MEMORY PARTITION

COMMUNICATION AND SYNCHRONIZATION

POST MESSAGE
    PEND FOR MESSAGE

ACCEPT MESSAGE

POST MESSAGE TO QUEUE
    PEND FOR MESSAGE FROM QUEUE
    ACCEPT MESSAGE FROM QUEUE
    CREATE MESSAGE QUEUE

INTERRUPT SERVICING

POST FROM INTERRUPT HANDLER
    EXIT FROM INTERRUPT HANDLER
    ANNOUNCE TIMER INTERRUPT
    POST TO QUEUE FROM INTERRUPT HANDLER

*Fig. 51*

LSM SOFTWARE ARCHITECTURE

```
struct lan_pkg
 {
   int        part_id ;
   int        blk_len ;
   struct lan_comm l_comm;
 } ;
```

```
struct lan_comm
 {
   int     dest_adr[ 3 ] ;
   int     src_addr[ 3 ] ;
   int     msg_len ;
   short   pakt_typ ;
   short   lan_rsrd ;
   int     seq_num ;
   short   lan_rsrv[ 2 ] ;
   short   msg_data[46] ;
 } ;
``` which looks like

```
struct cmd_mot
 {
   struct cmd_gen gen ;
   struct lsm-addr mo_adr ;
   char   volser[ VLSRCHAR ] ;
 } ;
```

AUTOMATED CARTRIDGE SYSTEM

This is a divisional of application Ser. No. 007,047, filed Jan. 27, 1987, now U.S. Pat. No. 4,864,511.

BACKGROUND OF THE INVENTION

This invention relates generally to data storage and retrieval, and more particularly to an improved method and apparatus for storing and retrieving large amounts of data contained in magnetic tape cartridges.

There exists a need in the marketplace, since the advent of computers such as the IBM 360/370, to store large amounts of data (e.g., in excess of 1 trillion bits) while consuming as little floor space as possible, and at the same time making the data readily available. Basically, two choices for data storage have existed: (1) online, usually direct access storage devices (DASD), which provides fast initial service time through sequential or direct processing; or (2) offline, usually manual 9- or 18-track magnetic tapes, which provides a low unit cost per unit storage. There exists a need, however, for many new applications were costly DASD are not justified but where manual tape systems are considered too slow or too inconsistent.

One early approach, used in the IBM 3850 Mass Storage System, consists of an array of data cartridges about 1.9 inches in diameter and 3.5 inches long, with a capacity of 50 million characters each. Each cartridge contains magnetic tape 2.7 inches wide and 64 feet long, on which data is organized in cylinders analogous to those of a disk file and can be transferred to the disk file one cylinder at a time. Up to 4700 cartridges can be stored in hexagonal compartments in a honeycomb-like apparatus that includes mechanisms for fetching cartridges from the compartments, for the reading and writing of data on them, and for the replacement of cartridges in the compartments. The fetching and replacing mechanism, however, is adapted to store and retrieve the cartridges from a linear rack. Accordingly, if a desired cartridge is located remotely from the retrieving mechanism at one end of the rack, the retrieving mechanism would be required to move to the end, retrieve the cartridge, and load it upon a drive. It is, therefore, apparent that if a subsequently selected cartridge is located at the other end of the rack, much wasted time would be utilized in the movement of the retriever mechanism between opposite ends of the rack.

Various other tape library systems, have been devised for the storage and handling of magnetic tape reels. More sophisticated systems which have been used in the past, commonly referred to as automated tape library systems, permit storage and automatic retrieval of data contained on tape reels such as the conventional IBM 3420 tape subsystems. As is well known, such tape subsystems provide a nominal data rate of 1.25 megabytes per second, a recording density of 6250 bytes per inch, and a storage capacity of 165 megabytes on 9-track, ½ inch iron oxide magnetic tape wound about 10½ inch reels. The tape reels, with tape supported by conventional vacuum columns, are loaded upon a drive system including a laminated magnetic head.

One prior art automated tape library system utilized for storing and retrieving data contained on such tape reels is disclosed in U.S. Pat. No. 3,920,195. The apparatus taught therein corresponds generally to the Xytex Corporation XTL tape library which, under the control of an IBM operating system, automatically brings tapes from storage positions on either side of a linear rack, mounts them on tape drives, dismounts them when the job is completed, and returns each reel to storage. Average access time for delivery of a single tape reel to a selected drive in a medium size system (accommodating up to 2.3 trillion bits of storage in 3200 magnetic tape reels), however, is relatively slow. Such access times include selector-positioning mechanism access, reel selection, access to the automatic mounting unit, and the mounting of the reel on the tape drive (i.e., elapsed time from the operating system command to mount a tape to the time that the tape is physically mounted and ready to start the tape drive load cycle).

All reel storage matrices within the linear racks are serviced by the reel selector-positioning mechanism, which is part of the library control unit but which moves through each library storage unit on a connecting rail. The selector-positioning mechanism selects and replaces reels from the library storage units through use of a segment which rotates 180° for the selection and replacement of reels on each side of the linear library storage unit.

When a reel mount command is received by the library control unit, the selector-positioning mechanism is commanded to move to the address of the required reel in the array. After the selector-positioning mechanism reaches the addressed position, the reel is drawn from its storage location and the selector-positioning mechanism is then moved to the automatic reel mounting unit which will service the particular tape drive that the system indicates. When the selector-positioning mechanism reaches that location the reel is deposited in a pre-load position. The automatic reel mounting unit then transports the reel to the tape drive and mounts it.

The automatic reel mounting unit retracts within the storage unit when not in use. There is a protective hood enclosing the drive hub of the tape drive which provides safety and security, and which can be pivoted out of the way by an operator to facilitate cleaning and servicing. Pivoting the hood automatically removes the drive from control of the system and makes it accessible for manual loading.

One particular drawback to the aforedescribed automatic tape library system, however, resides in its linear storage configuration. Like the IBM 3850 Mass Storage System, the system described in U.S. Pat. No. 3,920,195 suffers from certain access inefficiencies in cases where a selected tape reel is located at one end of the library, while the next selected tape reel is stored at the other end. Moreover, while the storage density per unit area of floor space taken up by the system is doubled through use of a two-sided linear rack, large storage systems incorporating more than one library storage unit merely aggravate the problems of linear storage by extending the path through which the selector-positioning mechanism must go to transit from one end of the library to the other.

Nevertheless, the use of standardized magnetic tape reels has been more recently supplanted by small, rectangular cartridges such as those which are used in the IBM 3480 tape subsystem. The rate at which data can be stored in the cartridge's one-half-inch wide chromium dioxide tape, or retrieved from it, is the result of using 18 recording tracks and achieving a linear data recording density of about 38 thousand bytes per inch (approximately six times the density used in typical tape reel drives). Moreover, the four-by-five inch cartridge used in the IBM 3480 tape subsystem is about one-fourth the size of a standard 10.5-inch reel of magnetic tape, yet it stores up to 20% more data, a total of 200 million characters. The tape and cartridge requirements for the system are as defined in the IBM document "Tape and Cartridge Requirements for the IBM 3480 Magnetic Tape Drives", GA 32-0048-0, the contents of which are incorporated herein by reference. Further details are disclosed in U.S. Pat. No. 4,426,047 and U.S. Pat. No. 4,383,660, and in the "Second Draft, Proposed American National Standard, Unrecorded, Magnetic Tape and Cartridge for Information Interchange" (ANSI-X 3 B 5/85-030, Feb. 1985), each of which is incorporated herein by reference.

While the advances provided by the digital servo control and new head technology of the IBM 3480 Magnetic Tape Subsystem permit low acceleration tape motion thereby eliminating the need for vacuum columns, capstans, and reflective markers have improved the level of data reliability as compared to conventional drives, the advantages gained are nearly offset by the disadvantages accruing from the use of book shelf type storage racks such as those described in U.S. Pat. No. 4,600,107. Furthermore, while the now-standardized IBM 3480 magnetic tape cartridges improve such data reliability through reduction of both contaminants and handling damage, the storage and retrieval of such cartridges must for the most part be carried out by human operators. Such human intervention not only degrades the reliability of selection and replacement, but also prolongs the time from which a data request is made and that data is read by loading a specific cartridge in an available tape drive. While recent improvements to systems utilizing the IBM 3480 cartridge which incorporate magazine type automatic loaders have reduced the time that jobs wait for cartridges to be mounted, such systems still require operator assistance and are inflexible as to the mounting order once installed within the magazine. It would, therefore, be desirable to provide a storage and retrieval system for magnetic tape cartridges such as those of the IBM 3480 type which are capable of storing large amounts of data, while consuming as little floor space as possible, and at the same time making the data readily available by minimizing human intervention.

Two such approaches used in the past are disclosed and claimed in U.S. Pat. No. 3,938,190 and U.S. Pat. No. 4,527,262. Unlike each of the above described storage and retrieval systems, the systems shown in U.S. Pat. No. 3,938,190 and U.S. Pat. No. 4,527,262 are both adapted for storing information-bearing units or modules in a polygonal configuration. For example, the storage and retrieval system for magnetic tape cassettes described in U.S. Pat. No. 3,938,190 includes a fixed two-dimensional storage array, a fixed processing or play station for extracting information from the units, and a movable selection mechanism having three degrees of freedom for retrieving individual modules from the storage area, transferring them to the processing area, and then returning them to the storage area after the information contained therein has been extracted. Additionally, the system includes means for automatically sequencing a series of units, as well as a preprocessing station for cuing up individual units for intra-unit accessing.

The information storer and retriever shown in U.S. Pat. No. 4,527,262, on the other hand, includes a plurality of shelves disposed so as to be substantially tangent to a cylinder of reference of a given diameter defining an access corridor which is large enough to accommodate a transport apparatus in the approximate center of the corridor. The transport mechanism includes a carriage that is translatably disposed on a pair of parallel rods to effect X-axis translation of the carriage through the access corridor of the polygonal arrangement, and means for rotating the transport mechanism about the X-axis to select a particular shelf disposed within the polygonal arrangement. Once the appropriate angular position is achieved and the carriage has been translated in the appropriate distance along the X-axis, then the in and out movement or X-axis translation is ready for activation by appropriate means.

Each of the aforedescribed U.S. Pat. No. 3,938,190 and U.S. Pat. No. 4,527,262 effectively stores and retrieves a plurality of information bearing media, but both are limited in the amounts of discrete media which may be contained therein. The substantially circular arrays provided increase the amounts of data which may be stored per unit floor space, but neither system includes the capability for expansion of storage by interconnecting individual storage units, one with the other, to improve data handling efficiency.

SUMMARY OF THE INVENTION

Accordingly, it is a general object of the present invention to provide an improved method and apparatus for storing and retrieving large amounts of information. More specifically, it is an object of the present invention to provide a storage and retrieval subsystem in a data processing system having a host computer and a plurality of tape transports coupled for communication with the host computer, each of the tape transports being adapted for use with magnetic tape cartridges.

Another object of the present invention is to provide an automated cartridge system for storage and retrieval of magnetic tape cartridges used in a data processing system, thereby minimizing the requirements for human intervention.

Still another object of the present invention is to provide an automated cartridge system which stores the cartridges in a first position adapted to prevent damage to the magnetic tape contained therein, and which transfers selected cartridges from their stored position to a second, transducing position upon the tape transports for reading data therefrom or writing data thereto.

Yet another object of the present invention is to provide an automated cartridge system which is capable of communicating with a plurality of host computers.

A further object of the present invention is to provide an automated cartridge system which includes improved robotic means having a plurality of degrees of freedom for rapidly accessing a selected magnetic tape cartridge and loading it within a particular tape transport.

Still a further object of the present invention is to provide an improved robotic means with redundant means for picking and placing individual magnetic tape cartridges.

Yet a further object of the present invention is to provide an automated cartridge system which is accessible for manual loading of magnetic tape cartridges, as well as the transference of a plurality of magnetic tape cartridges between discrete storage modules.

Another object of the present invention is to provide a method of controlling the storage and retrieval of data which optimizes the robotics motion to maximize media handling performance.

Still another object of the present invention is to provide a method of controlling the storage and retrieval of data from magnetic tape cartridges which is capable of interfacing a plurality of host computers with a plurality of storage modules.

Yet another object of the present invention is to provide an automated cartridge system which includes means for self-calibration and self-diagnosis.

A further object of the present invention is to provide a storage cell for containing a magnetic tape cartridge in an automated cartridge system, the storage cell including a unique target which minimizes fine adjustments to the robotic means when used in conjunction with a conventional vision system.

Briefly, these and other objects of the present invention are accomplished by a storage and retrieval subsystem in a data processing system, wherein the subsystem includes a plurality of magnetic tape cartridges, a host computer, and library means for storing the plurality of magnetic tape cartridges in substantially upright positions. The library means according to the invention includes a first cylindrical array of storage cells centered about a vertical axis, a second cylindrical array concentrically arranged about the first array, and a library tape unit including a plurality of tape drives, each of the tape drives being adapted to receive one of the magnetic tape cartridges in a substantially horizontal transducing position. Robotic means within the library means is used to transfer selected ones of the magnetic tape cartridges between their substantially upright positions and the substantially horizontal transducing positions at a selected tape drive. First controller means outboard a channel communicating with the host computer is adapted to receive commands from the host computer for interfacing between the host computer and the library means, and second controller means inboard of the channel is adapted to receive commands from the outboard controller means for interfacing between the outboard controller means and the robotic means.

In accordance with one important aspect of the invention, the robotic means includes a six-motion, servo controlled mechanism for picking a magnetic tape cartridge selected by the host computer, transferring that cartridge to an available tape drive, and loading the cartridge upon the tape drive in a transducing position for writing data thereto or reading data therefrom.

In accordance with another important aspect of the invention, the library means may comprise a plurality of storage modules, each comprising first and second cylindrical arrays, wherein the individual storage modules are connected for transference of magnetic tape cartridges therebetween in order to modularize the library means and thereby provide the capability for add-on storage. The transference means, according to the present invention, includes means for accepting cartridges placed by the robotic means of one storage module in order that they may be picked by the robotic means of another interconnected storage module.

In accordance with still another important aspect of the invention, each storage module includes means for inputting and outputting cartridges by manual means, while maintaining the automated capability of the robotic means. Such input/output means further comprises safety means for preventing access to the interior portion of the storage module while the robotic means are in operation.

Other objects, advantages, and novel features of the present invention will become more apparent from the following detailed description of a preferred embodiment when considered in conjunction with the accompanying drawings wherein:

BRIEF DESCRIPTION OF THE DRAWINGS

FIG. 13 illustrates in plan view a carriage for loading the magnetic tape cartridge in conjunction with the hand and finger assembly shown in FIG. 8;

FIG. 14 illustrates the carriage assembly of FIG. 13 in its unloaded position;

FIG. 15 illustrates the carriage of FIG. 13 in its loaded position;

FIG. 19 illustrates in sectional view the cartridge access port of FIG. 18 taken along the lines XIX—XIX;

FIG. 20 illustrates the cartridge access port of FIG. 19 in its opened position;

FIG. 21a illustrates in detail the pass through shown in FIG. 3;

FIG. 22 illustrates a storage cell for containing magnetic tape cartridges in accordance with the present invention.

FIGS. 26a and 26b illustrate various external registers of the CPM shown in FIG. 24;

FIG. 28 shows external registers used with the interface processor of FIG. 27;

FIG. 29 illustrates interrupts used with the interface processor of FIG. 27;

FIG. 30a–30f illustrate details of the external registers shown in FIG. 27;

FIG. 31 shows a block diagram of a serial time interrupt controller according to the present invention;

FIG. 33 shows an LMU operator's panel;

FIGS. 36a–36d show MOUNT requests and responses with flow chart of ACS actions;

FIGS. 37a and 37b show DISMOUNT requests and responses

FIGS. 38a–38c show SWAP requests and responses with flow chart of ACS actions;

FIGS. 39a–39c show MOVE requests and responses with flow chart of ACS actions;

FIGS. 41a and 41b show CATALOG requests and responses;

FIG. 46 illustrates LSM monitoring communications;

FIG. 49 is a block diagram of LMU functional software;

FIG. 50 illustrates an exemplary process host request task;

FIG. 51 lists system calls used by the control program;

DETAILED DESCRIPTION OF THE INVENTION

Figure 1:
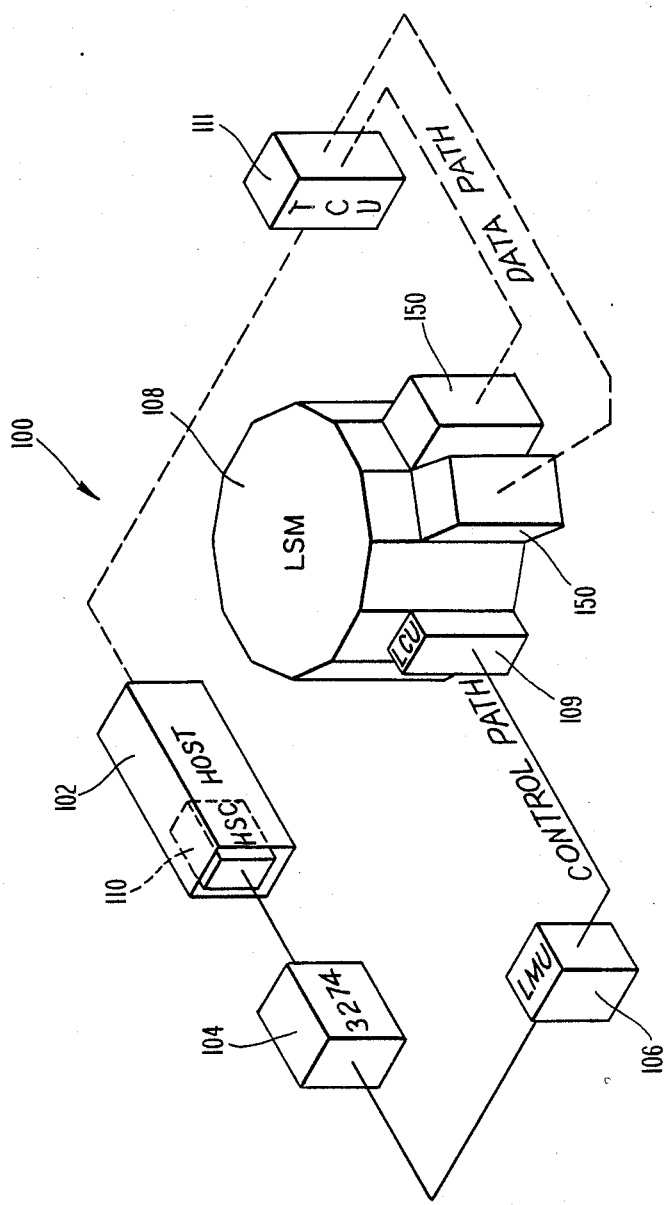
FIG. 1 illustrates an automated cartridge system according to one embodiment of the present invention.
Figure 2:
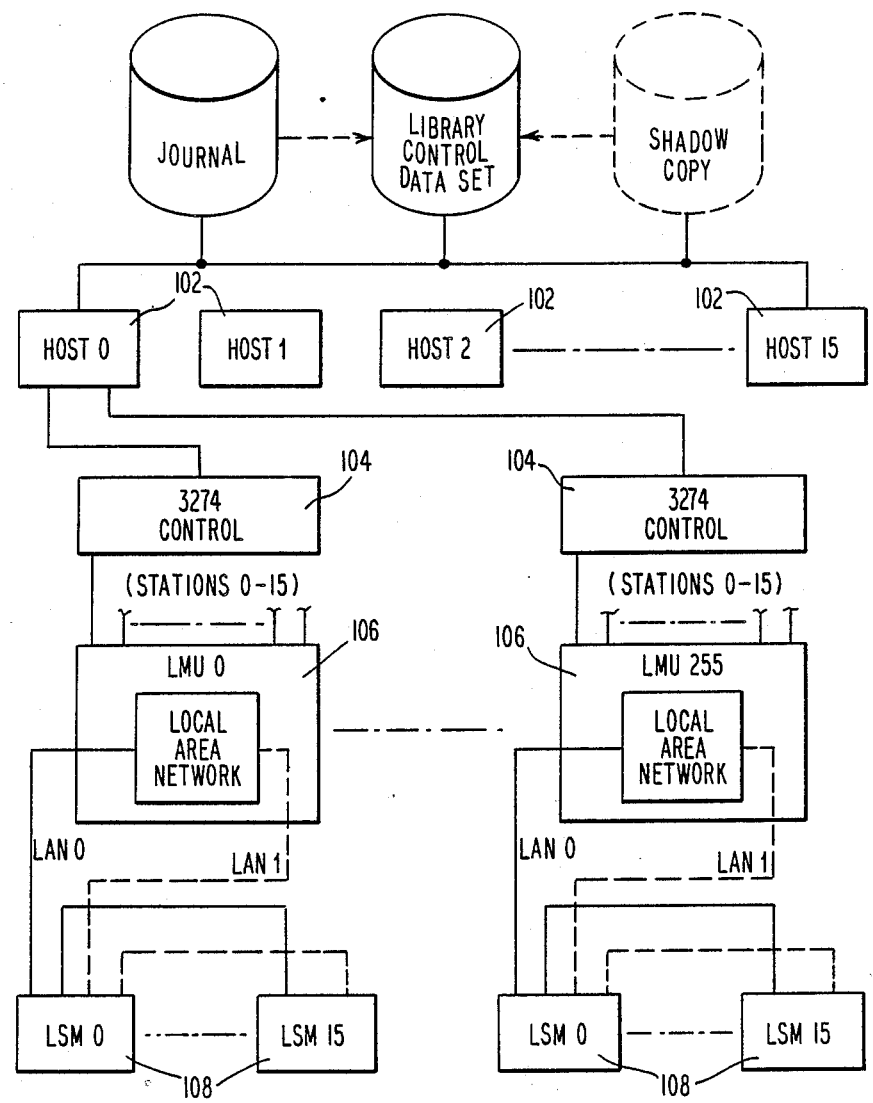
FIG. 2 is a block diagram of an expanded ACS according to the present invention.

Referring now to the drawings, wherein like characters designate like or corresponding parts throughout the several views, there is shown in FIG. 1 an automated cartridge system (ACS) 100 according to one embodiment of the present invention. The ACS 100 is designed to operate with an IBM, or IBM-compatible host computer 102 capable of communication with a conventional 327X-type terminal controller 104 as will be described in further detail herein below. Comprised generally of a library management unit (LMU) 106 and a library storage module (LSM) 108, the ACS 100, through its associated host software component (HSC) 110, enables storage and retrieval of approximately 6000 magnetic tape cartridges across a conventional channel 112. Each LMU 106 serves as the library controller and provides the interface between from one to sixteen host computers 102 and up to 16 LSMs 108, as shown in FIG. 2. The LMU 106 thus acts as an outboard controller and interprets commands from the host computers 102, relaying appropriate instructions to the selected LSM 108 via a control path (shown in solid lines) and a library control unit (LCU) 109. On the other hand, the read/write data path (dashed lines) comes directly from the host computer 102, through a tape control unit 111 to the tape transports 150 as will be described further herein below, thereby separating control signals from data signals.

Each LSM 108 provides the necessary mechanisms for automated cartridge handling. It not only provides the storage area for magnetic tape cartridges utilized in the system, but also includes an optical system for identifying the correct cartridge, a servo-controlled, electromechanical means of selecting the proper cartridge and delivering it to the correct tape drive, and a suitable housing to ensure operator safety and data security. As shown in greater detail in FIG. 3, a LSM 108 is comprised generally of an outer housing 113 which includes a plurality of wall segments 114 attached to floor plates 116 and disposed about a vertical axis A. An inner wall 118 having a plurality of segments 120 forming an upper portion 122 which is suspended from a ceiling 124 of the LSM 108, and another plurality of segments 126 forming a lower portion 128 which is mounted upon the floor plates 116, supports a first cylindrical array 130 of storage cells 132 centered about the vertical axis A. A second cylindrical array 134 of storage cells 132 is concentrically arranged about the first array 130, mounted upon the wall segments 114 of the outer housing 113.

Because conventional magnetic tape cartridges of the IBM 3480-type are subjected to an uneven tension upon rewinding of the tape contained therein, portions of the tape may project away from the wound body thereby facilitating damage to such portions if stored in a position which would cause undue pressure and potential bending or breakage of those portions projecting from the wrapped body. It would, therefore, be desirable to store such magnetic tape cartridges in a substantially upright position to alleviate such problems. The use of the term "upright", it should be apparent, indicates a position in which the axis of the tape reel hub within the cartridge is in a substantially horizontal position, rotated approximately 90° from its transducing position.

Figure 3:
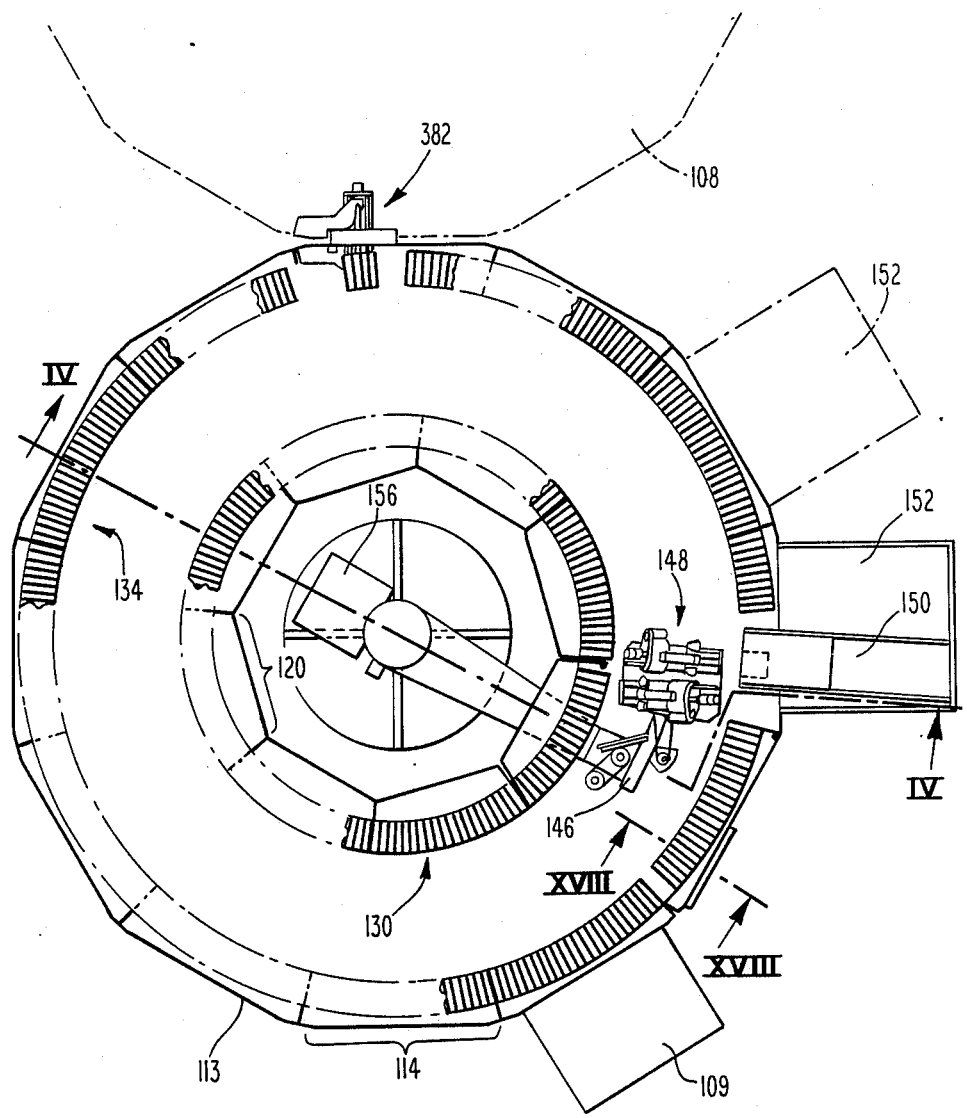
FIG. 3 illustrates in plan view, partially cut away, a library storage module with its associated tape drives and library control unit.
Figure 4:
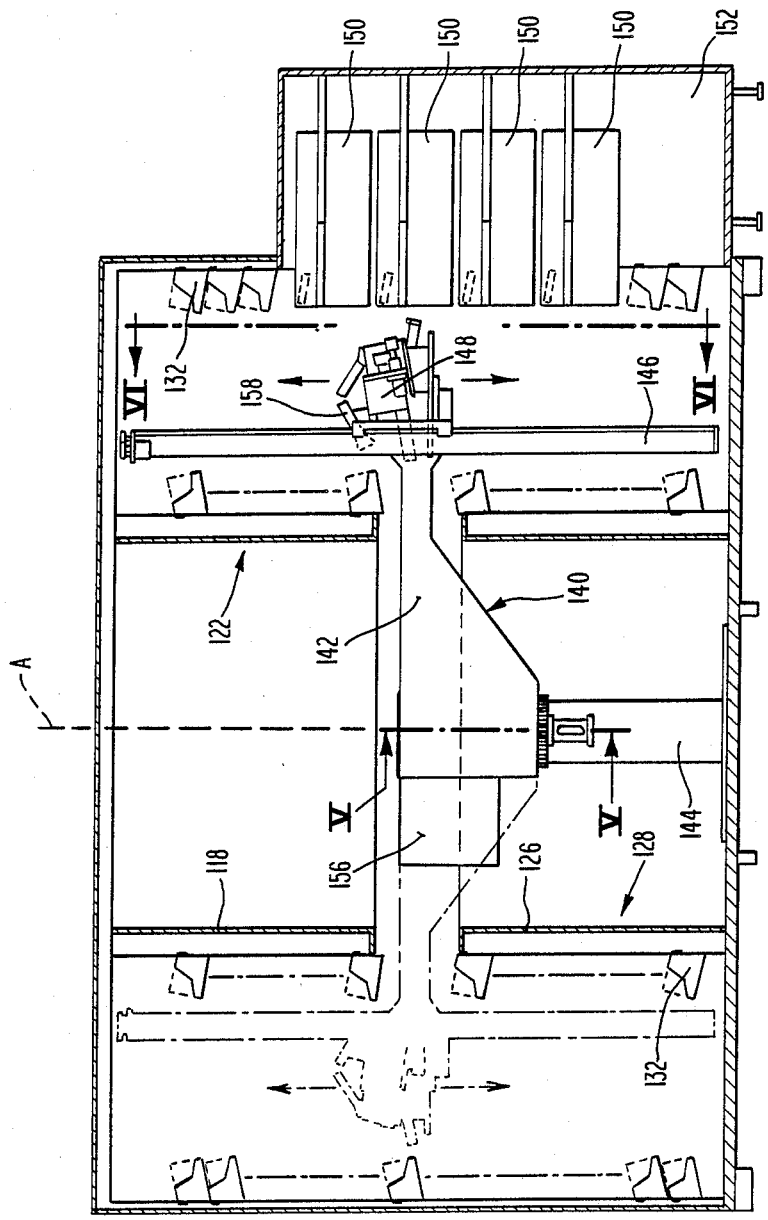
FIG. 4 illustrates in elevational view the library storage module and associated tape units of FIG. 3 taken along the lines IV—IV.

As shown in FIG. 4, when viewed in conjunction with FIG. 3, it can be seen that an access path 136 is formed between the upper and lower portions 122 and 128 in order that an arm assembly portion 138 of robotic means 140 may rotate about the vertical axis A between the first and second cylindrical arrays 130 and 134. The arm assembly portion 138 includes a theta arm 142 rotatably mounted upon a support column 134 which is attached to the floor plates 116. The arm assembly portion 138 further includes a Z-mechanism 146 attached to the end of the theta arm 142 remote from the support column 144. A wrist assembly 148, coupled to the Z-mechanism 146, is thus provided up-and-down motion as indicated by the arrows in FIG. 3 for storage and retrieval of magnetic tape cartridges contained within the storage cells 132, and for loading and unloading of the tape cartridges within a selected tape transport 150 of a tape unit 152 attached to the side of the LSM 108. Each LSM 108, as will be described in further detail herein below, is capable of supporting up to sixteen tape transports 150, four such tape transports 150 being arranged vertically on top of one another within a particular tape unit 152. In conjunction with the LMU 106 and a library control unit (LCU) or inboard controller 154, the robotic means 140 shown in FIGS. 3 and 4 is thus capable of transferring selected ones of the plurality of magnetic tape cartridges containers within the storage cells 132 between their substantially upright storage positions and the substantially horizontal transducing position at an available tape transport 150. The LMU 106, as previously described, interprets commands from the host computers 102 and optimizes the motion of the robotic means 140 to maximize media handling performance. Each LCU 154, on the other hand, provides the interface between the LMU 106 and the robotic means 140, interpreting commands from the LMU 106 and executing motion control sequences of the robotic means 140 within the LSM 108. A remote electronics interface (REI) 156, containing amplifiers, power and logic circuits necessary to drive the robotic means 140 and to utilize a vision system 158 (described in further detail herein below), is physically mounted upon the robotic means 140 within the first cylindrical array 130.

Figure 5:
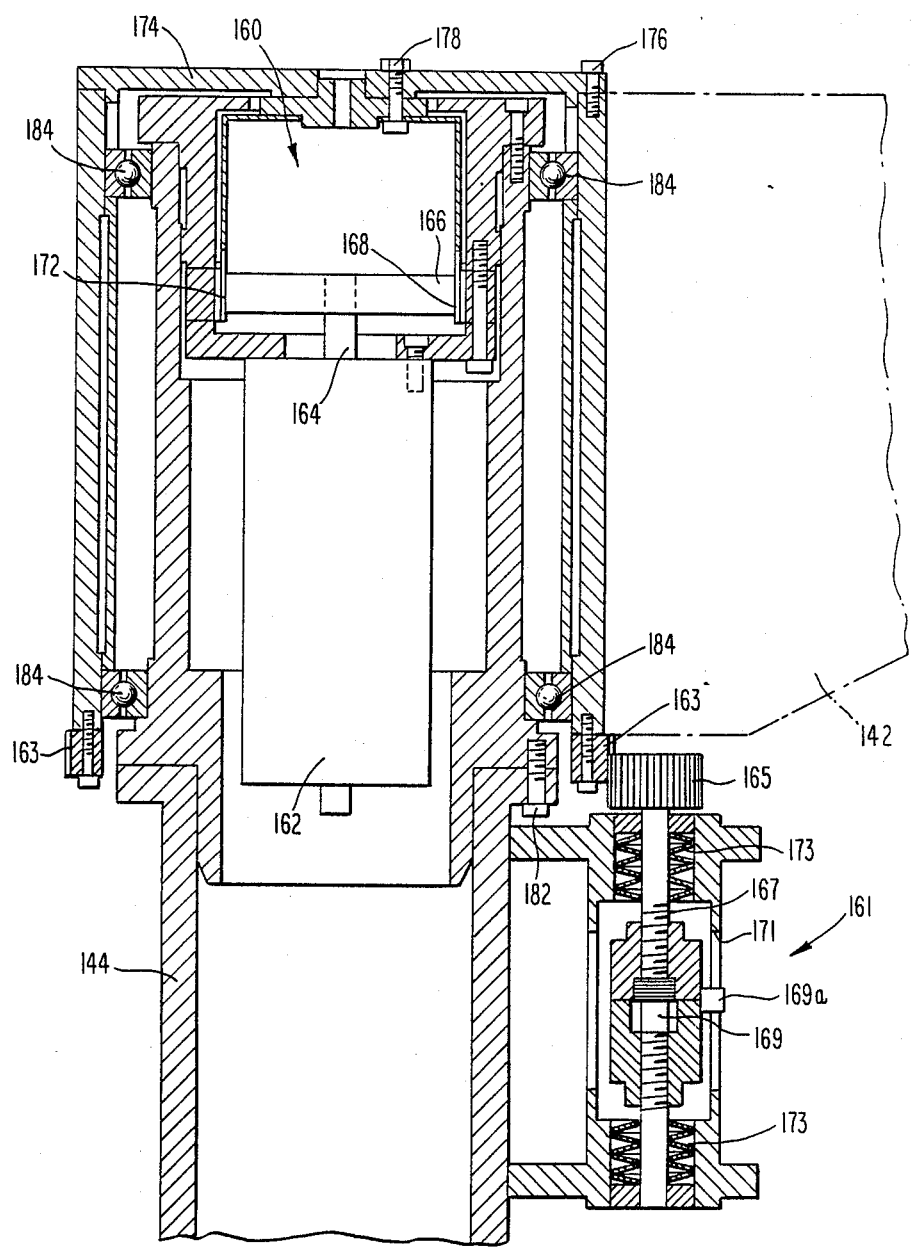
FIG. 5 is a sectional view of the harmonic drive means shown in FIG. 4 taken along the lines V—V, and a view partially cut away of a crash stop according to the present invention.

Referring now to FIG. 5, a presently preferred means for rotating the arm assembly portion 138 of the robotic means 140 is shown. The rotating means preferably comprises a harmonic drive system 160 which includes a servo motor 162 with an integral encoder to monitor the rotation of a shaft 164. An elliptical cam or ball bearing assembly 166 rotates within a flexible, external gear 168, the flexible, external gear 168 rotating within a fixed, rigid internal gear 172. Having two teeth fewer than the rigid, internal gear 172, the flexible, external gear 168 provides motion, through the elliptical cam 166, to the rigid, internal gear 172 resulting in a 100:1 reduction ratio of input (shaft 164) to output (theta arm 142). One such harmonic drive suitable for use with the harmonic drive system 160 is manufactured as Model 4M by the Emhart Harmonic Drive Division, Wakefield, Mass. Such a harmonic drive system 160 includes a sealed lubrication system, and is easily removed as a single failed replacement unit. Rotational motion provided by the shaft 164 to the can portion 170 is transmitted to the theta arm 142 by connecting the can portion 170 to an upper plate 174. The upper plate 174 may be attached respectively to the theta arm 142 and can portion 170 by a machine screw 176 and nut 178 and bolt 180, as illustrated, or similar such means. Likewise, the harmonic drive system 160 may suitably be attached to the support column 144 by a machine screw 182. Smooth rotation of the theta arm 142 about the harmonic drive system 160 may suitably be ensured by bearings 184.

Also shown in FIG. 5 is a theta arm crash stop mechanism 161 in accordance with the present invention. Driven by a gear 163 coupled to the harmonic drive system 160, a smaller gear 165 turns a lead screw 167 within the theta arm crash stop mechanism 161. A nut 169 is threadedly coupled to the lead screw 167, and includes a projection 169a which travels up and down within a groove 171 formed in the outer face of the theta arm crash stop mechanism 161. Protection against over rotation of the theta arm 142 is suitably provided by the combination of sensors (not shown) for detecting travel of the nut 169, Belleville washers 173 which are compressed by the nut 169, or a hard physical stop of the projection 169 within the limits of the groove 171.

Figure 6:
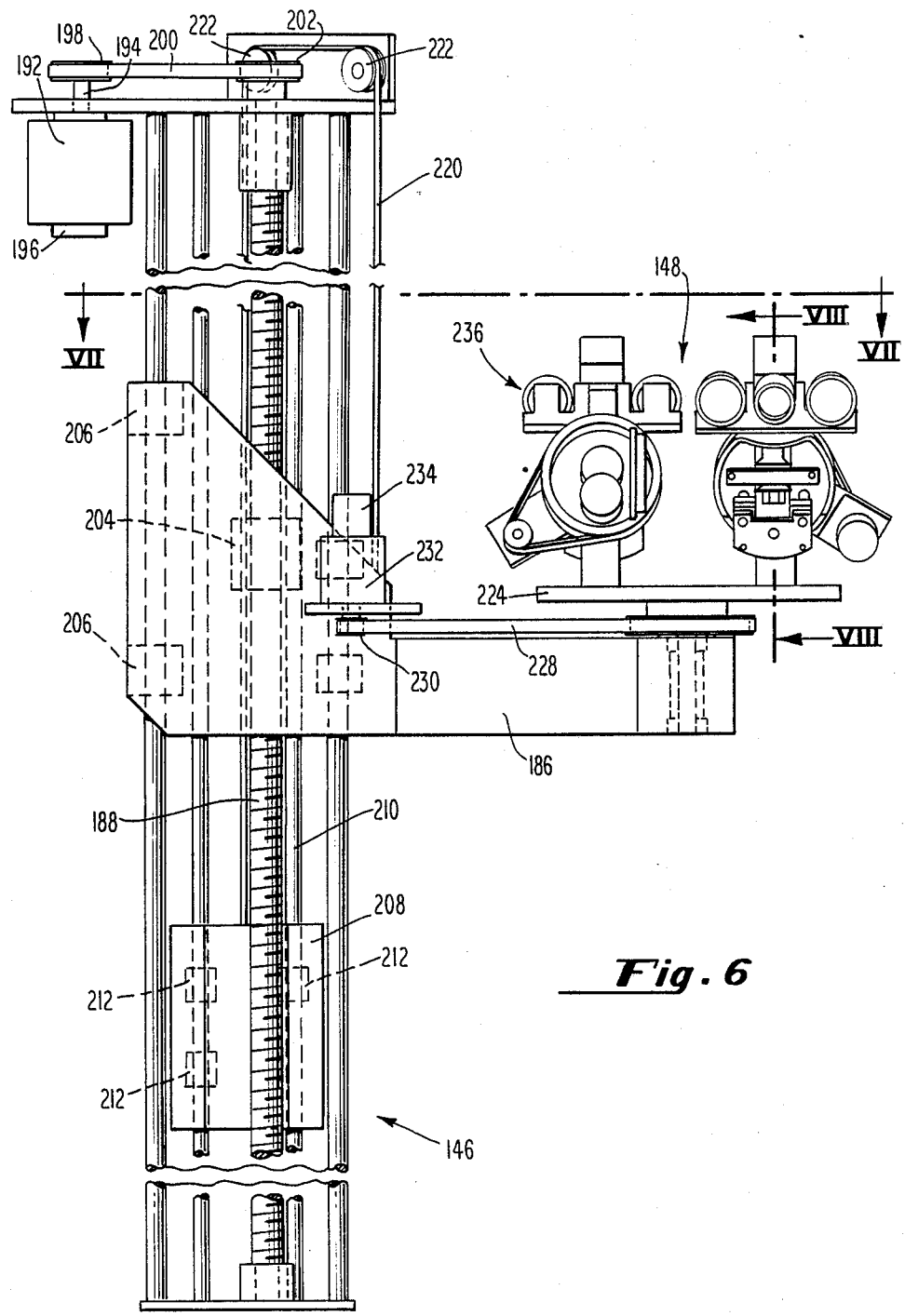
FIG. 6 illustrates the Z-mechanism and wrist assembly shown in FIG. 4 taken along the lines VI—VI.

Details of the Z-mechanism 146 and wrist assembly 148 may now be considered in conjunction with FIG. 6. As shown therein, a turntable support arm 186 supports the wrist assembly 148 for movement in an up-and-down direction (indicated by the arrows in FIG. 4) upon a lead screw 188 and a pair of guide rods 190. A drive motor 192 drives a shaft 194, as monitored by a shaft encoder 196, the shaft 194 coupled to a driver sheave or pulley 198 for driving a belt 200 about a driven sheave or pulley 202. The driven sheave 202, in turn, is coupled to the lead screw 188, thereby turning the lead screw 188 within a nut 204 threadedly coupled thereto and attached to the turntable support arm 186. The turntable support arm 186 is further coupled by linear ball bearings 206 supported upon the guide rods 190. In order to dynamically balance the weight of the wrist assembly 148 carried by the turntable support arm 186 in the up-and-down motion, a counterweight 208 slidingly supported upon a pair of guide rods 210 by linear ball bearings 212 is attached to the turntable support arm 186 by a cable 220 lead over a pair of pulleys 222. As shown in conjunction with FIG. 7, the drive motor 192 coupled through the driver sheave 198 and driven sheave 202 is capable of rotating the belt 200 in either direction (as indicated by the arrows in FIG. 6) in order to raise or lower the wrist assembly 148 mounted upon the turntable support arm 186.

Referring again to FIG. 7, in conjunction with FIG. 6, details of the wrist assembly 148 will now be described. The wrist assembly 148 includes a turntable 224 coupled through a driven sheave 226, drive belt 228, and driver sheave 230 to a drive motor 232, the rotational position which is monitored by a shaft encoder 234. Situated upon the turntable 224, a pair of hand and finger assemblies 236 with their associated roll mechanism 238 are mounted in an opposed relationship not only to provide redundant picking and placing capability for the ACS 100, but also to enhance the speed with which a magnetic tape cartridge is loaded or unloaded in a tape transport 150 without returning to its respective storage cell 132. The wrist assembly 148 with its opposed pair of hand and finger assemblies 236 is thus designed to reach backward on itself to take advantage of the storage cells 132 situated upon the inner wall 118.

Figure 8:
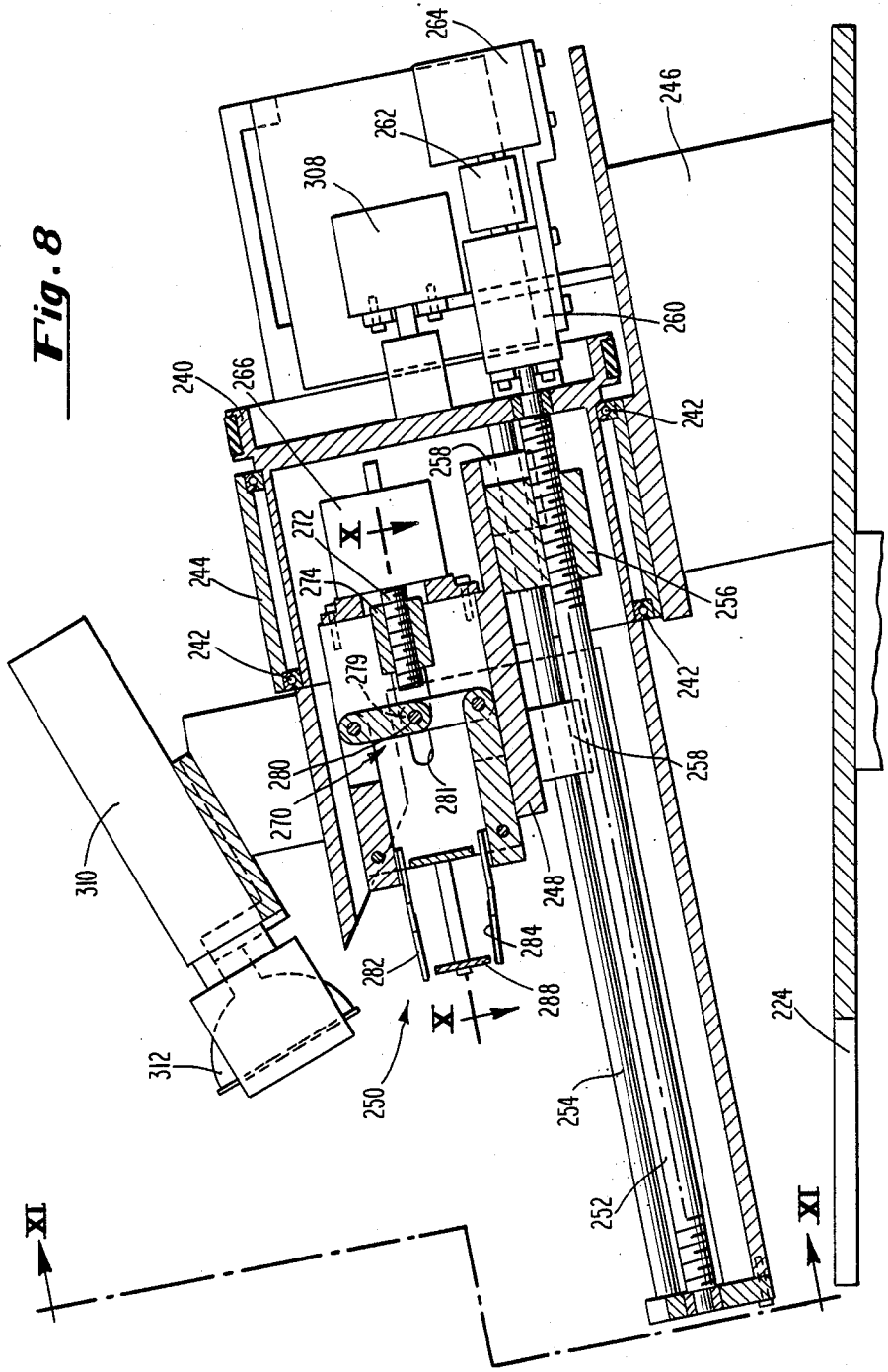
FIG. 8 illustrates in sectional view one hand and finger assembly and roll mechanism of the wrist assembly shown in FIG. 7 taken along the lines VIII—VIII.

Each hand and finger assembly 236, as shown in FIG. 8, is mounted upon the turntable 224 at an angle adapted to both adequately and easily store the magnetic tape cartridges and interface with the loading position of the tape transport 150. The angle at which the hand and finger assemblies 236 may be suitably mounted upon the turntable 224 according to the present invention is approximately 10°.

Figure 9:
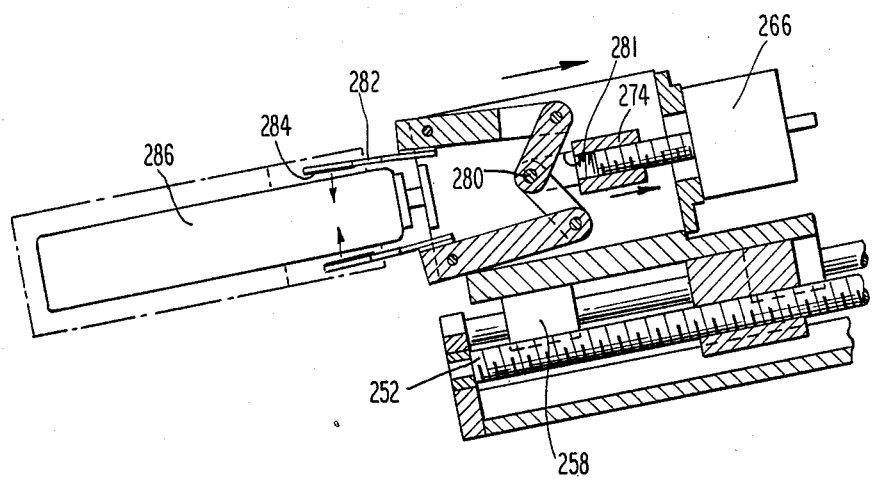
FIG. 9 illustrates the hand and finger assembly of FIG. 8 at its extended position.
Figure 10:
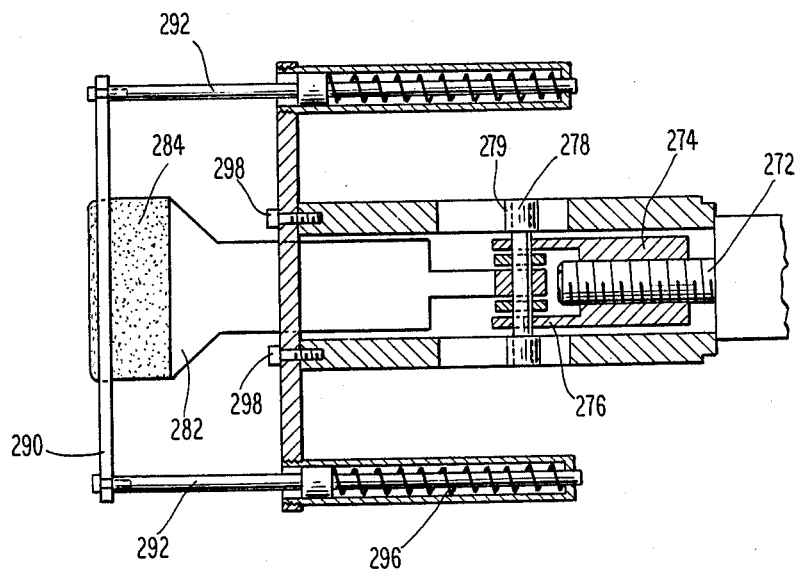
FIG. 10 illustrates in sectional view the finger assembly of FIG. 8 taken along the lines X—X.

As shown in FIGS. 7-12, each hand and finger assembly 236 is comprised generally of an inner rotatable housing 240 supported by bearings 242 within an outer housing 244 attached by means of a foundation plate 246 to the turntable 224. A carriage 248 containing a finger mechanism shown generally at 250 is mounted for extension and retraction upon a lead screw 252 and guide rods 254. A nut 256, which is threadedly coupled to the lead screw 252, is also attached to the bottom of the carriage 248. Similarly, a pair of linear ball bearings 258 is attached to the bottom of the carriage 248 for translation upon the guide rods 254. In order to move the carriage 248 from its fully retracted position as shown in FIG. 8 to a fully extended position as shown in FIG. 9, a drive motor 260 turns the lead screw 252 thereby extending or retracting the carriage 248 upon the nut 256 depending upon the direction of rotation. One suitable such drive motor is manufactured as Model 7214B415 by Pittman (a division of Penn Engineering and Manufacturing Corp.) Harleysville, Pa. Attached to the drive motor 260 through a shaft coupler 262 is an optical encoder 264 for determining the rotational position of the drive motor 260, and thereby monitoring the translational position of the carriage 248.

In order to grasp a magnetic tape cartridge, the finger mechanism 250 includes a stepper motor 266 attached to the rear of a housing 268 containing an over-center toggle 270. One suitable such stepper motor is manufactured as model number SM-200-0020 by Warner Electric of Marengo, Ill. A lead screw 272 driven by the stepper motor 266 rotates within a nut 274 having a yoke portion 276 which is coupled to the over-center toggle 270 by a pin 278 forming an articulated joint 280. The pin 278 is guided by bushings 279 at either end thereof travelling within a slot 281 in the housing 268. As the stepper motor 266 rotates the lead screw 272, the nut 274 travels upon the lead screw 272 pushing at the articulated joint to 280 and causing a pair of opposed fingers 282 having gripper surfaces 284 to open away from the magnetic cartridge 286 as shown in FIG. 9. Likewise, as shown in FIG. 9, when the nut 274 is rotated upon the lead screw 272 in a direction indicated by the arrows back towards the stepper motor 266, the over-center toggle 270 returns to the position shown in FIG. 8, thus closing the gripper portions 284 upon the magnetic tape cartridge 286. In accordance with one important aspect of the invention, and referring now to FIG. 10, a sensing mechanism 288 comprised generally of a plate 290 mounted upon a pair of rods 292 connected to respective pistons 294 biased in a forward position by springs 296 provides feedback on the location of the magnetic tape cartridge 286 with respect to the fingers 282. The sensing mechanism 288 may be suitably attached to the forward part of the housing 268 by machine screws 298.

Figure 7:
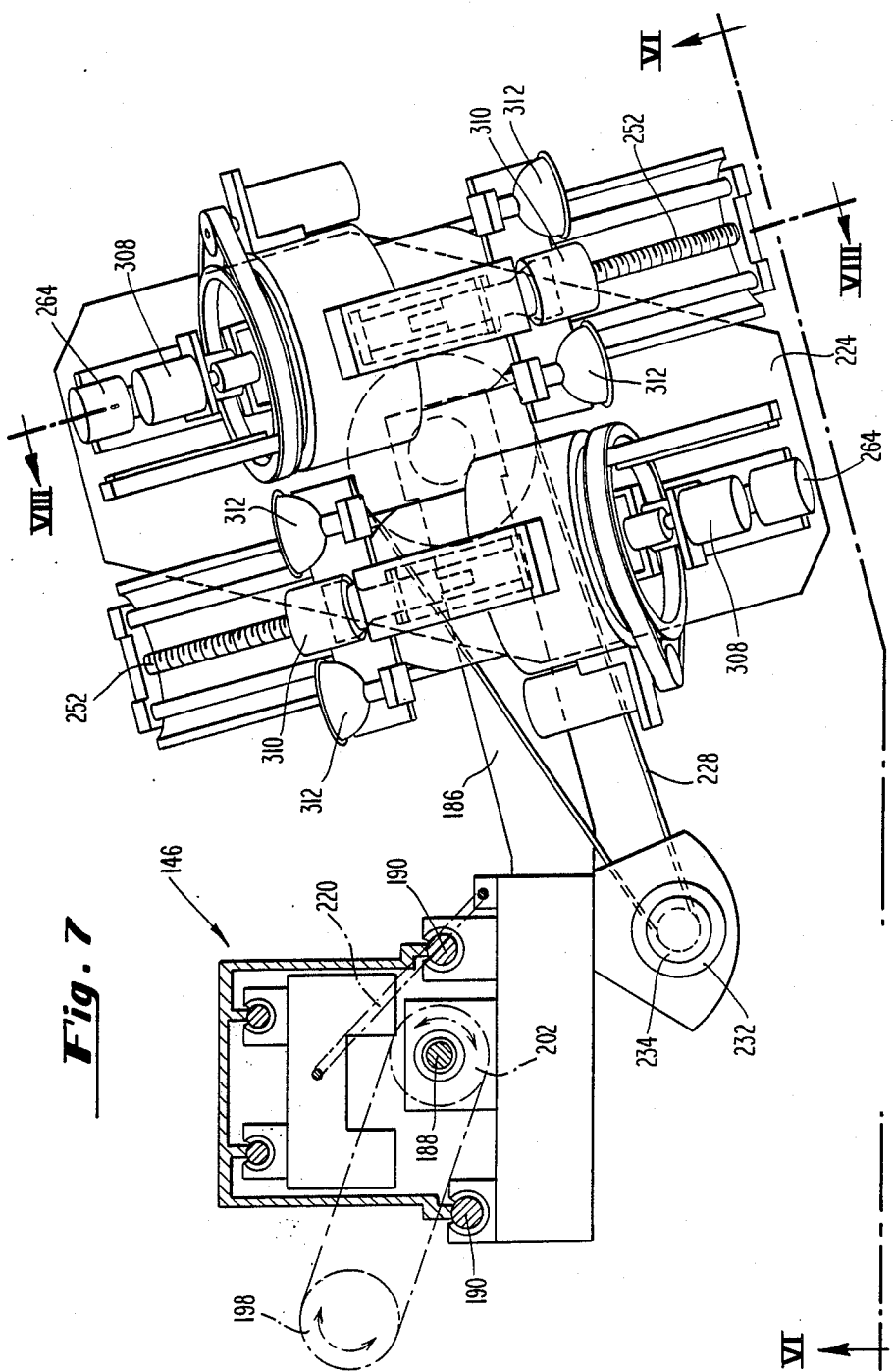
FIG. 7 illustrates in plan view the Z-mechanism and wrist assembly shown in FIG. 6 taken along the lines VII—VII.
Figure 11:
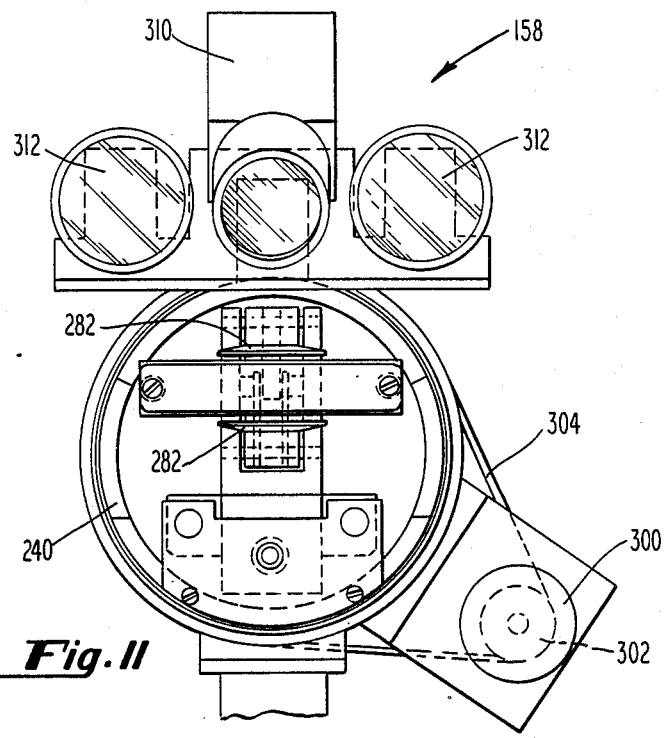
FIG. 11 illustrates in front elevational view the hand and finger assembly of FIG. 8 taken along the lines XI—XI.
Figure 12:
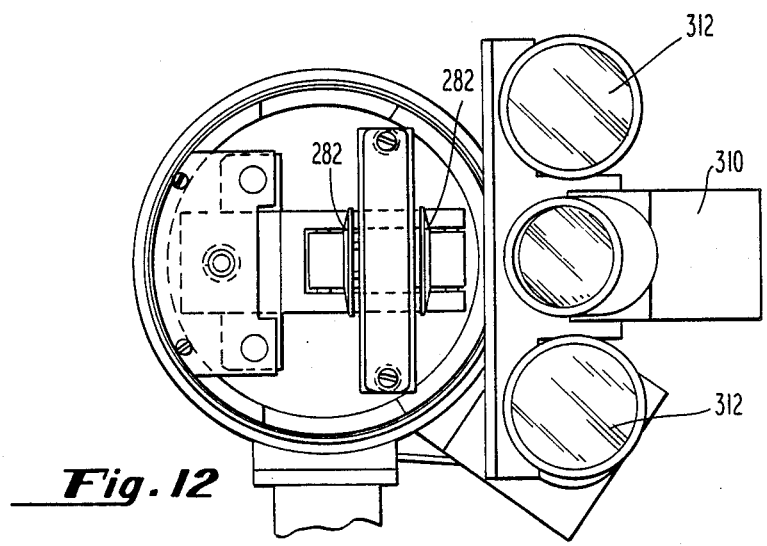
FIG. 12 illustrates the hand and finger assembly of FIG. 11 rotated 90° for storage of the magnetic tape cartridge.

Referring now to FIGS. 11 and 12 in conjunction with FIGS. 7 and 8, a description of the roll mechanism 238 will be given. A roll motor 300 mounted upon the side of the outer housing 244 is coupled through a driver sheave 302 and belt 304 to a driven sheave 306 attached to the inner rotatable housing 240. From a substantially horizontal position as shown in FIG. 11, the magnetic tape cartridge 286 is rotated approximately 90° by the roll mechanism 238 to the position shown in FIG. 12 corresponding generally to the substantially upright storage position. Thereafter, the hand and finger assembly 236 may be extended or retracted as necessary to store the magnetic tape cartridge 286 within its respective storage cell 132 or loaded within the tape transport 150 as will be described herein below with reference to FIG. 13-15. The roll motor 300 as shown provides an approximate 5:1 gear reduction, and is controlled by an optical encoder 308. One suitable such roll motor 300 is manufactured as model number T01LB4 by Yaskawa Electric of Japan, while a suitable optical encoder is manufactured as model number E15by BEI Motion Systems Company of San Marcos, Calif.

As is also apparent from FIGS. 7, 8, 11 and 12, the vision system 158 is comprised generally of a charge coupled device (CCD) video camera 310, flanked by a pair of camera lights 312. The camera 310 utilized in a presently preferred embodiment of the invention is manufactured by Takenaka System Co. Ltd. as Pulnix Model TM34K. One suitable such camera light 312 is a 20 watt, 12 volt model number BAB5582 manufactured by Sylvania. As is conventional, the field of vision of the camera 310 is divided up into a number of pixels. Through illumination of a unique target by the lights 312, the target being advantageously located proximate to a storage cell 132, the camera 312 can project an image which is compared to an image corresponding to an ideal position for storing or retrieving the magnetic tape cartridge 286, thereby facilitating fine positioning through feedback. The camera 312 may also be conventionally employed to read a VOLSER (i.e., volume serial) label consisting generally of OCR characters and bar codes.

Referring now to FIGS. 13-15, there is shown a carriage assembly of the tape transport 150 according to the present invention. The tape transport itself may be suitably comprised of a conventional self-threading, reel-to-reel drive compatible with IBM 3480-type magnetic tape cartridges, as described in U.S. Pat. Nos. 4,334,656 and 4,399,936, and in Winarski et al, "Mechanical Design of the Cartridge and Transport for the IBM 3480 Magnetic Tape Subsystem", IBM J. Res. Develop., Vol. 30, No. 6 (Nov. 1986), pp. 635-44, each of which is incorporated herein by reference. However, the carriage assembly 314 according to the present invention interfaces with the drive (FIG. 16) in order to expedite loading and unloading of the magnetic tape cartridge 286. The carriage assembly 314 includes a tray 316 which is adapted to move the magnetic tape cartridge 286 from its unloaded position as shown in FIG. 13 to a loaded position as shown in FIG. 14. The tray 316 includes the top plate 318 and bottom plate 320 with respective notches 322 and 324 adapted to permit the fingers 282 of the robotic means 140 to insert the magnetic tape cartridge 286 within the carriage assembly 314 for loading and unloading thereof.

When a particular magnetic tape cartridge 286 is desired to be loaded upon the tape transport 150 for reading or writing of data, the robotic means 140 inserts the magnetic tape cartridge 286 within the tray 316. A cartridge present switch 326 is activated by its flag 328 through physical contact with the magnetic tape cartridge 286. Meanwhile, a small roller 327 biased by a spring 328 attached to the bottom plate 320 is utilized to retain the magnetic cartridge 286 within the tray 316. The tape transport 150 is interrogated via a tape unit interface as described in detail below to determine if the magnetic tape cartridge 286 has been fully entered into the tray 316. A second switch 330 and its associated flag 332 are also included within the carriage assembly 314 to detect the conventional file protect mechanism of the magnetic tape cartridge 286. Upon activation of the cartridge present switch 326, and a subsequent command from the LCU 109, a drive motor 334 is activated in order to rotate a first gear 336 which in turn drives a second gear 338. Coupled through a shaft 340, the second gear 338 transmits its drive force to a pair of cams 342 located on either side of the tray 316. Pins 344 contained with the cams 342 and attached to respective pivot arms 346 force the carriage assembly 314 up or down as controlled by the drive motor 334. At the same time, the top plate 318 is biased down against the magnetic tape cartridge 286 by four springs 348 attached to the corners of the top plate 318, thereby transmitting a uniform pressure to the magnetic tape cartridge 286, holding it in place for engagement with a drive hub 350. When the reading or writing of data from the magnetic tape cartridge 286 is completed, the carriage assembly 314 is rotated up from its loaded position shown in FIG. 15 to its unloaded position shown in FIG. 14 by the drive motor 334, whereupon the magnetic tape cartridge 286 may be urged outwardly from the tray 316 by any suitable ejection means.

Figure 16:
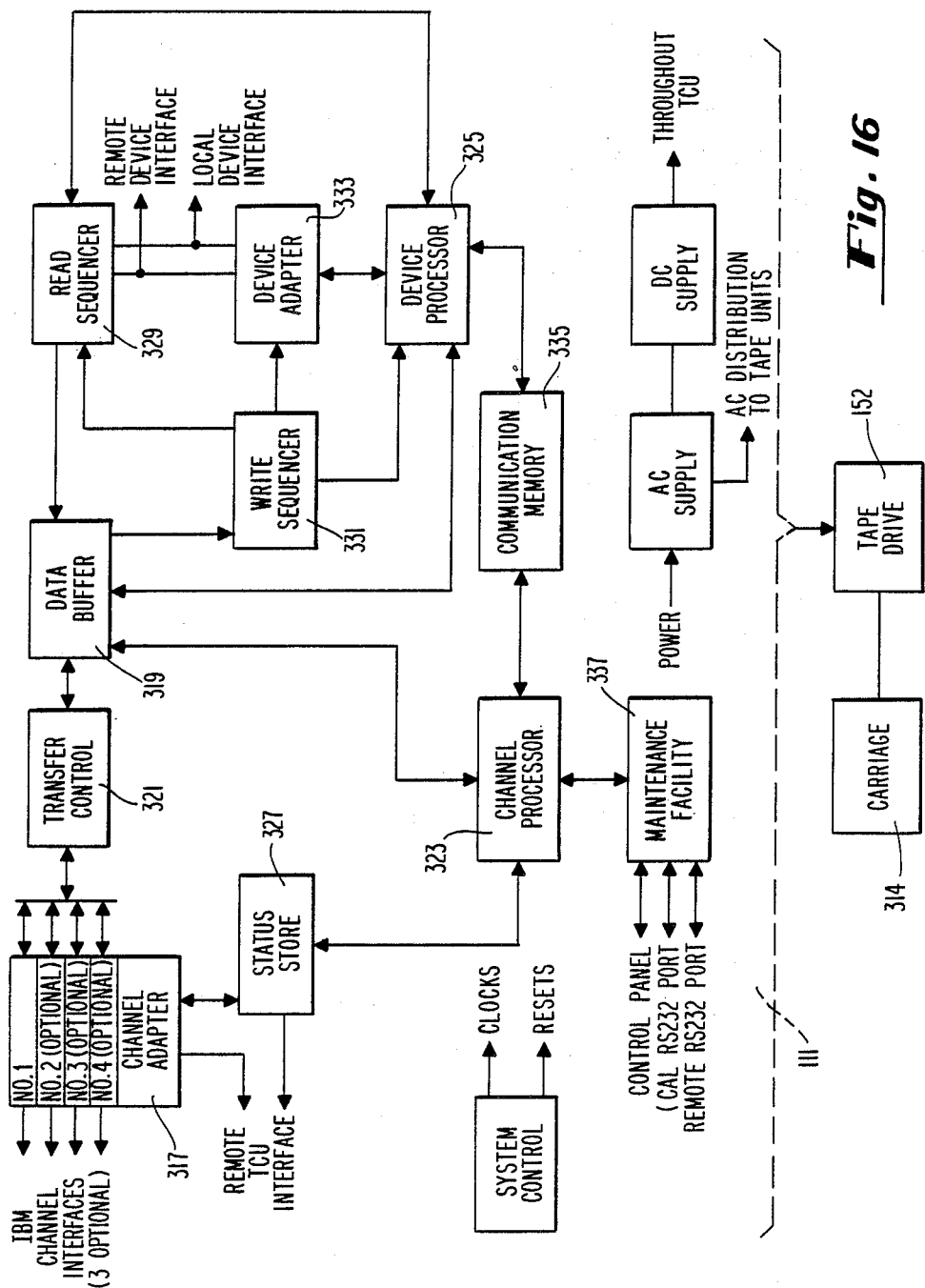
FIG. 16 is a block diagram of the tape transport shown in FIG. 4, as well as its associated tape control unit.

As shown in FIG. 16, each tape transport 150 is controlled by a tape control unit 111. The carriage assembly shown in FIGS. 13-15 is operatively coupled to the tape drive 315. Threading is accomplished by a pantocam threader that guides the leader block of the magnetic tape cartridge 286, to which the tape is attached, around the tape path. The leader block is inserted into the take-up reel, and the tape is brought to the correct tension to complete the threading operation. Guiding of the tape over the magnetic head is accomplished by compliant guides seating the tape against referenced flanges. Further details of the operation and mechanical components of a suitable tape drive portion 315 may be found in through reference to Winarski et al.

The tape control unit (TCU) 111 manages the writing and reading of data to and from attached tape transports 150. It receives commands from one to four channels, decodes these commands, selects transports and issues commands to them, passes data from channels to transports, returns data from transports to channels, and sends transport status to channels. FIG. 16 includes a block diagram of the TCU 111.

There is one channel adapter 317 for each channel connected to the TCU 111. It receives control signals and data from the channel interface and passes data to a data buffer 319, from which it goes to the tape transport 150. It receives data and status from the data buffer 319, passing it to the channel interface.

Data transfer control logic 321 handles the flow, commands, and status between the channel adapter 317 and data buffer 319, and checks data for accuracy. When data passes to the data buffer 319, this checking logic generates two check bytes and apends them to the data. When the data is read from a tape transport 150, as it passes through this logic back to the channel, the logic generates two check bytes and compares them to the check bytes generated when the data was written on the tape. If the comparison is not perfect, an error has occurred somewhere and the data cannot be trusted.

The channel adapter 317 is an "intelligent" channel adapter. As such, in a dual-TCU 111 configuration it queries a status store, it determines to which data buffer 319 a job is assigned, and interrupts the appropriate processor instead of always interrupting its own, thereby increasing efficiency. It also means that load balancing is done to increase throughput, not to remove data bottlenecks in the controller. That is, the channel adapter does the load balancing automatically without having to disturb the processor, which might decide to balance the load because doing so would take longer than processing the data itself.

The data or cache buffer 319 is a first-in, first-out dynamic RAM between the channel adaptor 317 and tape transport 150. It masks the inherent slowness of a mechanical transport system and permits data transfers to and from the cartridge subsystem at channel speeds. While data to and from the transport 150 flows at a rate proportional to the speed of the moving tape, the channel can begin writing to the data buffer 319 while the tape is coming up to speed. It can write in the data buffer 319 the data it wants to transfer, and disconnect, leaving the data buffer 319 to send the data to the transport 150 without further involvement of the channel. In a read operation, the channel waits until all or most of the data from the record on the tape is in the data buffer 319, then reconnects to the channel and transfers the data. During read operations, if an attempt to correct data without stopping the transport 150 fails, data is taken from the data buffer 319, looped back to the repath, and correction is attempted using various algorithms beyond current 18-track hardware correction techniques.

The channel side control processor 323, also known as channel processor, is a complete microprocessor that controls all activity on the channel side of the TCU 111. In a presently preferred embodiment of the invention, it consists of a high power, 16-bit microprocessor chip, with associated EPROM and RAM memories, clocks, interrupt handlers, registers, and parity generators and checkers. As such, the channel processor 323 is a multitasking, interrupt-driven processor. It responds immediately to tasks with a high priority than the task it is processing and stores a program address in memory, so that it can return to the previous job where it left off.

A device side control processor 325, structurally identical to the channel processor 323, controls data flow between the data buffer 319 and tape transports 150. Separate processors for channel and device activity thus means that both sections receive top priority, because one processor does not have to divide its time between the two tasks, the two tasks being serviced simultaneously. In addition, both processors 323 and 325 are interrupt-driven and have multi-task operating systems which enable a fast and efficient cartridge-type control unit.

The status store 327 is a logic collection that speeds up the TCU 111 handling of data. It connects the channel adapters 317 and channel processor 323 in a TCU 111 and stores channel adapter, control bytes, and status bytes. Communication between the channel adaptor 317 and channel processor 323 are stored in status store 327. Each unit reads or writes to status store 327 to communicate with the other unit. A channel adapter 317 and the channel processor 323 need not wait until both are free to communicate. If a channel adapter 317 is busy, the channel processor 323 writes a message in status store 327 and is free to do something else, thereby increasing throughput. When the channel adapter 317 is free, it reads the message. A channel adapter 317 communicates with the device processor 325 in the same way.

In dual-TCU 111 configurations, the channel adapter 317 and channel processor 323 in a TCU 111 communicate with the channel adaptor 317 and channel processor 323 in the TCU through their status stores 327. The two status stores 327 are connected through a remote control interface, and whenever a channel adapter 317 or channel processor 323 writes to its status store 327, the same information is written to the status store 327 in the other TCU 111. A channel processor 323, therefore, is aware of the state of the channel adapter 317 in the other TCU 111. It can determine to which data buffer 319 a job is allotted without having to query the processor 323 in the other TCU 111.

As described herein above, the device side control processor 325, also known as device processor, controls everything on the transport side of the data buffer 319. This includes establishing data path connections between devices and the assigned data buffer 319, either local or remote, initiating transport motion and read or write data transfers between the data buffer 319 and the transports 150 through the device interface, and controlling non-data blocks, such as tape marks.

A read sequencer 329 converts tape data pulses that it receives in ANSI format from the transport preamplifier through the device interface, into digital channel data, and sends it to the data buffer 319. At the same time, it checks the data for errors and corrects any error, if possible. The device processor 325 controls the read sequencer 329 which is active also during write operations. That is, it checks write data before that data is sent to the transport 150.

A write sequencer 331 receives channel data from the data buffer 319, converts it from digital channel format to ANSI type format, and sends it to the transport 150 through the device interface. It also regenerates check characters and compares them to the characters generated and appended to the data when it goes through data transfer control 321. The write sequencer 331 also generates the data patterns for inter-block gaps, tape mark, density identifier, and erase gap. The device processor 325 also controls the write sequencer 331.

A device adaptor 333 manages traffic through the device interface to and from attached transports. There are two device interfaces: local, to transports attached directly to the TCU 111; and remote, to another TCU 111 and its transports.

The device adaptor 333 converts commands from the device processor 325 and data from the write sequencer 331 into protocol proper to a 3480-type device interface.

Communication memory 335 is a two-port, 16 K-byte static RAM memory located logically between the channel processor 323 and the device processor 325. The two processors have equal access to this memory and communicate with each other through it. Each processor can address this memory to find out the status of data transfers, and the memory can interrupt either processor. The two processors work independently and are not held up by a need to communicate directly with each other. As such, the TCU 111 has substantially increased throughput.

A maintenance facility 337 consists generally of hardware and software that let both an operator and a remote diagnostic facility monitor subsystem conditions and diagnose problems. Components of the maintenance facility 337 include a control panel, local and remote RS 232 diagnostic ports, a comprehensive diagnostic package, and an expert system.

Figures 17, 18:
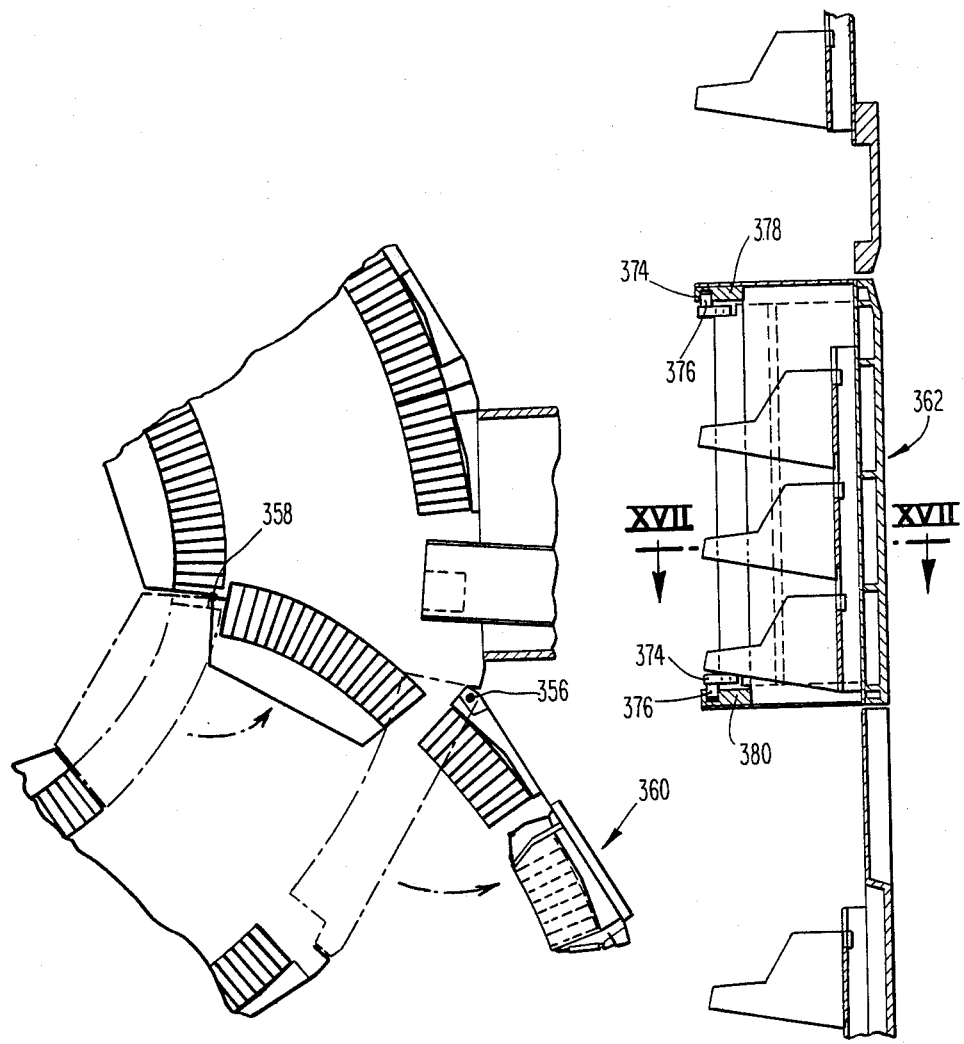
FIG. 17 illustrates in plan view the access doors and cartridge access port shown in FIG. 3.
FIG. 18 illustrates an elevation view, partially cut away, the cartridge access port shown in FIG. 3 taken along the lines XVIII—XVIII.

Referring now to FIGS. 17–19, the means for manually inputting and outputting a plurality of the magnetic tape cartridges 286 will be explained. As shown in FIG. 17, one wall segment 114 of the outer housing 113 of the LSM 108 includes a hinge 356 in order to open that panel and permit access to the interior of the LSM 108. Likewise, the inner wall 118 includes a hinged portion 358 at the lower 128 for access to the robotic mean 140 contained therein. A support wheel (not shown) may be utilized to prevent the weight of a plurality of cartridges stored in the hinged portion from distorting the hinge.

The wall segment 114 comprising the access door 360, as shown in FIG. 18, also includes a cartridge access port 362 for manually inputting and outputting a plurality of cartridges 286 as will be described in greater detail herein below. The cartridge access port or CAP 362 includes a fixed array of storage cells 132 similar to those mounted upon the inner wall 118 and wall segments 114. The CAP 362, as shown more clearly in FIGS. 19 and 20, includes a door 364 having a hinged portion 366 which permits the door to swing outward from the outer housing 112, thereby exposing the array of cells 132 for manual input or output by an operator. A gas spring 368 aids opening and prevents the CAP 362 from slamming shut, dislodging cartridges 286 contained therein, and provides a means for smoother operation of the CAP 362 through use of a dampening device internal to the gas spring 368. In accordance with one important aspect of the invention, a means is provided to ensure the safety of an operator and still permit continuous operation of the robotic means 140. That means, as shown in FIGS. 19 and 20, comprises an articulated wall portion 370 which closes the opening in the outer housing 112 upon the opening of the CAP 362. The wall portion 370 may suitably be comprised of a plurality of lightweight, flexible segments 372 hinged together at pivot points A, and B. The segment 372 at point C is attached to a pair of cam followers 374 which ride in a cam groove 376 formed in the upper and lower portions 378 and 380 of a cap housing 382. Therefore, when the operator opens the door of the CAP 362, the articulated wall portion 370 is drawn across the opening left by the door 364, thereby preventing access to the operating robotic means 140.

Figure 23:
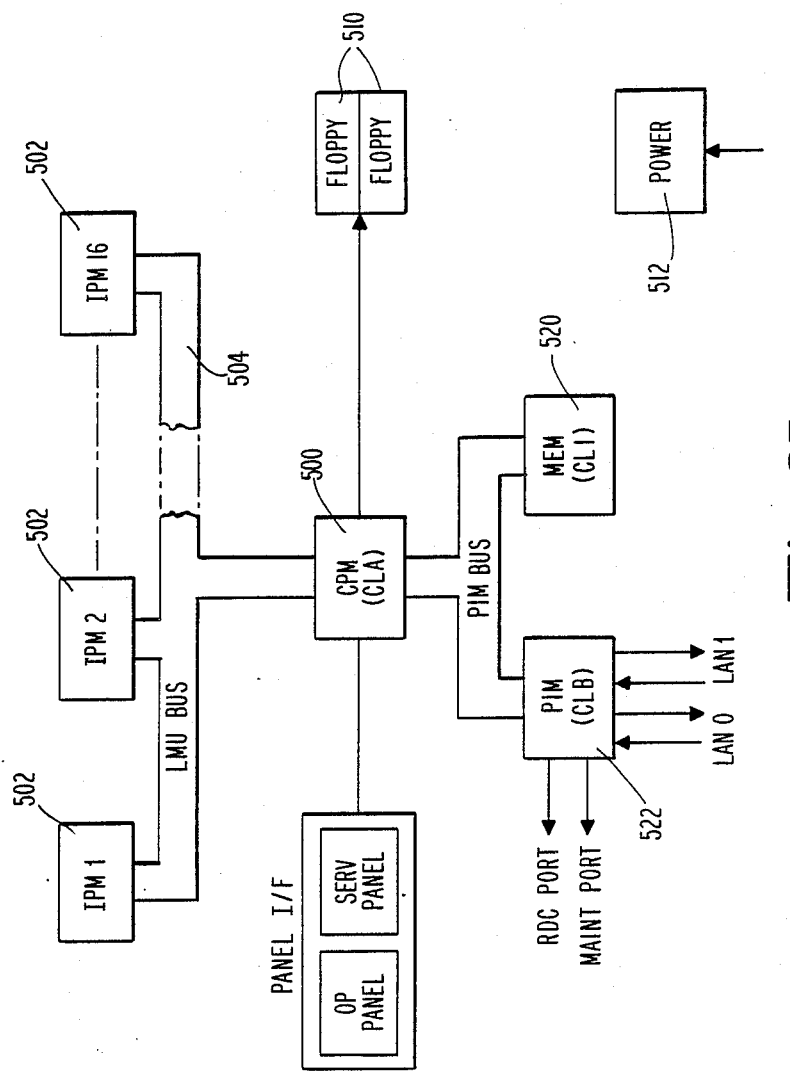
FIG. 23 is a block diagram of a library management unit (LMU) according to the present invention.

In accordance with yet another important aspect of the invention, there is shown in FIG. 21a one means for transferring a plurality of the cartridges 286 between LSMs 108 which are attached to one another. Referring also to FIG. 2, 22 and 23, it is apparent that future expansion of the library means is possible through interconnection of more than one LSM 108 in groups of two, three or four or more due to their twelve-sided configuration. Where the LSMs 108 are connected one to the other, a pass through port 382 according to the present invention is provided to transfer a plurality of the magnetic cartridges between the interconnected LSMs 104. As shown in greater detail in FIG. 21a, the pass through port 382 is comprised generally of multiple storage cells 132 adapted to ride upon a carriage 384 for transference between the LSMs 108. The array of storage cells 132 are spring-loaded upon a pivot 386 attached to the carriage 384, and includes a pair of cam followers 388 adapted to follow a cam surface 390 from one LSM 104 to the other. The carriage 384 is further coupled to a lead screw 392 by a nut 394 (not shown for clarity) which conventionally pulls the carriage 384 along the lead screw 392. In order to guide the carriage 384 along the lead screw 392, the carriage 384 is further coupled to a pair of guide rods 396. When a drive motor 398 rotates the lead screw 392, the carriage 384 is pulled along the lead screw 392 by the nut 394, but the pivoting array of cells 132 following the cam surface 390 enable the cells 132 to be positioned advantageously for incorporation with either LSM 104. That is, the array of cells 132 are initially positioned within one LSM 108 in a manner similar to each of the other storage cells 132 mounted upon the outer housing 112 of the LSM 108 for access by the robotic means 140. Thereafter, upon rotation of the lead screw 392 by the motor 398, the array of cells 132 are rotated (as shown by the dashed arrows in FIG. 21) to a position within the interconnected LSM 108 for access by its respective robotic means 140, the phantom lines illustrating the array's rotated position. It should be noted at this juncture, however, that the carriage 384 does not enter the arm swing space so that motions of the robotics 140 may continue during rotation.

Figure 21C:
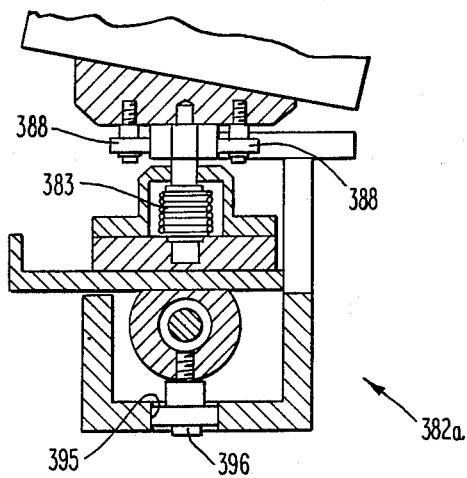
FIG. 21c illustrates in sectional view the pass through port shown in FIG. 21b.
Figure 21B:
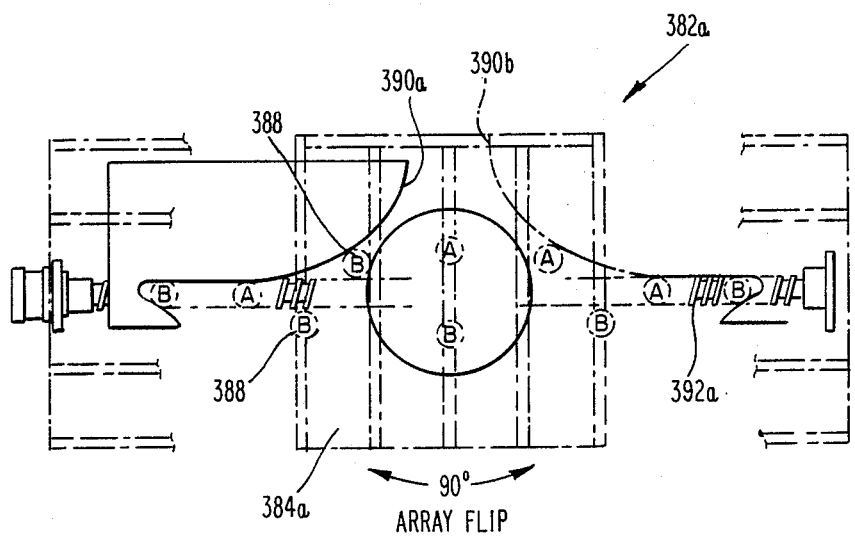
FIG. 21b illustrates another embodiment of the pass through port.

An alternative, and presently preferred embodiment of a pass through port 382a is shown in FIGS. 21b and 21c. Like the pass through port 382 shown in FIG. 21a, the pass through port 382a includes a pair of cam surfaces 390a and 390b, each of which are referenced to their respective LSM 108. A lead screw 392a and nut 394a arrangement provides the motive force for translating the carriage 384a between the LSMs 108, and a torsion spring 384 is used to pivot the cells 132 just as in the pass through port 382 of FIG. 21a. However, instead of guide rods 396, the carriage 384a is by a simple groove 395 and pin 397 arrangement which maintains its stability.

Referring now to FIG. 22, there is shown a typical array of storage cells 132 which may be utilized in accordance with the present invention. While the array shown in FIG. 22 has a radius of curvature adapted to be mounted upon the inner wall 118 of an LSM 104, it should be understood that individual cells 132 may be formed with an opposite curvature in order to be mounted upon the wall segments 114 of the outer housing 112. The cells 132 may also be formed in linear arrays for incorporation within the pass through port 382 or the cartridge access port 362. In any case, the cells 132 as shown in FIG. 22 are comprised generally of a bottom portion 402, back portion 404, and intervening wall portions 406 to provide a plurality of slots or cells 132 for storage of the cartridges 286. The wall portions 406 are adapted for access by the hand and finger assemblies 236 of the robotic means 140. Suitable means, such as the hooks 408 formed at the rear of the array of cells 132 may be used to suspend the cells 132 from the wall segments 114, 120, 126, or within the cartridge access port 362.

As stated herein above, the LMU 106 is the controlling function of the ACS 100. It acts as the interface between the host computers 102 and the LSMs 108. The major components of the LMU 106, and their functions, are described herein below.

Figure 24:
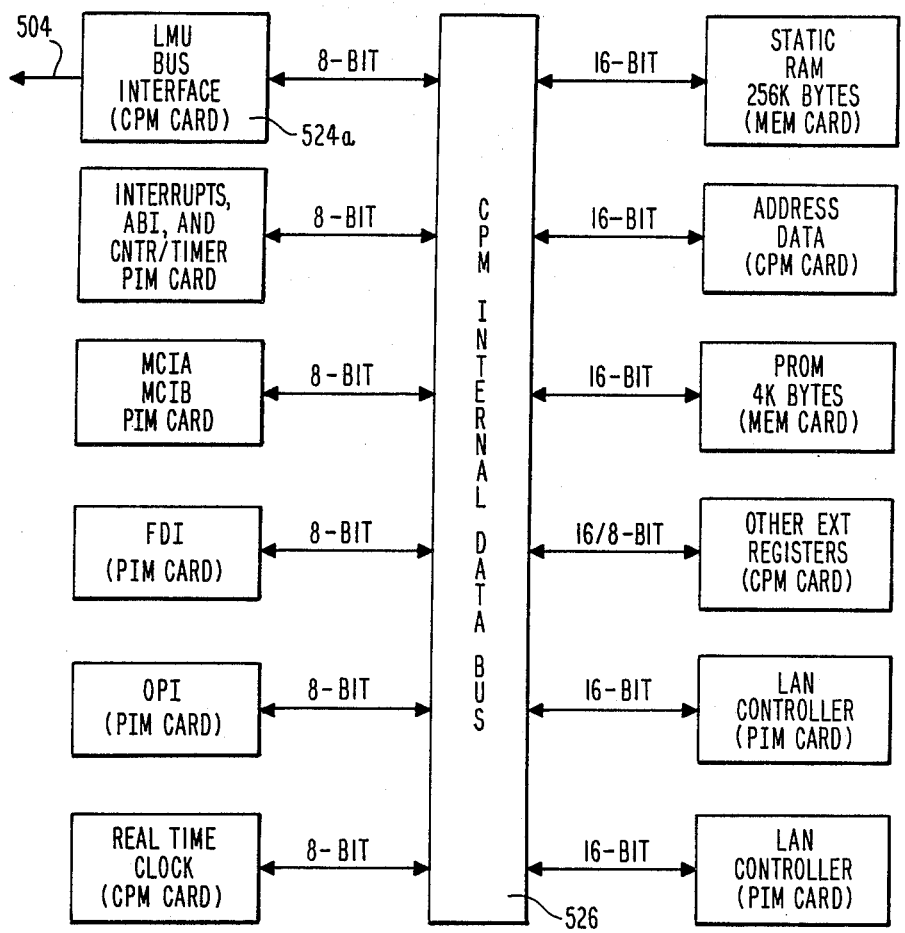
FIG. 24 illustrates passage of data within a central processor module (CPM) of the LMU shown in FIG. 23.

Referring now to FIG. 23, which shows a block diagram of the LMU 106 according to the present invention, it can be seen that the LMU 106 is comprised generally of a central processor module (CPM) 500, sixteen interface processor modules (IPM) 502, a LMU bus 504, a LMU operator's panel 508, a pair of floppy disks 510, a power monitor 512, and maintenance port 514. The CPM 500 provides the hardware necessary to handle all library management functions, and to support maintenance and diagnostic needs, and is attached to a memory (MEM) card 520 containing 512 kilobytes of static random access memory and 4 kilobytes programmable read only memory, and a peripheral interface module (PIM) card 522 which provides the logic necessary for communication with a plurality of LMU interfaces 524 (FIG. 24). Such interfaces may include a LMU bus interface 524a, a maintenance computer A interface 524c, a maintenance computer B interface 524d, a floppy disk interface 524e, a LMU operator's panel interface 524f, a local area network (LAN) interface 524g, and a power monitor interface 524h. Communication with each of the interfaces 524 is accomplished by accessing external registers which will be described in further detail herein below.

In order to control each of the elements of the LMU 106, the CPM 500 utilizes an internal microprocessor 518, which may comprise a conventional Z8002 microprocessor, to implement the interface between software and hardware in the CPM 500. To provide this control, the registers in each of the CPM interfaces 524 are mapped into the memory space of the microprocessor 518. The microprocessor 518 communicates with the interfaces 524 by reading and writing such external registers to initialize the individual interface. Controller chips may be used to implement the individual interfaces in order to off load control of the interface attachment as much as possible. Such interface controllers implement the protocol, control, and data handling with the attached device. As such, the microprocessor 518 is only involved in initializing the controllers, passing data between the interfaces, and error handling.

As is well known, the Z8002 microprocessor 518 is a conventional 16-bit microprocessor with a 16-bit bus that can operate at an eight megahertz clock rate. Program memory on board the CPM 500 is provided by 4 kilobytes of program programmable read only memory (PROM) and 256 kilobytes of partially paged program static random access memory (RAM). An additional 256 kilobytes of data memory are also provided. The data passed between the various components of the CPM 500 are illustrated in FIG. 24.

Referring again to FIG. 23, when viewed in conjunction with FIG. 24, it is apparent that the CPM bus 526 is internal to the CPM 500 and consists of those signals necessary to transmit data between the microprocessor 518 and other logic on the CPM 500. Each of the interfaces 524 on the CPM 500, as shown in FIG. 24 is provided for CPM input/output interfacing. For example, the LMU bus interface 524a provides the CPM 500 with the capability of communicating with an IPM 502 over the LMU bus 504. The maintenance computer interfaces 524c and 524d provide the CPM with the capability of interfacing to a maintenance computer (not shown) and modem or modem junction box for remote maintenance. The floppy disk interface 524e provides the CPM 500 with the capability of attaching conventional 5¼ inch mini-floppy disks. The LMU operator's panel interface 524f provides the CPM with the capability of interfacing to switches and indicators external to the CPM 500. Two identical, LAN interfaces 524g provide attachment to the LSMs, one being provided as primary and the other as backup. A physical BNC connector is also provided for connection of a maintenance device to each of the LANs, while four programmable timers are provided on the CPM 500 acting as general purpose timers. The CPM 500 may also contain a real time clock powered by a long-life battery to maintain system time during power off.

Figure 25A:
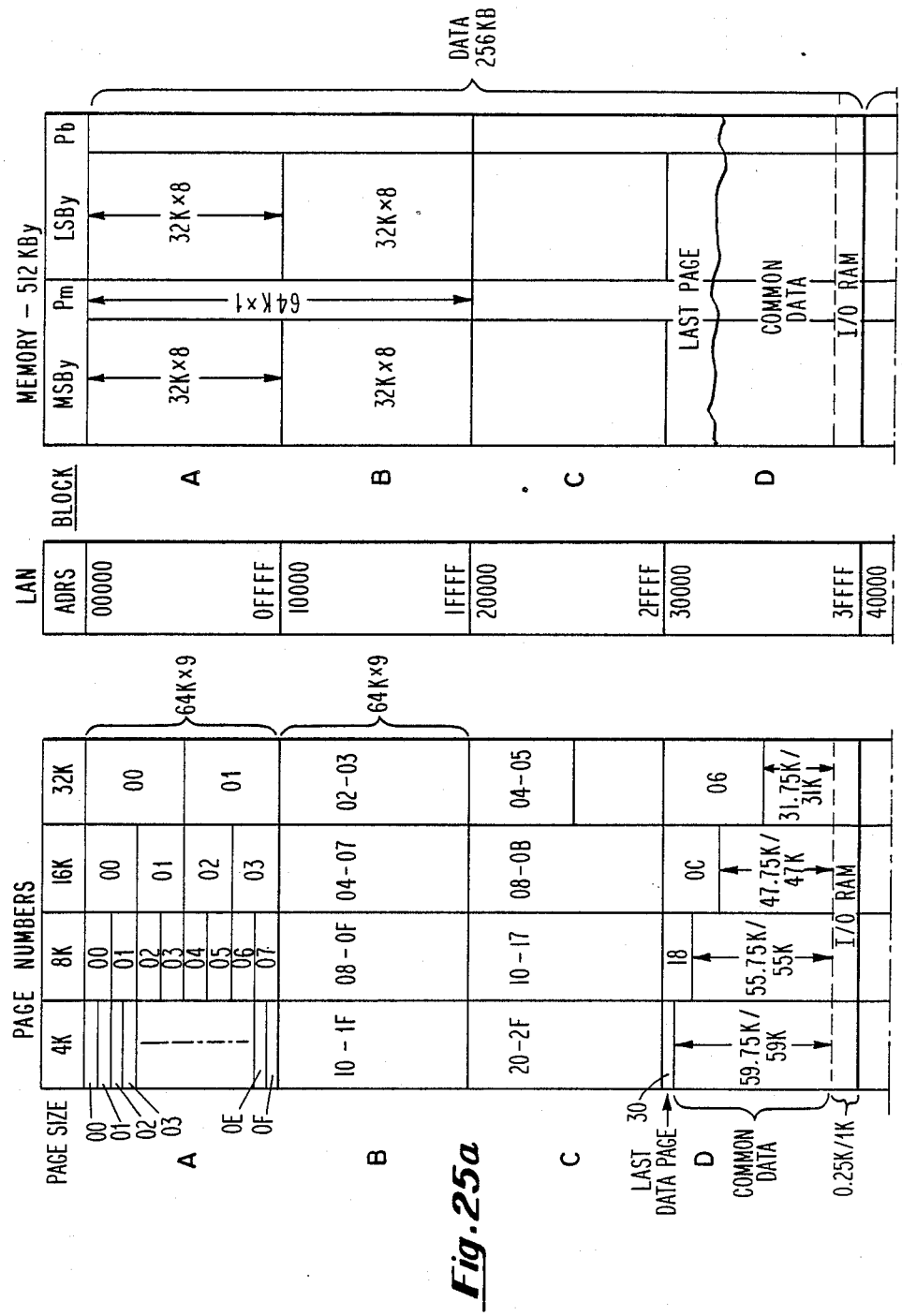
FIGS. 25a and 25b illustrate paged memory mapping of the CPM shown in FIG. 24.
Figure 25B:
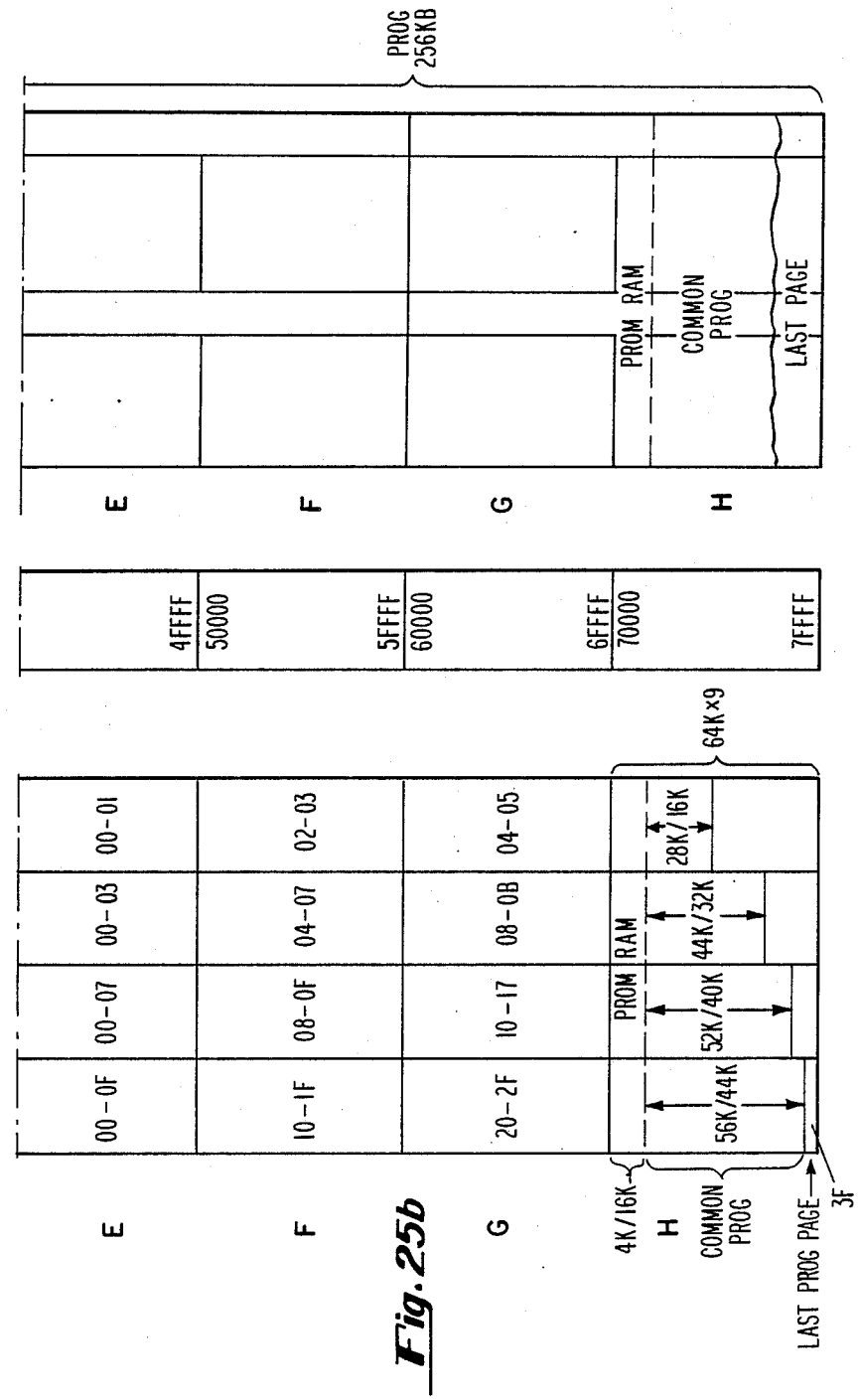

As shown in FIGS. 25a and 25b, the CPM 500 consists generally of a PROM program memory, and data memory which serves as private memory for the microprocessor 518. The program PROM is read only memory that retains its contents when powered off, and may be suitably implemented using conventional 2K x 8 PROMs to provide a word-wide memory. Parity is not used and PROM content can be verified by software. The PROM occupies both system and normal program space to allow for initial program load and other common routines FIGS. 25a and 25b, illustrative of memory paging, is broken up into three sections. The first on the far right shows the physical memory as it exists in hardware,, Side-by-side 32K×8 SRAMs denote the most significant byte on the left and the least significant byte on the right, constituting a block of memory 64 k bytes long. Note that are four blocks of data (A–D) and four blocks of program memory (E–F) for a total of 512 k bytes of memory.

Block D (data) contains the common data space. It also contains the SRAM that is "covered up" by input output devices (255 bytes). This common data space is the physical memory that will be accessed if the virtual address from the microprocessor 518 is not in the paged area of memory. Likewise, in block H of program space, the common program space resides along with the SRAM that is "covered up" by the PROM (four killobytes).

The middle column of FIG. 25a and 25b denotes the LANCE linear addressing of memory from address HEX 00000 to 7FFFF. Note that software must perform an address translation if it attempts to address memory to address memory that the microprocessor 518 has been addressing as page number n page size s.

The columns on the left side of FIG. 25a and 25b show memory broken up into its different page sizes and numbers. Each column denotes a different page size, each space (program and data) being capable of having different page sizes and numbers. Within each column the page numbers that reside in that physical block of memory are given. For instance, if the data page size is 16 k, block A will contain four 16 kilobyte pages 00,01,02, and 03 (page numbers are given in HEX). Block B will contain pages 4–7, and so on. Therefore, if the data page size is 16 k and the page number is 02, the block of memory addressed will be block A. Paging is envoked only if the virtual address is in the paged area. In the data space, the paged area resides at the low addresses of memory, while in program space the paged area is at the high addresses of memory (FFFF is "higher" than 0000). As a result, in the data space if the size is 16 k virtual addresses 0000 through 3FF HEX are the paged area of memory. For a page size of 4 k, 0000 through 0FFF is the paged area of memory. The other virtual addresses (4000 and above four 16 k size) therefore, suppose the microprocessor 518 has written to the data page register with a 10000011 which selects a page size of bits 7, 6=1, 0=page size of 16 k and a page number of 000011=page number 3 HEX. If the microprocessor 518 places a virtual address on the bus that is in the paged area (less than 4000 for this size) then the paging will occur and the virtual address will be translated in hardware so that block A is selected and page is addressed. If, however, the microprocessor 518 had put out an address that was not in the paged area (i.e., greater than or equal to 4000 for page size 16 k) then the paging would not occur and the common data space would be selected which is in block D. A similar case holds for the program space except that the paged area is at the high end of memory as mentioned above.

When paging is envoked by the microprocessor 518 accessing a virtual address in the paged area, the physical address to the memory is determined as follows. The block is selected as mentioned above based on the page size and number. Then, the physical address presented to that block is arrived at by translating the upper virtual address bits to access the desired location in that block. For instance, if data page sizes 16 k, page number 02 HEX, and the virtual address is 2000 HEX, then block A will be selected. The virtual address bits will be translated by adding the offset into the paged area, in this case 2000 HEX, to the starting address of the desired page, in this case 8000 HEX or page number 02, for a final physical address of 8000+2000=A000 HEX to block A.

A similar situation exists for the program space except that since the paged area is at the high end of block H, the offset into the paged area mentioned above is determined by subtracting from the virtual address the starting of the paged area. For example, for program page size 8 k, program page number 11, virtual address E 100 the following will occur. Block G will be selected and the physical address will be the offset into the paged area. For program AK pages E000 is the starting address of the paged area as shown in the table above.

System and normal memory may be suitably implemented using 32K×8 static RAMs to provide a word-wide (2 byte) memory. Odd parity is used on each byte of the RAM. The program PROM displaces the first 4096 words of system and normal program memory and leaves such memory unaccessible. External registers, as shown in FIGS. 26a and 26b, displace the upper 256 bytes of system and normal data memory and leaves such memory unaccessible.

All CPM external registers are addressed as memory addresses. Parity is not checked when reading external registers.

As shown in FIGS. 26a and 26b, B indicates a register size which is addressable as a byte or, word but will only provide useful data on the least significant byte. The most significant byte will be FF. A register which can be accessed as a word or a independent bytes is indicated by B/W. It should be noted that all reads are word reads but that the microprocessor 518 only pays attention to the byte selected if in byte mode. Also, on byte mode write the microprocessor 518, duplicates the selected, byte on both the most significant byte and least significant byte of the bus. A LW indicates a long word address which should only be accessed as a long word (i.e., 32 bits).

The type of registers are also indicated in FIGS. 26a and 26b by the abbreviation no, RO, and R/W. A NO type indicates that the address is not valid. No error will result is accessed but useful data cannot be written or read. RO indicates read only, but writing to this address will cause no effect. On the other hand, useful information is available by reading this address. Finally, R/W indicates a register which can be written or read. Descriptions of the individual registers may be found in Appendix A. One provides all the control functions involved in communicating with the IPMs 502 over the LMU 504. LMU bus status is indicated in the register at address FF02 thereby providing status information on the success or failure of an LMU bus transaction. It should be noted that the NACK and module busy are valid only after a CPM transmission when the output device (FIFO or info out register) show empty and plus status cycle transmit is inactive.

Figure 40:
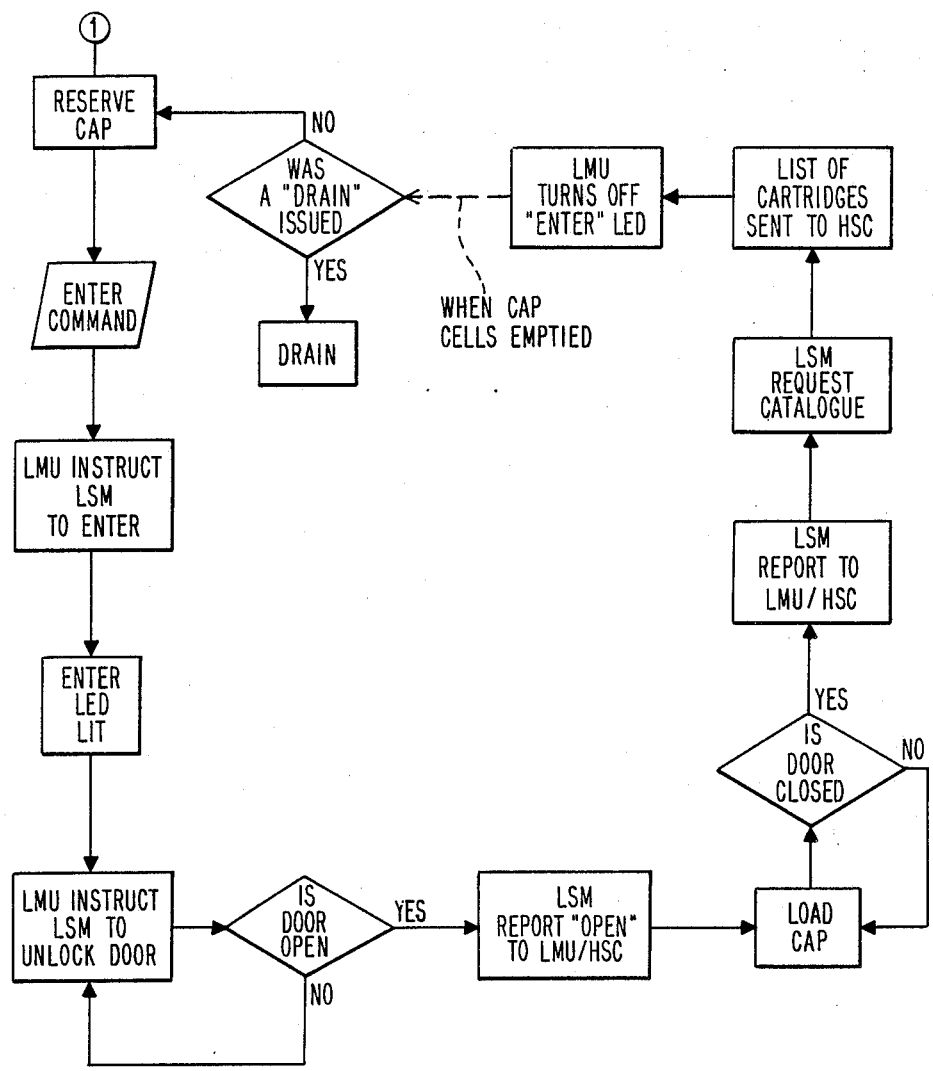
FIG. 40 shows a flow chart of ACS actions upon an ENTER command.

The LMU bus 504 is fully synchronous with a cycle time of 250 nanoseconds, and provides a bandwidth of four megabytes per second. It allows various modules to connect to the bus and communicate with each other. Information is transferred on the LMU bus 504 during a transaction between two modules, one acting as the bus master and the other as the bus slave. A transaction is composed of multiple bus cycles of various types and transactions can be overlapped or pipelined such that a new transaction can be initiated while a previous transaction is completing. When a module wishes to use the bus 504, the particular module requests bus access and then determines whether the bus is granted by monitoring bus signals. When the bus is granted, the module becomes the bus master. The bus master will then initiate a bus transaction with the bus slave, priority being established for arbitration by the physical positioning of the modules in the back plane. When bus usage is granted, the bus master transfers information to the bus slave module in one or more transfer cycles immediately following the arbitration cycle. These transfer cycles are referred to as outbound transfer cycles. For each outbound transfer cycle, the slave module responds with status in the following cycle. Any external conditions causing termination of a module operation must allow the module to finish the bus transaction, if possible, before termination so that the bus remains in operation and other modules are not affected. If this is not possible, Bus Busy is negated to free the bus for arbitration and further use. As shown in FIG. 40, the arbitration cycle ends status cycle can occur concurrently for two separate transactions.

The LMU bus 504 uses a time slot, multiplexed, design which allows a new transfer to be placed on it every bus cycle (except when arbitration is taking place). Arbitration is by a distributed means with fixed priority according to the physical positioning of modules in the back plane.

Operations of the LMU bus 504 are divided into three types: CPM Requests, IPM Requests, and Information Transfers as described herein below. CPM Requests cause one byte of information to be sent from the CPM 500 to the addressed IPM 502.

The info out register is first loaded with the byte plus parity to be transmitted to the IPM 502. Thereafter, the address out register is loaded with the four-bit address plus parity of the IPM 502 to which the information is to be sent. The LMU control register is then addressed and loaded with "100000101" which causes or keeps the status reset flip flop enabled, asserts the CPM Request signal, and asserts the LMU Bus Enable Signal. At this point, the microprocessor 518 may perform other tasks since the rest of the CPM Request process is hardware implemented. However, the microprocessor 518 must perform a status check after the CPM Request to verify a successful operation.

LMU Bus Request asserts causing LMU bus arbitration. The CPM 500 will win the bus arbitration unless a FIFO transfer is in progress. If such FIFO transfer is in progress, the CPM Request logic will continue to arbitrate until the bus is granted at the completion of the FIFO or until the microprocessor 518 negates the CPM Request signal. It should be noted at this juncture that the LMU Bus Request signal (arbitration) must be asserted for at least one clock cycle to prevent one or the other IPMs 502 from successfully being rented the use of the LMU 504. A LMU Bus Grant asserts on the rising edge of the clock following successful bus arbitration. Data in the form of address out and info out is then placed on the LMU bus 504 on the rising edge of the next clock.

All of the IPMs 502 compare the module address, on the LMU bus 504, against their individual physical addresses. The one IPM 502 that has a successful compare enables its logic to receive the data from the LMU bus 504.

The IPM info in register is then loaded with the data on the LMU bus information lines, and the IPM 502 checks the parity of the information and address data from the LMU bus 504. If good parity is detected, the IPM 502 will assert-acknowledge on the next rising clock edge, indicating a successful reception of data. If bad parity is detected, - Acknowledge will not be asserted.

Thereafter, the CPM 500 checks the status of the - Acknowledge signal. If negated (high) the CPM 500 will initiate a - Not Acknowledge Interrupt. This means that either none of he IPMs 502 saw the correct module address, or an IPM 502 did get a successful address compare but detected a parity error in the information or module address. If - Acknowledge is asserted, one of the IPMs 502 successfully compared the module address to its own and detected good parity on the information and module address. This indicates that the CPM 500 sent the data out correctly and one of the IPMs 502 recognized it. By reading the CPM status register the microprocessor 518 checks the status of the - Module Busy Signal. If asserted, the IPM 502 recognized the CPM Request but was unable to load the information into the CPM Info In Register because the register had not been read since the previous transmission from the CPM 500. At this point, the microprocessor 518 may attempt a retry or retries. If negated, the CPM Request was successful in transmitting recognizable from the CPM 500 to the IPM 502 and the transfer was accepted by th IPM 502. Finally, the - Status flip flop reset in the LMU control register is asserted (low) to reset the CPM Request logic for further activity.

IPM Requests cause one byte of information to be sent from a IPM 502 to the CPM 500. The CPM 500 then reports status back to specify the success or failure of the IPM Request, which may be implemented as follows. The IPM info out register is first loaded with the byte, plus parity, to be transmitted to the CPM 500. Thereafter, the IPM address out register is loaded with the IPM's 4-bit physical address, plus parity, to identify to the CPM 502 sent the data. The IPM 502 then loads its left band address register with "XXX10000" which enables the Write IPM control register signal on the next master clock rising edge. Hardware logic is then initiated by the IPM control register being written with "01000000" which asserts the IPM Request signal. Bus arbitration, by the IPM 502, begins with the assertion of the physical address request enable signal for a minimum of one 4 megahertz clock signal, which if arbitration is successful, will result in Bus Grant being asserted to enable the output of data from the IPM 502. If arbitration is not immediately successful, the PAR REQ EN signal will remain asserted until the bus is read or the IPM MPU stops the IPM Request operation.

The address out and info out registers are next output onto the LMU bus 504 as the - IPM Request signal output to the bus is negated. Then, the CPM 500 loads the data from the LMU bus 504 into its info and address in registers. The CPM 500 sets the status bits - ACK n-Module Busy. ACK is asserted if the CPM 500 detected good parity in the data transmitted to it from the IPM 502. - Module Busy is asserted if the CPM info in and address in registers have not been read/cleared since the last IPM Request. The IPM 502 subsequently checks the - Acknowledge signal, and if negated (high) a Not Acknowledge interrupt is generated in the IPM MPU indicating that the CPM 500 was unable to receive the data because it didn't see the IPM Request signal or that the data that was received had bad parity. Module Busy In may then be loaded by the IPM 502 into the IPM status register. If asserted, this indicates that the CPM 500 successfully received the data but was unable to load its info and address in registers with the data. If negated, the CPM 500 successfully received and loaded the data transmitted during the IPM Request. After the IPM Request is completed, the CPM 500 asserts its Input Buffer Full Signal indicating that info and address and registers have data in them that has not been read. This signal must be negated by the CPM 500 after it reads its info in and address in registers. Finally, the CPM 502 resets the Bus Status flip flops to prepare for further activity.

Information Transfers are used to transfer a block of data between two LMU bus modules. The information is transferred from the output FIFO buffer of the master module to the input FIFO buffer of the slave module. Two types of FIFO transfers are possible. A IPM FIFO transfer, which transfers a block of data from the IPM 502 to the CPM 500, and a CPM FIFO transfer, which transfers a block of data from the CPM 500 to an IPM 502.

In a IPM FIFO transfer, the IPM 502 loads its output FIFO with up to 512 bytes of information. The IPM 502 then notifies the CPM 500 of the impending FIFO transfer using the IPM Request discussed herein above. The CPM 500 prepares for the transfer and notifies the IPM 502 when it is ready to receive the data. By software command, the IPM MPU addresses "XXX10000" to select the IPM control register. Afterwards, the IPM control register is loaded with "10000000" to command the IPM hardware to perform the IPM FIFO transfer (i.e., data transfer asserts). At this point, the IPM MPU may perform other tasks as further intervention in the transfer process is not required. The data transfer signal asserts the physical address of the IPM 502 onto the parallel request lines (LMU bus arbitration). This will continue for a minimum of one cycle through bus grant to the completion of the transfer operation. As a result, the IPM 502 is granted the bus when the bus arbitration is successful (bus grant asserts).

On the next rising 4 megahertz clock, the IPM 502 asserts -IPM DAV on the LMU bus 504, thus notifying the CPM 500 that the transfer of byte data will begin in this cycle and continue until -IPM DAV negates (i.e., the transfer operation is complete). The IPM 502 then asserts its module onto the LMU bus 504, remaining in effect until the end of the transfer operation. Thereafter, the read strobe to the IPM output FIFO is enabled causing data to be read from the FIFO to the LMU bus 504 1 byte per clock cycle until the transfer operation is complete. The CPM input FIFO Write strobe (IF WR) strobes the data onto the CPM input FIFO from the LMU bus 504, 1 byte per clock cycle until the IPM 502 signals that the transfer operation is complete (-IPM DAV negates).

On the next clock cycle, following each byte transfer, the CPM 500 asserts the -Acknowledge signal if good parity was detected in the transfer byte and the IPM module address is transferred in the previous cycle. The IPM 502 will interrupt if -ACK is not asserted. The IFO transfer will continue to completion regardless of a parity error. When the IPM output FIFO empties (transfer operation complete) - IPM DAV will negate on the next rising clock causing the data transmission to stop. The IPM module address is removed from the LMU bus 504, bus arbitration is allowed for other modules, the CPM 500 stops writing data into its input FIFO, and the CPM 500 disables its status outputs (-ACK) on the next rising clock. This completes the IPM FIFO transfer operation, and the LMU bus 504 is free for other traffic. The microprocessor 518 sees that the CPM input FIFO is not empty, and will initiate DMA transfer from the input FIFO to the CPM memory.

For a CPM FIFO transfer, the CPM 500 first loads its output FIFO with up to 512 bytes of information using the microprocessor 518. Thereafter, the CPM 500 notifies the IPM 502 of the impending FIFO transfer using the CPM Request, discussed herein above. The IPM 502 prepares for the transfer and notifies the CPM 500 when it is ready to receive the data. Then the microprocessor 518, by software command, addresses flip flop "0001110X" to select the LMU control register.

As the LMU control register is loaded with "10000111" to command the CPM hardware to perform CPM FIFO transfer (FIFO REQ asserted), the microprocessor 518 may perform other tasks as further intervention in the transfer process is not required. The FIFO REQ signal then asserts the physical address of the CPM 500 onto the parallel request lines (LMU bus arbitration), and continues so for a minimum of one cycle through bus grant to the completion of the transfer operation. The CPM 500 is granted the bus when the bus arbitration is successful (bus grant), and on the next rising four megahertz clock, the CPM 500 asserts -CPM VAV on the LMU bus 504 thus notifying the IPM 502 that the transfer of byte data will begin in this cycle and continue until -CPM DAV negates (i.e., the transfer operation is complete).

The CPM 500 asserts the module address of the IPM 502 onto the LMU bus 504, and remains so in affect until the end of the transfer operation. One byte of data per clock cycle is then read from the FIFO to the LMU bus 504 after the read strobe to the CPM output FIFO (-OF RD) is enabled. Such reading also continues until the transfer operation is complete. The IPM 502 that successfully compares the module address from the LMU bus 504 to its own physical address will, using the IPM input FIFO Write signal (WR FIFO IN), strobe the data into the IPM input FIFO from the LMU bus 504 one byte per clock cycle until the CPM 500 signals that the transfer operation is complete (-CPM DAV negates).

On the next clock cycle following each byte transfer, the IPM 502 asserts the -Acknowledge signal if good parity was detected in the transfer byte and the IPM module address was transferred in the previous cycle. If none of the IPMs 502 successfully compare the module address to their own physical address -ACK will not be asserted. The CPM 500 will interrupt if -ACK is not asserted, and the FIFO transfer will continue to completion regardless of the -ACK interrupt. When the CPM output FIFO empties (transfer operation complete) -CPM DAV will negate on the next rising clock. This causes the data transmission to stop, the IPM module address is removed from the LMU bus, bus arbitration is allowed for other modules, the IPM 502 stops writing data into its input FIFO, and the IPM 502 disables its status output (-ACK) on the next rising clock. This completes the CPM FIFO transfer operation, and the LMU bus 504 is free for other traffic. The IPM MPU sees that the IPM input FIFO is not empty and will initiate a transfer of the data from the input FIFO to the IPM memory.

All signals on the LMU bus are conventional TTL signals. When the bus is in a quiescent state, termination pulls all signals high. Arbitration cycle signals are comprised generally of a parallel request and a bus busy. The parallel request includes four open collector signals which carry the binary waited request to all modules on the LMU bus 504. A module desiring bus master status, asserts its physical address onto the parallel request lines during the arbitration cycle. The wire AND result of these lines is then compared to the physical address of the module and, if the comparison proves valid, that module becomes the bus master. The bus busy arbitration cycle signal is an open collector signal which indicates that a module is using the bus for more than one transfer cycle (FIFO transfers). Bus busy is negated at the beginning of the last transfer cycle of a transaction to allow arbitration to be completed prior to the next available transfer cycle.

Transfer cycle signals, on the other hand, are comprised generally of four types: (1) information transfer, (2) information transfer parity, (3) module address, and (4) module address parity. The information transfer signals include eight, bidirectional tristate signals used to transferring information between modules, while the information transfer parity signal is a tristate parity signal for the byte of data sent by the information transfer lines, odd parity being used and examined for every transfer cycle. The module address signals comprised four bits used to note by the CPM 500 of the address of the interrupting IPM 502 or to notify a IPM 502 that the current LMU bus transaction is for that particular IPM 502. This address must match the physical address. It should be noted at this juncture that module address parity signal is odd parity for the whole byte written into the address out register.

Two types of status signals are utilized according to the present invention. That is, an acknowledge (ACK) signal indicates that a transfer was received with good parity. The slave module always returns status to the master module for out bottom transfers. If that parity is detected, the ACK signal is not asserted. The other type of status signal is a module busy signal which indicates that a transfer was not accepted since the destination input buffer was full and the information could not be accepted.

General control signals consist essentially of four megahertz system clocks, eight megahertz system clocks, physical address signals, the CPM Request, the IPM Request, IPM data available, CPM data available, and a master reset signal. Both system clock signals originate on the IPM, and are distributed evenly on the back plane. The physical address signals define the back plane slot address within the unit of with the installed module providing the pull up for all physical address signals. As discussed herein above, the CPM Request signal indicates that the CPM 500 is sending one byte of information to the IPM 502 along with the address of a IPM 502. Likewise, the IPM Request signal indicates that the IPM 502 is sending one byte of information to the CPM 500 along with the address of the IPM 502, to indicate the source of the interrupt. The IPM data available (IPM DAV) signal indicates that valid information is being transferred from the IPM 502 to the CPM 500 on the LMU bus 504 during a FIFO transfer operation. A maximum of 512 bytes of data can be transferred in one transaction, with the data being directed to the input FIFO of the destination module. As long as this signal is asserted, a new byte of information is available for each megahertz clock cycle. In a similar manner, the CPM data available (CPM DAV) signal indicates that valid information is being transferred from the CPM 500 to the IPM 502 on the LMU bus 504 during a FIFO transfer operation. Driven from the CPM 500, the master reset resets all IPMs 502 in the LMU 106. This signal is asserted when a power up reset or the programmable IPM reset in the CPM 500 is asserted.

As explained herein above with reference to FIG. 23, the IPM 502 provides attachment to the LMU bus 504, a IBM 3270 compatible device (through a 3274/6 host computer terminal controller 104), and the LMU auxiliary bus 506. The IPM 502 has access to three external interfaces: (1) the LMU bus interface 524a, (2) the auxiliary bus interface, and (3) a 3270 communications interface 600. The LMU bus interface 524a provides the IPM 502 with capability of communicating with the CPM 500 over the LMU bus 504. On the other hand, the auxiliary bus interface provides the IPM 502 with the capability of communicating with the CPM 500 on the low band with serial auxiliary bus 506. This bus is used during initialization and diagnostics and is not used for functional operation. As such, the IPM 502 is a slave on this bus and cannot initiate communication until use is granted by the CPM 500. The 3270 communications interface 600 provides the IPM 502 with the capability of interfacing to the host computer 108 through an IBM compatible 3270 terminal controller. The IPM thus emulates a terminal in order to attach to a terminal controller.

Various diagnostic functions are available as part of the IPM 502 hardware. For example, a IPM LMU bus buffer wrap allows the IPM 502 to transmit a request command from its LMU bus info out register to its LMU bus info in register. For this operation to work properly, the CPM LMU bus interface 524a must be disabled and the IPM LMU bus interface must be enabled. The destination address transmitted must be the address of the IPM 502. A IPM LMU bus FIFO wrap allows the IPM 502 to transmit data from the FIFO out to FIFI in. For this operation to work properly, the IPM LMU bus interface must be disabled. Data from the 3270 transmitter may be wrapped to the 3270 receiver through a 3270 interface wrap. Bad parity can be forced into the FIFO out or info out registers by asserting the force bad parity bit in the IPM control register. This will result in a parity error being detected when reading FIFO end or info in after a wrap operation is completed. Furthermore, a 3270 receiver parity error detector can be checked by writing status that contains bad parity in the parity bit location for the first eight bits. After the status is written, a 3270 interface wrap is executed and the status is read as data from the 3270 receiver. A parity error will occur.

Figure 27:
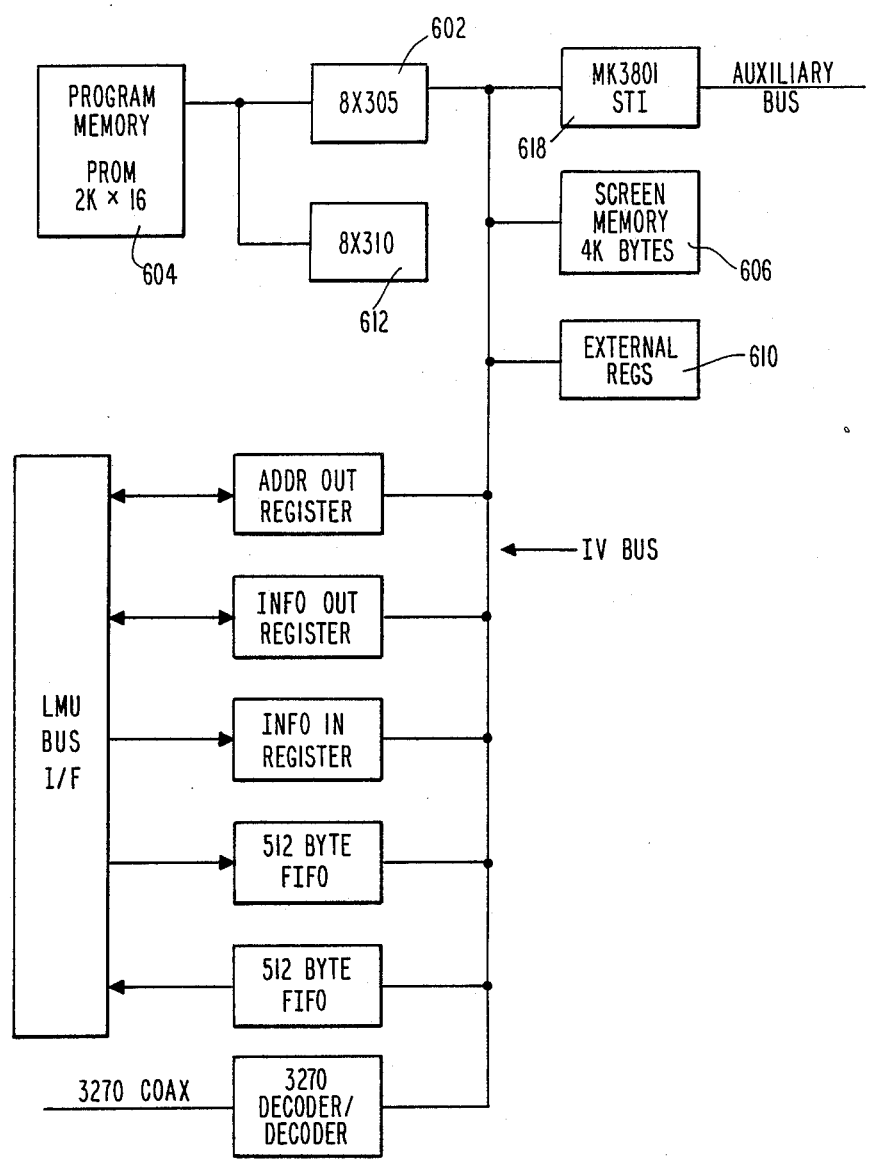
FIG. 27 is a block diagram of an interface processor according to the present invention.

Referring now to FIG. 27, a block diagram of the interface processor which handles all communication between the host computer terminal controller 104 and the CPM 500 will be shown. At the heart of the IPM 502 is an 8×305 microprocessor 602. The microprocessor 602 initializes and controls all function within the interface, and transfers information between the 3270 interface and screen memory. Such a microprocessor 602 provides direct addressing of program memory, paged addressing of data memory, direct addressing of external registers, an eight-bit data path, and an instruction execution rate of four megahertz. The interface vector bus (IV bus) is internal to the IPM 502 and consists of those signals necessary to transmit data between the microprocessor 602 and other logic on the IPM 502. Program memory consists of a PROM 604 that retains its contents when powered off. The PROM 604 may be suitably implemented using 2K×8 programmable read only memories to provide a word-wide memory. Parity is not used, but the PROM content can be verified by a check some over its entire contents. Screen memory 606 may be implemented using 4K×4 for static random access memories to provide a byte-wide memory, and is used to store information about the terminal screen being emulated by the IPM 502. Screen memory 606 is on the IV bus, and since that bus can only address 256 bytes, a page register 610K is used to allow access to all four kilobytes of screen memory. IPM external registers 610 are addressed with input/output addresses, and are shown in FIG. 28. Parity is only checked when reading the 3270 receiver data 610e, FIFO in 610g, and IPM bus info in 610c external registers.

The IPM 502 is reset by asserting either power up reset or IPM reset. Either reset being asserted initializes the microprocessor 602 and resets all interfaces on the IPM 502. FIG. 41 also indicates which registers are reset by -RESET. The microprocessor 602 is initialized by forcing it to begin program execution at program memory location 0000.

An 8X310 interrupt coprocessor 612 is utilized in conjunction with the microprocessor 602, and allows the processing of three levels of interrupts. A level 1 interrupt is used to alert the microprocessor 602 of a data byte at the 3270 receiver. level 2 interrupts are reserved for future use. The lowest priority interrupts, level 3 interrupts, are used to indicate a group of interrupts available through the interrupt controller in the MK3801 614. As shown in FIG. 29, level 3 interrupts includes 16 different interrupts ranked in priority from highest to lowest.

The IPM external registers 610 are used to identify and indicate various conditions within the LMU 106. For example, as shown in FIG. 30a, a physical address register 610a is used to identify the physical position of a module in the LMU 106. Status of logic on the IPM 502 is identified in an IPM status register 610b (FIG. 30b). A LMU bus in register 616c contains a byte of data received over the LMU bus 504 when CPM Request is asserted. The byte of data accessed from the MK 3801 STI is contained with a STI data register 616d which must be accessed from the STI for the register 616d contains valid data. Either data received over the 3270 serial port or status collected internally by the 3270 receiver is contained within a 3270 receiver data register 616e. The data that is accessed is determined by the 3270 stat/data cell bit in the 3270 control register.

Referring now to FIG. 30c a 3270 external status register 610f is shown. When bit 7 is asserted, the 3270 byte of data previously read was a command byte. On the other hand, when bit 7 is negated, the 3270 byte of data previously read was a data byte. This bit must be examined after each data byte is read from the 3270 receiver. When bit 6 is asserted, the 3270 is receiving data from the serial port. This means that the receiver has detected a valid start sequence and has not received a valid ending sequence. All information between the start and ending sequences is treated as valid data unless an error is detected. Bit 5, when asserted, is indicative of the 3270 receiver having detected an error during the reception of data from the serial port. Bit 4 indicates that the transmitter cannot accept another byte of data until the current byte is transmitted, and bit 3 indicates that the transmitter is ready for, or is in the process of, transmitting data on the serial port. When asserted, bit 2 indicates a data byte is in the 3270 receiver holding register, and the assertion of bit 1 indicates a parity error was detected when data was read from the 3270 receiver holding register.

At the output stage of the input FIFO is a FIFO in register 610g. Each time a byte of data is read from the register 610g, the next byte of data is presented at the output of the FIFO until such time that the FIFO is empty.

A IPH control register 610h, which contains bits that control the operation of the IPM 502 as its name implies, is shown in FIG. 30d. Bit 6, when asserted, causes bad parity to be written into the FIFO out and info out registers, when accessed. When negated, good parity is written into such registers. The IPM request wrap (bit 4) causes the next IPM Request transaction to be wrapped back to the IPM 502 as a CPM Request transaction. When asserted, bit 3 causes the next data transfer to be wrapped from the FIFO out to FIFO in.

The IPM 3270E enables/-Wrap (bit 2) when asserted causes the 3270 receiver to be enabled to detect transmission over the 8570 interface. The coax driver is also enabled to allow transmission on the coax. When this bit is negated, the 3270 transmitter and receiver are in the wrap mode. The receiver is disabled from the 3270 interface and detects data from the transmitter on the IPM 502. The transmitter will only send data to the IPM receiver and not on the coax. Bit 1 when asserted will cause the IPM 502 to assert the IPM Request signal on the LMU bus 504 during a transaction. The IPM 502 will also output a single byte of information from the LMU bus info out register along with its address. When a zero is asserted, the IPM 502 will arbitrate for the LMU bus 504 and, upon becoming bus master, will transfer data from the output FIFO to the LM bus 504 until the FIFO is empty. The output FIFO must be loaded with the data tot be transferred before the bit is sent.

Figures 30F, 31:
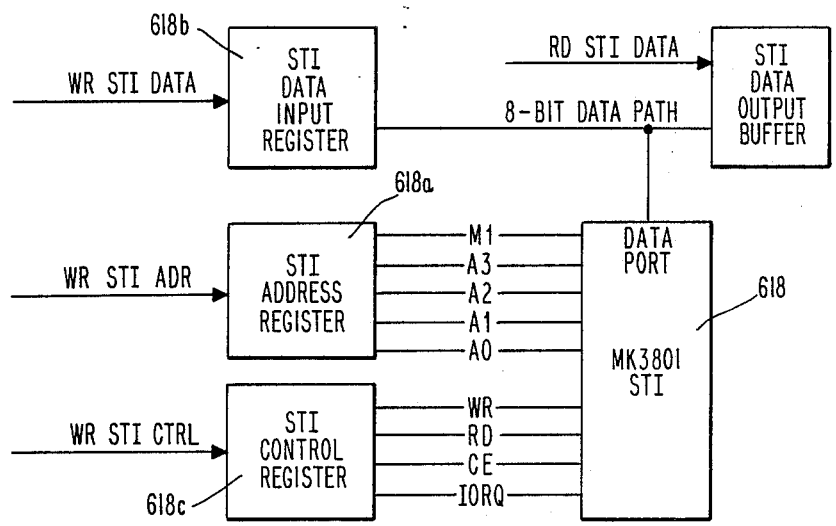
Figure 32:
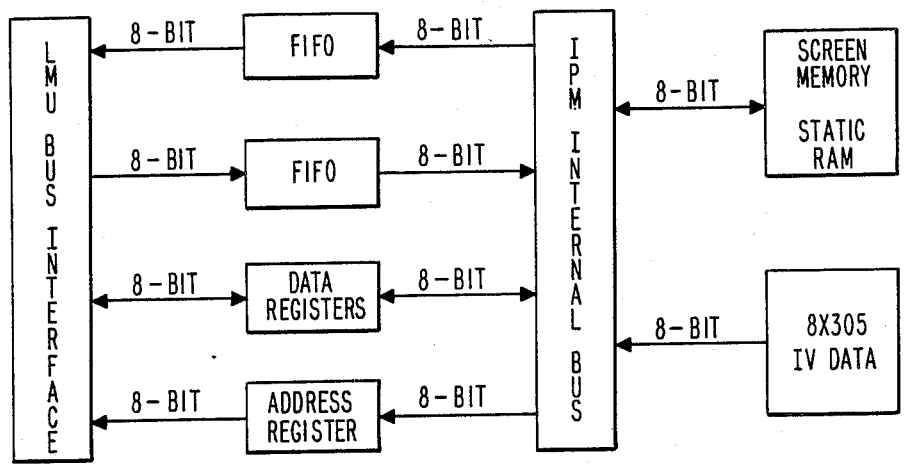
FIG. 32 illustrates an IPM interface according to the present invention.

Referring now to FIG. 30e, an IPM enable register 610i is shown. When asserted, bit 7 enables the auxiliary bus drivers. The auxiliary bus receivers are always enabled. Bit 6, when asserted, enables the LMU bus interface drivers and receivers. The IP indicators (bits 3-0) control the IP indicator light emitting diodes on the edge of the IPM board. When these bits are asserted, the light emitting diodes are turned on, and when negated turned off. An LMU bus info out register 610j may be loaded with data to be transferred to a destination on the LMU bus 504 when the IPM interrupt signal is asserted on the LMU bus 504. As shown in FIG. 30f the screened memory page register 610k selects one of 16, 256-byte pages of screen memory.

A STI address register 610m contains bits that address the internal registers of the MK 3801, selecting those registers and controlling the M1 bit. At the same time, a STI data register 610n is used to load the address register in the MK 3801 (FIG. 27), while a STI control register 610o contains bits that control the internal operations of the MK 3801 as will be explained in detail herein below. A FIFO out register 610p comprises the first stage of the output FIFO. As data is written into this register, it is stored in successive locations on the FIFO until such time that the FIFO is full. Writing to a 3270 transmitter data register 610q loads information, either data or status, into the 3270 transmitter. If data is to be loaded, the 3270 stat/data bit must be negated in the 3270 status register. If status is to be loaded, the 3270 stat/data bit must be asserted. Before status is loaded into the 3270 data register 610q, the 3270 status register must be loaded.

A 3270 control register 610r, as its name implies, contains bits that control the operation of the 3270 receiver and transmitter. When asserted, one bit of the register 610r causes the 3270 transmitter to return clean status on the serial link without loading any other registers. Bit 6, when asserted, indicates that operations with the 3270 transmitter or receiver will involve status. This means that status will be written to the transmitter or read from the receiver. When this bit is negated, operations with the transmitter or receiver will involve data. Data can be written to the transmitter or read from the receiver. Bit 5 is the 3270 status bit 10 that will be written to the 3270 transmitter with a write 3270 data operation. In order to write bit 5, bit 6 must be asserted. Bit 4 is the 3270 status bit 11 that will be written to the 3270 transmitter with a write 3270 data operation. As in bit 5, bit 6 must be asserted to write bit 4.

Two pseudo registers may also be used. A reset parity error register 610s, when written to, resets the FIFO in, bus in, and 3270 parity error flags. No data is required during the write register 610s. The reset bus status register 610t is a pseudo register that, when written, resets the error flags for LMU bus NACK, module busy, and LMU bus parity error. Like the reset parity error register 610s, no data is required during the write to the reset bus status register 610t.

In order to provide the IPM 502 with additional interrupt handling and timers 506, a serial time interrupt (STI) controller such as the model MK3801 manufactured by Mostek is implemented with the IMP 502 of the present invention. With reference now to FIG. 31 which shows a block diagram of the STI controller 618, the following examples depict the necessary sequencing for use of the STI controller 618. In order to write to an STI internal register, the STI address register 618a must be loaded with the address of the desired internal register. Thereafter, the STI data register 618b is loaded with data to be loaded into the internal register. A STI control register 618c subsequently asserts then negates WR and CE signals to the STI controller 618. The STI 618 must have the WR and CE signals negated at least two cycles between successive operations.

In order to read a STI internal register, the STI address register 618a is loaded with the address of the desired internal register. Then the STI control register 618c asserts RD and CE, STI data is read from a STI read buffer 618d, and the RD and CE signals are negated in the STI control register 618c.

The IPM interface 620 to the LMU bus 504, as shown in FIG. 30 allows full access and use of the entire LMU bus 504 which provides a communication path between the CPM 500 and the IPM 502.

The LMU operator's panel, as shown in FIG. 33, provides switches and indicators to control and observe the operation of the LMU 102. The operator's panel contains functions exposed to the operator, and functions behind the covert available to a field engineer, and is controlled by the CPM 500 through the operator's panel interface 524f. Operator accessible functions include a DC power on/off switch 622 comprising an alternate actions which, when depressed on one side, closes DC power to be applied to LMU 102, and who moves such power when to press to the other side. DC power on/off indicator 624 eliminates when DC power is on, and is extinguished when power is off. The IPL complete indicator 626 is a light emitting diode which eliminates to indicate that the initial program load process has been completed. A light emitting diode indicator is also used as a LMU check 628 which, when eliminated, indicates the occurrence of a hardware detected error. A 4-character, alpha numeric display 630 contains additional information as to the nature of the error, and is used to indicate error codes used in utilizing in analyzing the state of the LMU 102. Field engineering access all functions include a conventional RS-232C connector for attachment of a maintenance device, the CPM resets which, and the CPM IPL switch.

A non-volatile random access memory (NVRAM) may be installed on each field replaceable unit to allow the microprocessor 518 to access information on any field replaceable unit within the LMU 106. The NVRAM can store 16-words of information, with each word 16-bits in length. A 4-word interface, from the CPM 500 to all field replaceable unit ID MVRAM s allows the microprocessor 518 to access the information. MFRU clock signal from the CPM FRU ID register controls the clocking of the data to or from each MVRAM. Data in and data out signals carry data respectively from the CPM FRU ID register to the MVRAM and from the MVRAM to the CPM status register. A separate select signal for each MVRAM, originated from the CPM FRU ID register, selects a particular MVRAM when asserted for communication with the microprocessor 518.

Having described the LMU 106 in some detail, the following will explain the requirements for interfaces within the LSM 108, the LMU 106, its associated software, and operating procedures. As explained herein above, the REI 156 is the communications path between the LCU 109 and the electronics which are mounted on the arm assembly portion 138. This path must provide a means of reading and writing of registers on the arm electronics, transfer of camera data, and power to the arm electronics. Three basic signal connections for the REI 156 comprise a parallel command signal, a camera DMA signal, and a reset signal. The parallel command signal is the read/write communication path between the LCU 109 and the arm assembly portion 138. The serial command signal path initiates the transfer of data from the camera 310, the path from which the camera data takes from the arm assembly portion 138 to the LCU 154 comprising the camera DMA signal. The reset signal is a hardwired connection between the LCU 154 and all electronics on the arm assembly portion 138. When active, all arm electronics will be sent to a known state and a dynamic brake relay 630 will stop all motion. Power is still applied to the arm electronics when reset is active. The reset signal is set and reset by the microprocessor 618. If the REI reset signal path is broken, the arm electronics will be reset and a status bit sent to indicate a broken connection.

A detached diagnostics device 632 can be attached to the LSM diagnostic port which may be suitably comprised of a conventional RS-232 port. Diagnostics can thereafter be performed on any LSM 108, not just the LSM 108 to which the detached diagnostics device 632 is attached. Software contained with the LCU 109 for, as will be explained herein below, converts the RS-232 message into the appropriate LSM message. The LMU 106 then sends the executable diagnostic to the specify LSM 108, and sends any screen responses to the LSM 108 to which the detached diagnostics device 632 is attached. The detached diagnostics device 632 must be used to place the LSM 108 in a maintenance mode which requires the LSM 108 to be off line from the host computer 108, before diagnostics may be run.

A camera DMA interface 634 may be suitably used to provide a dedicated serial link between the LCU CDI logic 636 and the wrist CDI logic 638. Data received from the camera array 310 is the only information transferred across this link, always going from the wrist CDI logic 638 to the LCU CDI logic 636 over the REI serial command path.

Functional operation of the LSM 108 and optimization programs which reside in the LMU 106 necessitate the use of a tape unit interface. Commands from the LCU 109 to the tape unit 152, as follows, are at least transferred across the tape unit
TU REWIND/UNLOAD
RESET TAPE DRIVE
HOLD OFF LOAD
RESET HOLD OFF LOAD
SENSE
BLANK DISPLAY
Also transferred across the tape unit interface are at least the following tape unit status indications:
TD ACCEPTED THE LIBRARY COMMAND
TD REWINDING
CARTRIDGE PRESENT
CARTRIDGE LOADED
TD READY
TD READY SWITCH
OFF LINE
ESTIMATED TIME TO UNLOAD
CARTRIDGE TRAY UP
CARTRIDGE TRAY DOWN
MACHINE CHECK
LOAD CHECK
CLEANING NEEDED
MANUAL INTERVENTION REQUIRED Four other interfaces are required to complete communication among the ACS 100: (1) an LSM operator panel interface 642, (2) a cartridge access port interface 644, (3) a power supply interface 646, and (4) a theta arm interface 648. The LSM operator panel interface 642 is required for operator communication with the LSM 108, the protocol for which is a subset processor data bus interface 636 consisting of data/address bits and minimal control lines. The cartridge access port interface 644 is required for LCU communication with the cartridge access ports. Protocol for the cartridge access port interface 644 is also a subset of the processor data bus interface 636 consisting of data/address bus bits and minimal control lines for support of multiple cartridge access port configurations. Early power failure warning and power supply margining are provided across the power supply interface 646. As in the LSM operator panel interface 642 and the cartridge access port interface 644, the protocol for the power supply interface 646 is a subset of the processor data but interface 636 consisting of data/address bus bits and minimal control lines. Finally, the theta arm interface 648 provides the means by which the LCU 109 can deliver commands for movement of the theta arm 142.

Interface requirements between the host computer 102 and the remainder of the ACS 100, through the LMU 106 will now be described. The LMU 106 communicates with the host computer 102 by attaching to a conventional terminal control unit 104 and emulating a 3270 type terminal. The LMU 106 is, therefore, capable of supporting attachment to IBM 3270 for control unit models 21B, 21D, and 31D, which in turn support 360/370 channel attachment.

Figure 34:
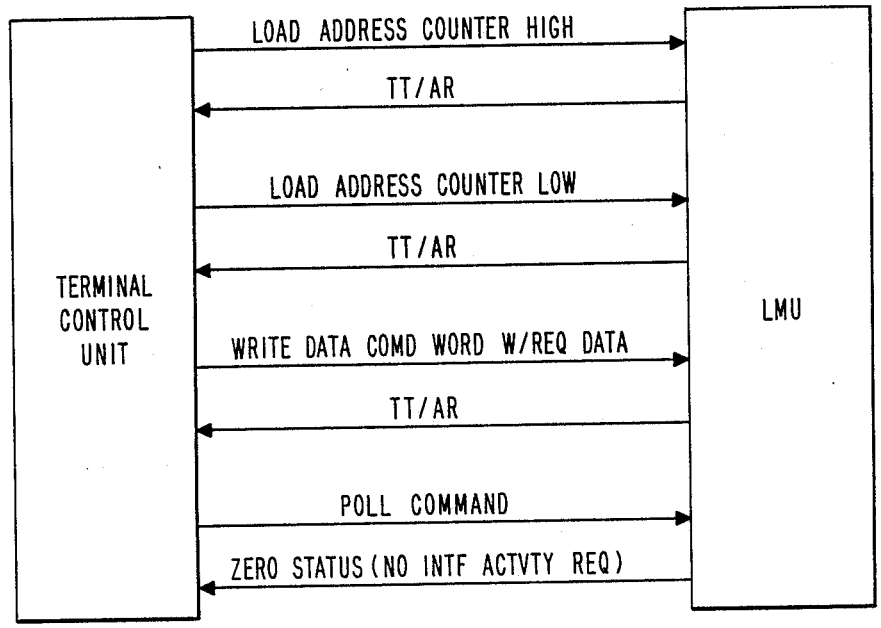
FIG. 34 illustrates transfer of data from a terminal control unit to the LMU.

Transfer of data from the terminal control unit 104 to the LMU 106 begins with the terminal control unit 104 issuing a "load address counter high and low" command as shown in FIG. 34. All commands received a transmission turn around/auto response (TT/AR) indicating receipt of the data without error. The screen address set in the load address counter high and low must be row zero at column zero, thus providing a consistent address and allowing the LMU 106 to ignore local control unit to terminal writes. The actual request data is transferred with the "write data" command.

Figure 35:
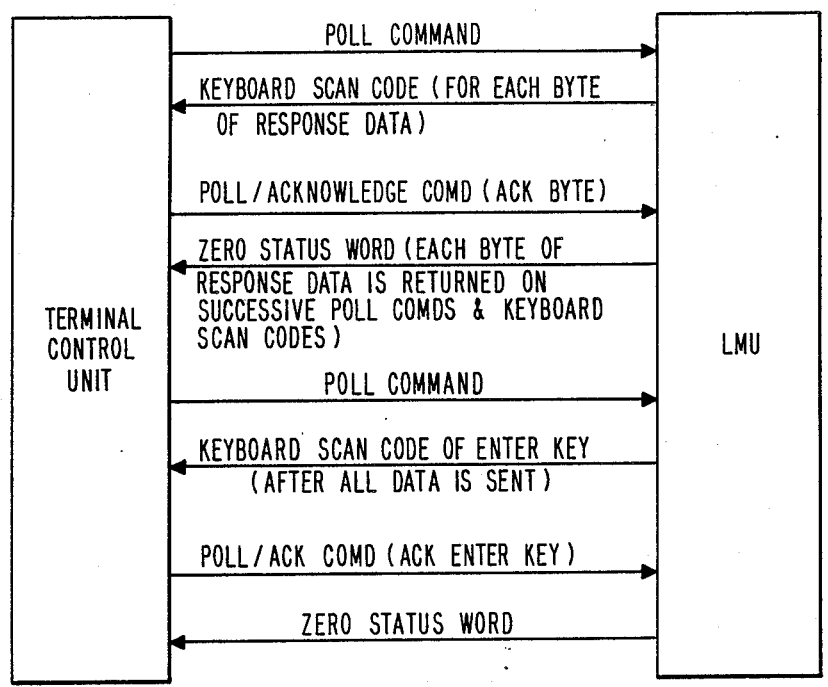
FIG. 35 illustrates further transfer of data between terminal control unit and LMU.

Data is transferred to the terminal control unit by emulating successive keyboard strokes with an "enter" key at the end as shown in FIG. 35. The poll command is used to retrieve each data byte and the poll/acknowledge command is used to acknowledge each byte.

The host to LMU protocol is used for content or informational transfer between the host computer 102 and the LMU 106. With such protocol, the host computer 102 initiates action of the LMU 106, and the LMU 106 returns status back to the host computer 102. This host to LMU protocol assumes the basic means of data transfer is accomplished by the 3274 LMU protocol.

Basic transmission types are requests, response, and messages, plus message acknowledgments and error responses. A transaction consists generally of a start of transaction, the length count, the sequence number, the transaction type, the actual data, and an end of transaction. Requests are used by the host computer 102 to initiate action within the LMU 106. The request data contains a unique request code and any additional parameters needed to specify the host request. Responses are returned to the host computer 102 as a reply to a host request. They contain a unique response code that correlates back to the request, and any additional required data. An intermediate response type indicates that a portion of the host request has been satisfied but that additional responses will be returned for that request. A final response type indicates that the request is finished and no further responses will be returned. The sequence number, contained in the response transactions, is always identical to the sequence number contained in the original request transaction.

For a request failure, an error response is returned to the host computer 102 instead of the normal response. This response contains the sequence number of the original request, and no further responses are returned on the request. The error response contains enough information to assist in isolating a failing field replaceable unit for hard errors, and may also assist in host software error recovery procedures.

Messages are unsolicited transmissions from the LMU 106 to the host computer 102. Messages contain a unique message code identifier, and indicate asynchronous events occurring within the ACS 100. Messages are comprised generally of two basic types: (1) a message ACK required, and (2) a no message ACK required. Messages of the "message ACK required" type are retained in the LMU 102 until a message ACK transaction is returned to the LMU 102 from at least one interface. If an interface is broken, an initial attempt will not be made to send the message to that interface. If all interfaces are down, the LMU 106 will retain the message until it can be sent and acknowledged across a working interface. Messages of the "no message ACK required" type require no acknowledgment from a host computer 102. The LMU 106 attempts to send messages to all working interfaces. If an interface is broken, the message is discarded for that interface. A message acknowledgment is sent from the host computer 102 to the LMU 106 to indicate that the message has been received by the host computer 102. As discussed herein above, the sequence number contained in the transaction is that of the original message.

If the LMU 106 has multiple requests active at any given time, they will not necessarily be executed in the order received. Due to internal optimization and resource contention, the order of execution may vary. If the order of execution is critical, the host computer 102 must wait for completion of one request before issuing another.

In general, requests are retried internally in the LMU 102 before returning the error response. If the host computer 108 desires to retry the request, it does so by reissuing the prior request that failed. The number of retries is not limited by the interface, but is determined by the error recovery procedures if the host computer 108 receives a response containing an error, it can reissue the original request for retry. In the event that a host computer 102 desires to assume responsibility for another host computer 102 (cross-host recovery), a "assume alternate host communication" request can be issued to assume the activity of the other host computer 102. Any outstanding activity can then be continued with the assuming host computer 102. The host computer interface 650 supports controlling the state of an LSM 108 in one of two defined states: (1) off line, and (2) on line. In the off line state, the host computer 102 is not allowed to issue any requests to that component except for a request to change the state to on line. The host computer 108, in the on line state, is allowed to issue any valid request to the component.

A state change made from one host computer 102 is reflected on all host computers 102. The state of an LSM 108 never varies from one host computer 102 to another. In general, if an LSM 108 is off line, all normal requests will be rejected. Communications between the host computer 102 and the LMU 106 relating to the change of state of an LSM 108 are of two types. A "vary LSM request" contains a LSM ID, and modifier which may be issued and accepted regardless of the current LSM state. Modifiers consist of "on line" which requests a transition to the on line state, "off line" which requests a transition to pending off line if requests are outstanding on the LSM 108, and "off line force" which requests a transition to off line immediately without regard to any outstanding requests on the LSM 108. With the "on line" modifier, the LSM 104 will go on line only if it is available for functional operation. The "off line" modifier can cause a transition to off line if no requests on the LSM 108 are outstanding. Once in a pending off line state, the LSM 108 goes to off line when all requests are completed. When off line, all mechanical motion in the LSM 104 it is stopped. If a "vary LSM request --on line" is received before the outstanding requests are completed, the latter requests takes precedents and the LSM 104 goes back on line. With the "off line force" modifier, any outstanding requests for the LSM 108 are not preserved.

A "vary LSM response" is returned when the LSM 108 goes to the on line or off line pending, or off line state. The current state is returned to the host computer 102. If another "vary LSM request" is issued before a previous "vary LSM request" has returned its response, the prior request still returns a response (with the original sequence number), but indicates that the request was overridden. If a cartridge access port request is still outstanding, the LSM 108 will not go off line in response to a "vary LSM --off line" request. The enter or eject state of the LSM 108 can be ascertained by issuing the LSM status request. If an LSM 108 enters the off line state, any previously existing cartridge access port reservations are released.

The following describes the communications required for movement of cartridges within the ACS 100. A "mount" request contains a modifier byte, VOLSER, source cell address and LSM ID, the destination drive ID and LSM ID which are used by the LMU 102 to take a tape cartridge 286 from a cell and mount the tape on a drive 150. The modifier indicates that the visual cartridge label compares to the VOLSER, verifies that the label cannot be read, that a label check is to be completely bypass, or that only a recovery cartridge number is specified. With the second and third options, above, no attempt is made to compare the VOLSER characters with the actual label on the cartridge, the VOLSER characters being retained internally as a token for recovery purposes only. Use of the last option means that a recovery cartridge number is contained in the VOLSER field. The source modifier specifies that either a normal cell source is specified, or that the source is an "in-transit" location due to a prior failure. In response to a "mount" request, a mount response acknowledges when the cartridge 286 has been mounted and readied on the drive 150. The number of LSMs 108, used in the cartridge move, (excluding the source LSM), is returned in the response. This request can be issued while a single dismount for the same drive 150 is pending to complete a prior rewind and unload. Recovery of any cartridge movement is possible by using any move request in conjunction with a read transition cartridge request. Host recovery is required when either a major LMU or LSM failure occurs. When an LMU ready message is returned, it indicates that LMU 102 has just powered or received a reset and host recovery is required. When an LSM not ready message is returned, followed by an LSM ready message, host recovery is also required.

Figures 36C, 36D:
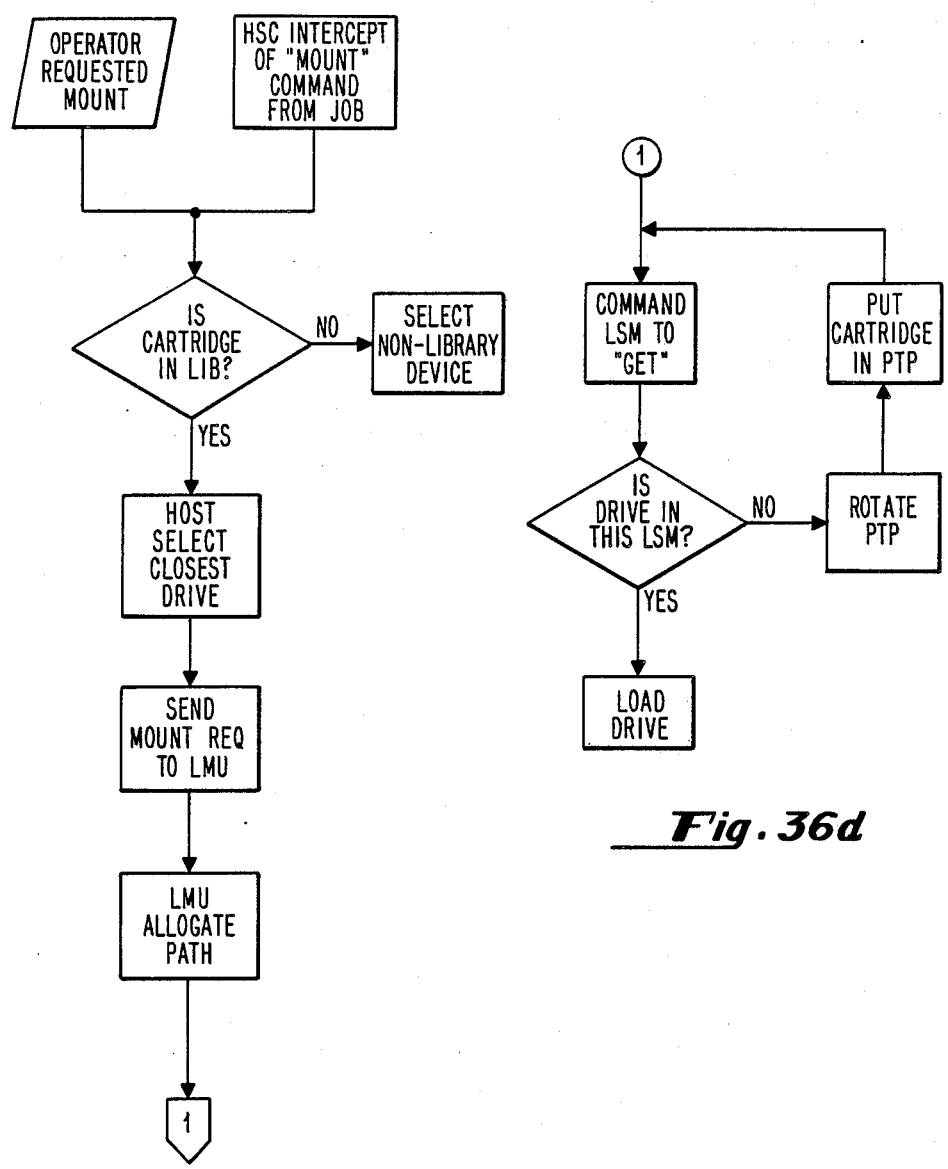

The host computer 102, detecting that cartridge recovery is required, issues a read transition cartridges request. This returns a list of cartridges in an "in-transit" location, which could be passed through ports or hands. A mount, dismount, swap, or move request can then be issued against this list of cartridges. For all "in-transit" cartridges, the source modifier should be sent to "in transit". For cartridges that had a readable VOLSER, the "verify VOLSER label" modifier should be specified for cartridges in which the label was unreadable, and the token volser was retained and returned under the read transition cartridges request, either the bypass label or verify unlabeled option can be used. All other cartridges, for which no VOLSER data is available, must use the recovery cartridge number modifier. The LMU 106 will correlate the recovery move requests with an internally maintained cartridge list to identify the correct cartridge for movement. FIGS. 36a and 36b illustrate, respectively, a mount request and a mount response while FIGS. 36c and 36d is a flow chart of the actions taken by the ACS 100.

Referring now to FIG. 37a and 37b, communications required to dismount a cartridge will be described. A "dismount" request, contains a label modifier, a source modifier, volser, source drive ID and LSM ID, the destination cell address and LSM ID which are used by the LMU 106 to remove a tape cartridge 286 from a drive 150 and move it to a cell 132. The label modifier and source modifier are described herein above with reference to the mount section. A "dismount" request issues a rewind and unload the drive 150 only if instructed by the host software. In response to the "dismount" request, a "dismount" response acknowledges when the cartridge 286 has been dismounted and moved to the destination cell 132. The number of LSMs 108, used in the cartridge move (excluding the source LSM), is returned in the response.

Figure 38C:
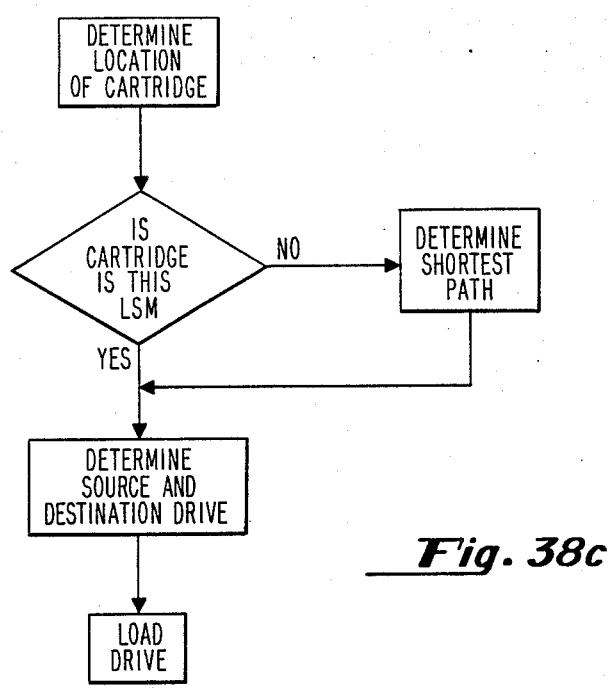

"Swap" requests and responses, that is communications required to move a cartridge from one drive 150 to another, will now be described with reference to FIG. 38a and 38b. A "swap" request contains a label modifier, source modifier, VOLSER, source drive ID and LSM ID, and the destination drive ID and LSM ID. The "swap" request moves a tape cartridge 286 from one tape drive 150 directly to another tape drive 150, issuing, a rewind and unload to the drive 150 only if instructed by the host software. In response to the "swap", the "swap" response is returned when the cartridge 286 has been mounted on the destination drive 150. The number of LSMs 108, used in the cartridge move (excluding the source LSM) is returned in the response. A flow chart of the actions taken by the ACS 100 is shown in FIG. 38c.

Figure 39C:
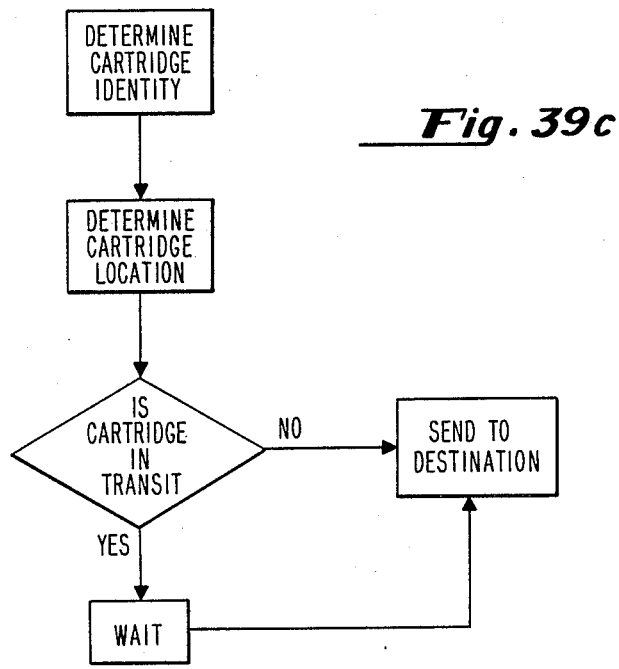

In order to change cell locations of a cartridge 286, a "move" request is used. As shown in FIGS. 39a and 39b, the request moves cartridges between ordinary cells 132 and cartridge access ports, with movements to or from the cartridge access port only being done when the enter or eject mode is active on the same host computer 108. The "move" request contains a label modifier, source modifier, a VOLSER, source cell address and LSM ID, and a destination cell address and LSM ID. In response thereto, the "move" response is returned when the cartridge 286 has been moved to the destination cell 132. The number of LSMs 108, used in the cartridge move (excluding the source LSM), is returned in the response. A flow chart of the actions taken by the ACS 100 is shown in FIG. 39c.

As previously described, the cartridge access port consists of a cell array of a plurality of cell locations that are directly accessible to the robotic means 140. Additionally, the operator has access to such cartridge cells via the access door that on the outside of the LSM 108. The cartridge access port is capable of excluding access by the robotic means 140 when the operator is accessing the cartridges and vice versa. The following describes the interface of entering and ejecting cartridges with the cartridge access port.

All cartridge access port operations are bracketed with the reserve and release CAP requests. CAP reservation during a "vary LSM off line" state is described herein above with reference to the vary LSM request. A "reserve CAP request" contains the LSM ID of a specific cartridge access port, after which the cartridge access port becomes reserved to the current host computer 102 for enter or eject operations until a "release CAP request" is issued. In response thereto, a "reserve CAP response" is returned if the LMU 106 is able to establish the requested reservation. The cartridge access port must be operational and not reserved from any prior request. If another host computer 102 has the cartridge access port reserved, the ID of that host computer 102 is returned in the error response. A "release CAP request" contains the LSM ID of a specific cartridge access port, and causes the cartridge access port to become released from the current host computer 102. In response thereto, a "release CAP response" is returned when the LMU 106 ends the current reservation of the host computer 102. With one exception, no requests with the cartridge access port can be outstanding for this response to be returned. The exception is if an enter request has been issued but the cartridge access port door has not yet been open to enter any cartridges. In this specific case, the release CAP request will be honored.

Once reservation of the cartridge access port is established, either enter or eject requests can be issued. Although enter and eject requests can be mixed, it may be desirable to limit the cartridge movement to only one type at any time. The enter/eject requests and move requests that address the cartridge access port are rejected if the issuing host computer 108 does not have reservation of the cartridge access port.

Enter operations consist of the following communications. An "enter request" contains a recovery modifier and the LSM ID of the desired cartridge access port, causing the door to be unlocked and the "enter cartridges" light to be turned on. Under one recovery option, the cartridge access port door must be closed and locked in order for the request to be accepted. With the cartridge access port reserved to the host computer for such request to be accepted. The operator then can enter the cartridges 286 for which a number of responses may be made. A "CAP door opened response" is returned, as is apparent, when the cartridge access door is opened. Likewise, a "CAP door closed response" is returned when the CAP door is closed and causes the door to be automatically locked. The "enter cartridges" light is turned off at such time. Once the cartridge port door is locked, the ACS 100 proceeds to report the status of the CAP cells by using a "CAP catalog response". This response contains the status of the CAP cells of the LSM 104. For each cell, the cell status and volser (if available) are returned, with the information being returned in the same order that the cells are numbered. Cell status indicates whether a readable volser was found, and unreadable was found, or no cartridge was found. When an enter operation is prematurely terminated by a "release CAP request", a "enter operations terminated response" is returned. This can occur only when an enter request has been issued, but no door opening event has been detected.

As explained herein above, the host computer 102 moves the cartridges 286 out of the cartridge access port by using either a move or mount requests. There responses must be returned before other requests can be issued to the cartridge access port. Successive enter operations are continued by repeating the enter and move requests. If cartridges are entered that are unacceptable to the host computer 102 (i.e., unreadable), the host computer 102 can reject those cartridges 286 by foregoing the move request and issue the enter or eject requests. Once the cartridges 286 are removed, the host computer 102 can continue with normal enter operations. A flow chart of an "enter" operation is shown in FIG. 40.

Eject operations also occur within the bracketing of a reservation and consists of the following communications. An "eject request" contains a recovery modifier and the LSM ID of the desired cartridge access port. It turns on the "eject cartridges" light and enables ejection by unlocking the door. In all other aspects, this request is identical to the "enter requests". The CAP door open, the CAP door closed, and the CAP catalog responses are returned in response to the eject request, the CAP catalog response being returned to indicate that all cartridges were ejected. All cells should have a "no cartridge found" status. Cartridges that the operator inadvertently left in the cartridge access port can be ejected by reissuing the eject request.

For a major failure of the LSM 108, the host computer 102 should first issue the read transition cartridges request as required under the general cartridge recovery scenario. The host computer 102 should issue the LSM status request to determine if the cartridge access port is currently reserved. If reserved, the host computer while holding the reservation should perform the recovery. If it is desired that another host computer 102 assume CAP recovery, the assume alternate host communications request should be used. If no host reservation exists, then any host computer 102 can reserve the cartridge access port and perform recovery. The LSM status response also returns the status of the cartridge access port.

If enter or eject requests were issued with the cartridge access port door closed at the time of failure, no special recovery of those requests is needed. However, if the cartridge access port door is open, either the enter or eject request should be issued specifying the recovery option. Receiving either of the requests allows the request to be started at the point of waiting for the door to be closed. The operator can then take the appropriate action to enter or eject cartridges and then close the door CAP door closed and CAP catalog responses are returned to the host computer 102.

With the cartridge access port closed, any cartridges in transition to or from the cartridge access port can now be recovered by issuing any motion request with the recovery option. From an interface viewpoint, any normal request can now be issued to continue any other cartridge access port recovery. This should include issuing a catalog request of the cartridge access port. Any cartridges remaining in the cartridge access point should be moved into the LSM 108 via normal moves, or ejected via the eject request.

Referring now to FIGS. 41a and 41b, catalog requests and responses will be described. A "catalog request" contains an LSM ID, an option specifying to catalog either a full panel, subpanels (cells within a panel), cartridge access ports or drives, and a range specifying the beginning and ending positions. This request only initiates the cataloging of a single LSM 108.

For a full panel, a beginning and ending panel number is specified. No row or column address can be specified as the entire panel is cataloged. The catalog response for a panel proceeds sequentially across the first row from one column to the last. It then proceeds down to the next row of the panel in the same manner until all rows have been cataloged.

For the subpanel option, a cell or cells 132 within a single panel can be cataloged. The beginning address specifies the panel and the beginning and column address. The ending address specifies the ending row in column. An ending panel number is not used. The order of the catalog response is to start the beginning row, proceeding sequentially across all columns until the ending column is reached. It then proceeds down to the next row and again catalogs from the beginning to the ending column until the ending row has been cataloged. The ending column must be greater than, or equal to the beginning column.

Cartridge access port cataloging can be performed only when the CAP is reserved and the door must be closed. For drive cataloging, a simple scaler range is specified. Cataloging of the drive cartridges is limited only to cartridges that are unloaded.

In response to the "catalog request" the "catalog response", as shown in FIG. 41b contains the status of the requested cells 132 of the LSM 108. For each cell 132, the cell status and VOLSER (if available) are returned. The cell status indicates whether a readable VOLSER was found, an unreadable VOLSER was found, no cartridge was found, or no cell existed at this position. The catalog response proceeds through the specified range as described under the catalog request. All potential positions are cataloged even when occupied by cartridge access ports or pass through ports. If a major failure occurs during a "catalog request", the host computer 102 should determine what positions remained uncataloged and reissued the request with the new range.

The host computer 102 may also verify LMU/LSM configuration. A "read configuration" request initiates the configuration response, which returns the sequence number and the configuration of the ACS 100 including the types of panels within a LSM 108 and pass through port connectivity. A capability also exists to group several interfaces into one logical group, thus allowing alternate pathing when an interface fails. Such pathing is implemented by a "set host path group request" which contains a host identifier and a modifier to join, resign, or disband the current interface with the host identifier group. A "set host path group response" indicates that the LMU 106 has established the desired host path group.

Various messages, that is, transmissions to the host computer 102 that are unsolicited by a request, are also provided in accordance with one important aspect of the invention. With the exception of a "door opened" message, all messages require no acknowledgment. An "error message" contains information that describes errors within the ACS 100. It is used when an error occurs without causing a request to fail. A "host-to-host message" returns data to other host computer 102.

Other transmissions to the host computer 102 that are unsolicited communicate various equipment status. For example, a "door open message" returns the LSM ID of the door that opened. This event is preserved upon a loss of LMU of LSM power until a message acknowledgment is received. In response to the "door open message" a "door open message acknowledgment" indicates that the host computer 108 has received the "door open" message. A "door closed message" returns the LSM ID of the door that closed. No acknowledgment is necessary. A "LSM ready message" returns the LSM ID that becomes ready, indicating that the LSM 104 has been powered on, has been initialized for functional use, and is not in maintenance. This message is returned regardless of the off line/on line state. A "LSM not ready message" returns the LSM ID that becomes not ready, indicating that the LSM 104 has become inoperative. This message to is returned regardless of the off line/on line state. A "LMU ready message" returns the LMU ID that becomes ready, indicating that the LMU 102 has been powered on, has been initialized for functional use, and is not in maintenance mode.

In accordance with another important aspect of the invention, performance monitoring of the ACS 100 is possible through a "ACS statistics request" and a "ACS statistics response". The statistics once read can be reset, and include a percentage of arm utilization and pass through counts for each LSM 104. The time of day, included in the response, indicates the beginning of the monitoring (time at which statistics were reset) as per the LMU time of day clock.

Other communications between the host computer 102 and LMU 106 are used for control. For example, a "message route request" includes a message to be routed to all other host computers 102. This request relies on the configuration set up by the "set host path group request". In response to a "message route request", a "message route response" returns a list of host IDs to which the message was successfully routed.

An "assume alternate host communications request" contains an alternate host ID and allows the issuing host computer 102 to receive all messages or responses destined for another host computer 102. The alternate host ID is the one originally set from the other host computer 102 using the "set host path group request". Only the current, or queued, requests in the LMU 106 are switches to the assuming host computer 102. Any new requests issued over the other host computer 102 will have there responses return to the other host computer 102. This requests issued over the other host computer 102 will have their responses returned to the other host computer 102. This request does not cause the host interface grouping of the issuing or other host computer 102 to be changed. Additionally, any CAP reservation established to the other host computer 102 may be broken and continued on the assuming host computer 102 by such request. A "set alternate host communications response" returns data pertaining to each request that was assuming from the alternate host computer 102.

A "read transition cartridges request" specifies an LSM 108 for which recovery is required. The targeted LSM 108 must, as a condition precedent, be currently in the ready state. In response to such request, a "transition cartridges response" contains a list of cartridges that were found in transition upon a power-up of a LSM 108, LMU 106, or both. As explained herein above, a cartridge is defined to be in transition when found in the hand and finger assembly 236, or in a pass through port. For each cartridge 286, the label status and label are returned, indicating a readable label was obtained, and unreadable label was found but the token VOLSER originally issued with the request was preserved, or an unreadable label was found but no token VOLSER was preserved. In the latter case, the LMU 106 assigns a recovery cartridge number to the cartridge 286 for subsequent identification purposes. This number is then placed in the VOLSER field. Finally, requests and responses are available in accordance with the present invention to obtain the status of various portions of the LSM 108 or LMU 106.

Two levels of communication between the LMU 106 and a LSM 108 are generally utilized in accordance with the present invention. The first, microcommunications, involves the actual transmission of data without regard to its content. Checking is done at this level for clean transmission of data (e.g., parity, CRC checking) only. The meaning of the transmission is ignored. The transmission is initiated from the LMU 106 or the LSM 108 having knowledge by the recipient.

All transmissions and acknowledgements contain the following information: (1) recipient identifier, (2) sender identifier, (3) packet type, (4) sequence number, and (5) data. The sequence number is a transmission identifier generated by the originator of the transmission and is used to link the transmission with the acknowledgement. Packet types include: (a) Acknowledge good receipt, (b) No acknowledge (bad receipt), (c) Poll (from LMU), (d) Command (from LMU), (e) Response (from LSM), (f) Message (from LSM), (g) Diagnostic command (from LMU), and (h) Diagnostic response (from LSM). The data field contains specific information (microcommunications) indicating the kind of command, response or message along with any modifiers necessary. No data field is included for POLLS, ACKs or NACKS since such communications exist at the microcommunications level only.

Figure 42:
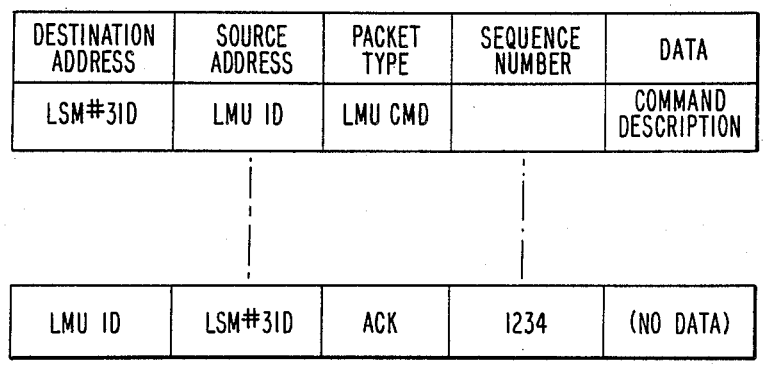
FIG. 42 illustrates transmission and acknowledgment of LMU communication.

The sender initiates the transmission and then waits for the transmission acknowledgement. In a good acknowledgement, the recipient identifier will be the same as the transmission sender identifier, the sender identifier will match the transmission recipient identifier. The sequence number will equal the transmission sequence number, and the data will be a "transmission acknowledgement". For example, a clean transmission and acknowledgement of an LMU communication might occur as shown in FIG. 42.

Several things can happen that will disrupt a good transmission sequence. For example, the recipient may receive a communication with a transmission error and respond with a transmission check. The recipient could also not see a recognizable communication. The sender could receive a communication with a transmission error or not get a recognizable acknowledgement. In order to avoid lost transmissions, or mistaking multiple occurrences of the same transmissions as separate transmissions, the following rules must be followed: All occurrences of a transmission must have the same sequence number ; a fixed maximum number of transmission re-tries will be made; and, if the sender does not receive a good transmission acknowledgement within a fixed period of time, it will re-try the transmission.

The sender may not reuse a sequence number until it has received an acknowledgement for a communication with another sequence number. If the recipient receives a communication with a transmission error, it will respond with a transmission check (No acknowledgement). Once the recipient receives a clean transmission and responds with a transmission acknowledgement, it may take action on the transmission. After the recipient sends a transmission acknowledgement, it must store the sequence number until it receives and acknowledges a transmission with another sequence number. If it gets more transmissions within that period with the same sequence number, it will respond with a transmission acknowledgement but will take no further action on that transmission.

A second level of communications between the LMU 106 and LSM 108, macrocommunications, are comprised of the content and meaning of the data transmitted by means of the microcommunications. This information is transferred in the data portion of the transmission. Generally, there are three types of macrocommunications: (1) LSM commands, (2) LSM responses, (3) LSM messages. LSM commands are commands issued by the LMU 106 to the LSM 108 in the form of immediate or functional commands. Immediate commands are distinguished from the functional commands by noting that only one functional command at a time will be processed, while more than one immediate command can be in process at a time. The command is accepted on a micro-level when the LSM 104 returns a transmission acceptance, indicating a clean reception. A second type of macrocommunications is the LSM responses. These are responses to specific a LSM commands issued by the LMU 106. They include command rejection, and command ending status responses. If the command is either illegal or not currently executable by the LSM 108, a command reject will be issued by the LSM 108. Upon completion of the command, whether successful or not, the LSM 108 will return command ending status indicating the result of the execution of the command and/or any requested information.

If the LSM 108 chooses not to accept the command, the LSM 108 will issue a command rejection. Reasons for rejection include those listed under specific commands as well as an inability to perform the command, function down-load required for the command, illegal block length, illegal parameter, or that a functional command is in progress.

Pieces of information which are transmitted from the LSM 108 to the LMU 106 without any initiating action having been taken by the LMU 106 are a third form of macrocommunications referred to as LSM messages. They generally indicate that a change in the state of the LSM 108 has occurred that is beyond the control of the LMU 106, and may be triggered by an error condition event, a marginal condition detection, or some form of manual (e.g., door open) or diagnostic (e.g., LSM disable) event.

Specific forms of LSM commands will now be considered. One form of commands comprise configure and initialize commands such as the received down-load command, initialize LSM command, and request LSM configuration command. The receive down-load command requests the LSM 108 to receive information down-loaded from the LMU 106 in packets of fixed size. A packet ID will include information specifying whether the packet is targeted for code or data memory as well as the address associated with the packet. An option is also provided for immediate execution, starting at a specified address, or acknowledgement without execution. This command may be executed only when the LSM 108 is totally idle. The initialize LSM command requests the LSM 108 to initialize the electrical and mechanical portion of the LSM 108 not initialized before the functional code down-load. This command can only be executed if the LSM 108 has been placed off-line. Initialization ending status will indicate if the LSM 108 is working properly, working in an impaired state, or unable to function. Since cartridges may have been present in either or both hands, an indication is needed of whether or not cartridges were stored. Also, any errors that may have occurred during initialization are returned.

The request LSM configuration command requests the LSM 108 to transmit its configuration to the LMU 106. The information description will define the type of panel (i.e., full-cell panel, port panel, door panel, drive panel, etc.). This command may be issued at any time after the LSM 108 has been initialized.

There are five basic commands relating to the motion of the arm assembly portion 138 and hand-and-finger assembly 236. These commands are referred to as arm-and-hand-motion commands, and are comprised generally of a move-arm-only command; move, read, and get command; move-and-put command; move-and-read VOLSER command; and go-home command.

The move-arm-only command requests the LSM 108 to move the arm assembly portion 138 from its current location to the "destination location." The destination location is a specified storage cell 132, cartridge access port cells port or drive. As part of the move-arm-only command, a move in the direction having 103 values will be specified. That is, the movement direction of the arm assembly portion 138 will be clockwise, counterclockwise, or LSM select best path.

The move, read, and get command requests the LSM 108 to move to a specified location, read the volser of the cartridge 286, extend the specified hand-and-finger assembly 236, and grasp the cartridge 286 at that location. The LSM 108 must make provision for the type of storage unit (e.g., cell drive port) to which it has moved. After the cartridge 286 has been grasped, the hand and finger assembly 236 will retract to its normal moving position.

The move-and-put command requests the LSM 108 to move to a specified location, extend the specified hand and finger assembly 236, and release the cartridge 286 it is currently holding. The LSM 108 must make provision for the type of storage unit (i.e., cell, drive, port) to which it has moved. After the cartridge 286 has been released, the hand-and-finger assembly 236 will retract to its normal moving position.

The move-and-read VOLSER command requests the LSM 108 to move to a specified location and read the volser at that location. The LSM 108 must make provision for the type of storage unit (i.e. cell, drive port) to which it has moved. The status of the read (e.g. no cartridge, good read, partial read, or bad read) and the VOLSER will be returned to the LMU 106.

The go-home command requests the LSM 108 to return the arm assembly portion 138 with hand-and-finger assembly to their "home" positions. An option will force the LSM 108 to unwrap the cable. Ending status will reflect that either, or both, contain cartridges. This command will normally be issued to the LSM 108 following a period in which the arm is idle. Once this command has been issued, the LSM 108 is free to execute internal diagnostics and/or recalibrations, during the period of time allotted to this command. Command and response with reasons for rejects and errors are illustrated for each of the above-described arm-and-hand-motion commands in FIGS. 43a–43e.

The cartridge access port is also commanded by the LMU 106. Cartridge access port commands include generally an unlock CAP door command, lock CAP door command and a set CAP mode command. The unlocked CAP door command tells the LSM 108 to unlock the cartridge access port door in the addressed LSM 108 so that operator may open it. It also indicates that all CAP door opening and closing events should be reported as messages to the LMU 102. When the CAP door is closed, the door is automatically locked and can only be opened if the CAP is in an enter or eject mode.

The set CAP mode command tells the LSM 108 which mode the cartridge access port is currently in. The cartridge access port may be in an enter mode, eject mode, or idle mode. In enter mode, cartridges 286 may be migrated into the LSM 108. In the eject mode, cartridges 286 may be removed through the cartridge access port. In the idle mode, the cartridge access port door will be locked and no operator access is permitted. The LSM 108 required knowledge of the cartridge access port status so that it may be posted on its operator panel.

Figure 44A:
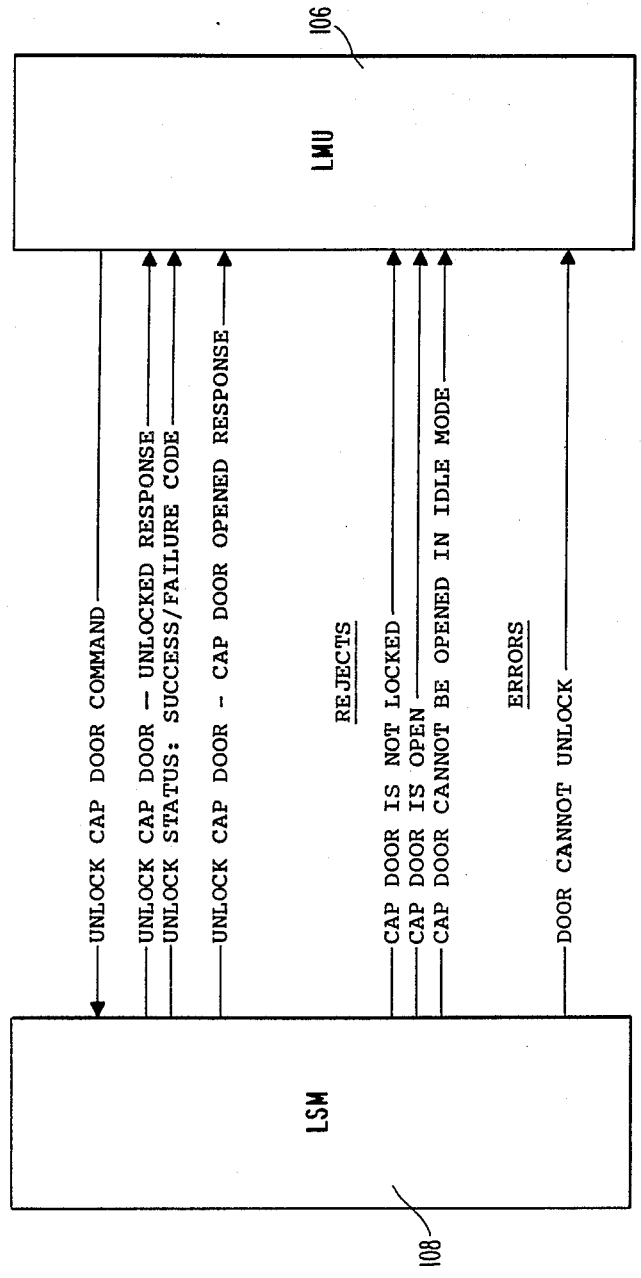
FIGS. 44a and 44b illustrate commands responses, rejects and error messages associated with the cartridge access port.
Figure 44B:
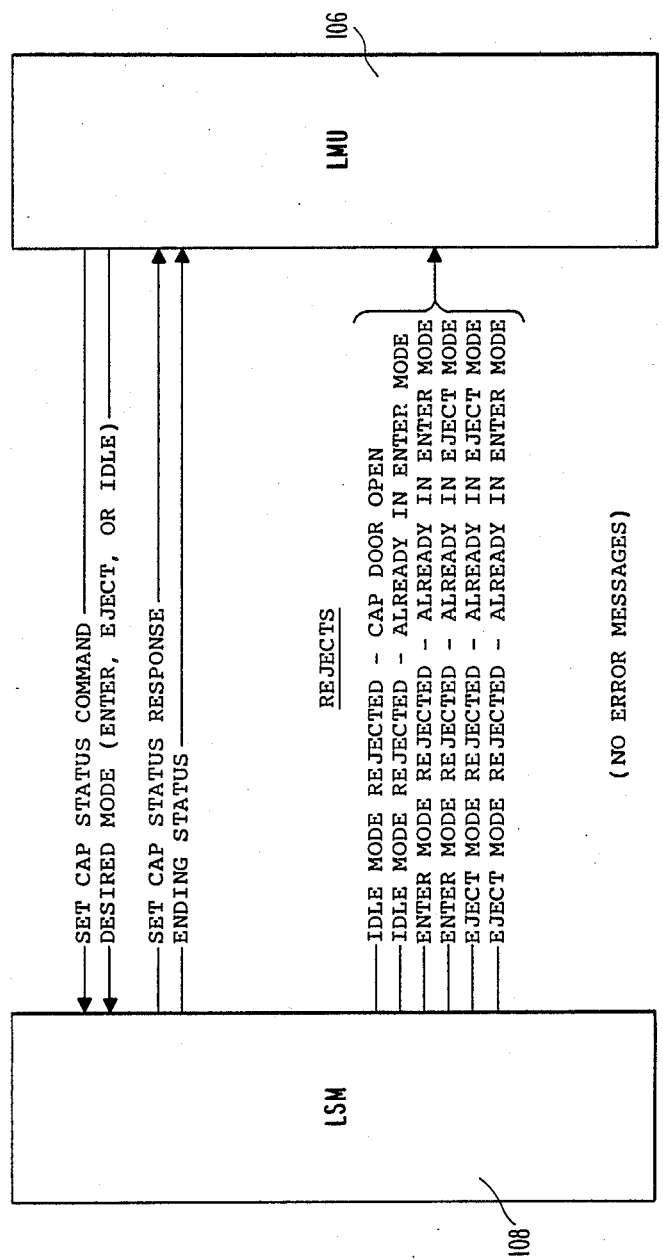

Communication flow for the above-described cartridge access port commands is illustrated in FIGS. 44a and 44b.

Figure 45:
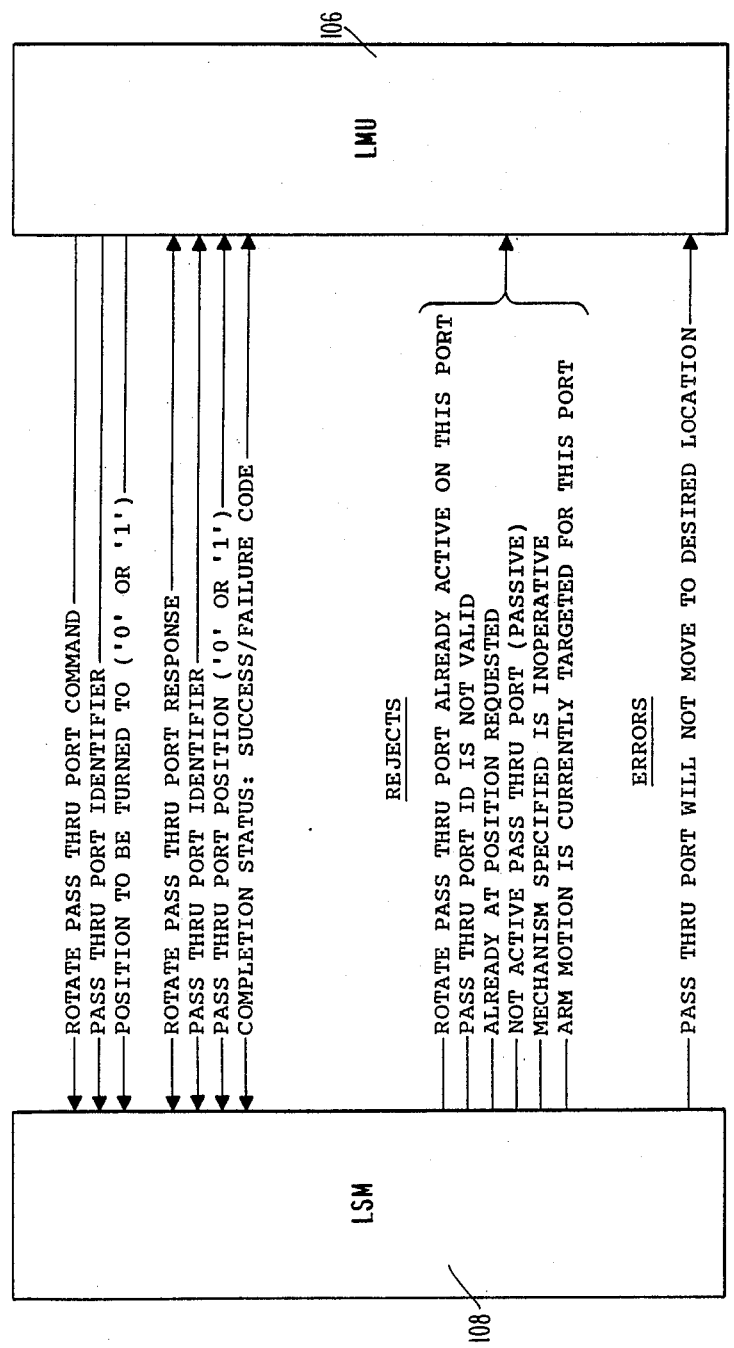
FIG. 45 illustrates commands, responses, rejects, and error messages associated with the pass through port.

Referring now to FIG. 45, there is shown the data flow of commands and responses with their associated potential rejects and errors for pass-through-port commands. The only command required for the pass through port is the rotate-pass-through-port command which instructs the LSM 108 to rotate the specified pass-through port 180°. The pass-through port, when not rotating, should be in one of two positions (i.e., "0" or "1") within either of its connected LSMS 108. The desired position after the rotation will be included as part of the command, which may be executed at any time.

A reset-door-open-indicator command causes the LSM 108 to reset the mechanism which indicates that the access door has been opened. Such a mechanism may be suitably comprised of a solenoid-operated flip-flop.

Two types of tape drive commands arm relayed to the tape drive 150 through the LSM 108. A rewind and unload drive command requests the LSM 108 to notify a tape drive 150 that it is to rewind and unload. The LSM 108 will respond to this command when the drive has become unloaded and is ready for dismount. If the drive is unloaded, or is already in the process of unloading, the LSM 108 will not reject the command, but will simply respond as soon as the tape drive 150 is ready for dismounting. The second tape drive command, a request, time until unloaded, requests the LSM 108 to notify the LMU 106 of the expected time that will elapse before a specified drive 150 is unloaded. If the drive 150 contains an already unloaded cartridge, the time will be zero.

Various other commands are utilized to monitor or change the status of a LSM 106. A request LSM state command requests the LSM 108 to transmit its current state or some specified part of it. The "LSM machine state" is defined by the information return. A subset of the full information packet can be retrieved by including the "information desired specifier" this command may be executed at any time, and is illustrated in FIG. 46. Two types of LSM varying commands are issued to change the status of the LSM 108. A vary LSM on line/off line command is issued to an LSM 108 to vary the LSM on line or off line. The LSM 108 may only be placed on line when it has had its functional code down loaded, has been initialized, and has been configured. When no command is active, the LSM 108 may be placed off line. The LSM 108 must also be placed off line prior to running off line diagnostics or opening the access to work. A vary LSM maintenance on/off command is issued to the LSM 108 to vary maintenance mode on or off. The functional code in this case must be loaded.

Several forms of messages from the LSM 108 to the LMU 106 may be utilized in accordance with the present invention to provide LSM status information or to request an action of the LMU 106 required by the LSM 108. An error condition message will be issued by the LSM 108 when any failure occurs and will be in addition to any failing ending status which might be generated for a specific command. The error message will include as much isolation information as the LSM 108 can ascertain. Further diagnostics may be necessary at this juncture to isolate the failure to a single field replaceable unit.

A door opened/closed message indicates that the operator access door to the LSM 108 been opened or closed. Opening the door will cause all power to be removed from the moving parts of the LSM 108. A CAP door opened/closed message indicates that the CAP has been opened or closed. An IPL complete message indicates that the LSM 108 is ready for initialization.

A LSM request to go home message indicates that the LSM 108 wishes to return the arm, wrist, and hands to their "home" positions. This request will eventually be honored by the LMU 106, at which time a "go home" command will be issued. An enter/eject cancelled message indicates that a CAP lock command has overridden an active ENTER or EJECT.

A LSM request, code packet message indicates the the LSM 108 wants the LMU 106 to down-load either a specified packet of LSM code or the entire code. This message will be transmitted to the LMU 106 when the integrity of any portion of the LSM code becomes suspect. The LSM 108 will request a full down-load of all packets whenever an initiate program load is generated. The LMU 108 will acknowledge the message and issue a "receive down mode" command sequence to transmit the desired code packet, such command, being issued only when all outstanding advance to the LSM 108 have been completed. Whenever the LSM 108 has a change in status, a status change message is transmitted and will include the specific reason for the change.

Communications initiated from the LMU 106 to the LSM 108 include the following diagnostic functions. On line diagnostic, or those interleaved with host requests to an online LSM 108, are initiated at the LMU 106 by the diagnostic system user such as a field engineer. Generally, the diagnostic system executing at the LMU 106 is responsible for limiting the types of diagnostics available to the user and, therefore, protecting the LSM 108 from requests which might upset subsystem integrity. This occurs since there is no distinction between host and diagnostic generated LSM commands.

While on line, the LSM 108 will not be requested to perform any other than functional-type operations. Furthermore, if on line, the diagnostic system will not request LSM initialization. Typical operations in this note include motions which support diagnostics upon an neighboring maintenance mode LSM such as diagnostic cartridge motion, pass through port motion/examination, etc.. Status requests will also be issued. As with any of the other operating modes, an on line LSM 108 can receive a communications port message through the conventional RS-232 port.

There are no diagnostic commands permitted in the LSM off line state. As such, the diagnostic of the LMU 106 may issue any functional command allowed in the off line state such as request state or vary to maintenance. All other commands will be rejected.

Maintenance mode diagnostics permits the LMU 106 the most comprehensive control of LSM 108. In addition to all functional commands, specialized diagnostic commands are accepted. These commands may disturb the integrity of the LSM 108 such that an initialized command is required prior to returning to the off line state. This is known to the LMU 106 via the initialized required flag contained in status which is the response to a request state command or the unsolicited status change message generated when maintenance mode is released by the user.

Finally, a diagnostic down-load command instructs the LCU 154 to accept a down-load of a diagnostic code segment. Several segments may be required to complete a down-load, each requiring transmission of this command. Each packet is identified by a segment number which indicates where it is to be loaded in the diagnostic buffer. The length of the code/data segment cannot exceed a segment's capacity. Once the diagnostic code has been placed in the buffer, controlled will be passed to that code if the execution flag is set. This command may only be executed when the LSM 108 has been placed in maintenance mode.

Software related t the operation of the ACS 100 according to the present invention will now be described. Generally speaking, there are three basic types of software required to implement the ACS 100: (1) host resident software or host software component 110, (2) LMU software, and (3) LSM software.

The host software component 110 performs as the interface between the MVS system or host computer 102, requesting tape processing, and the ACS 100, performing tape mount/disk mount operations. Host software is distributed in both system modification program/extended (SMP/E) and system modification program/for (SMP/4) formats. Software installation is the process of receiving, applying, and accepting the new function system modification (SYS MOD) and user modification (USER MOD) which represent the host software component 110. The user must then LIBGEN (i.e., the process of defining the configuration of the library to the host software) the host software component 110 with user selectable parameters. LIBGEN outputs include an initialized control data set and listings indicated what has been generated. Two other facilities are provided, and installation verification process (IVP) and a reconfiguration utility. The IVP can be executed to ensure proper installation of the whole system, while the reconfiguration utility provides a means of enlarging and installation without having to lose data held in the control data set.

Software initiation deals with the process of starting the host software, and involves starting a task, via operator command, determining the parameters involved, and notifying the ACS 100 that the host 102 has been initiated.

Job processing pertains to the activities a host computer 102 would perform for normal tape job processing. These include device separation, mount message, dismount message, and swap processing. Device separation is the term utilized to allocate tape drives to either library or non-library functions. Since all tape drives 150 assigned to system may not be under library control, the host software component 110 separates tape resources into distinct allocation groups. It is also a function of device separation to insure selection of a drive 150 in the same ACS 100 as the volume to be mounted, when used in multiple ACS 100 environments.

The host software component 110 also provides the capability to determine when a library controlled volume is to be mounted on a library control drive. It maintains records of volume location and instructs the LMU 106 to mount the requested volume on the selected drive 150. This action is referred to as mount processing. Scratch volumes may also be requested and the host software component 110 provides lowering of the requested volume from within the same LSM 108 (or nearby LSM 108 when needed). This action is referred to as scratch processing.

The host software component additionally provides the capability to determine when a library controlled line is to be dismounted and returned to its home position. Such functioning is referred to as dismount processing. Swap processing, on the other hand, is activated by the need to remove a volume from one tape drive 150 and move it to another drive 150. This action can be initiated by the operator, issuing a swap command, or when the operating system detects an error on a particular drive 150 and determines the need to move the volume to another drive 150.

Operator command to the host software component 110 are generally divided into two groups known as library command and system commands. Library commands are provided specifically to allow an operator to prepare library resources for maintenance, to determine the status of library components, and to locate a volume within the library. Ten basic library commands are provided in accordance with the present invention.

VARY STATION ON LINE/OFF LINE
CAP PREFERENCE
RECOVER HOST
MODIFY LSM ON LINE/OFF LINE
DISPLAY
LIBRARY MOUNT
LIBRARY DISMOUNT
ENTER
DRAIN
EJECT

A station is defined as the connection between a host computer 106 and an LMU 106. Each host computer 102 can have one or more stations to each LMU 106. And each LMU 102 can include stations for one to sixteen host computers 102. The operator can issue a VARY STATION ON LINE/OFF LINE command to vary the state of each station as on line or off line to the host computer 102 on which the command was issued. An optional parameter is provided to force the off line state immediately.

The CAP PREFERENCE command is issued by the operator to assign a preference priority for each cartridge access in the library. Higher priority cartridge access ports are chosen over lower priority cartridge access ports whenever the system chooses a particular cartridge access port. Priorities should be assigned to minimize operator inconvenience for cartridge access ports chosen by the system.

Under the RECOVER HOST command, the operator can have one host computer 102 recover library resources assigned to a crashed host computer 102. Normal operations require a host computer 102 to obtain library resources to automate cartridge handling. A host computer 102 may crash while owning library resources, therefore, the command causes ownership of those resources to be transferred to an operational host computer 102 executing this command.

The operator can issue the MODIFY LSM ON LINE/OFF LINE command to vary the state of each LSM on line or off line to all hosts regardless to which the command was issued. The option to force the off line state immediately is also provided. This command differs from others is that it affects connection to all host computers 102 rather than just the computer 102 to which the command was issued.

The operator can also issue a DISPLAY command to display information as to component status of the ACS 100, location of particular volumes, and library associated messages. The LIBRARY MOUNT command allows the operator to cause the library to mount a volume or particular cartridge 286 on a tape drive 150. In a similar manner, the LIBRARY DISMOUNT command permits the operator to dismount a volume or cartridge 286 from the tape drive 150.

The ENTER command is issued by the operator to effect the transfer of cartridges 286 from the cartridge port to the LSM 108. The option of entering multiple or single volumes is provided until a DRAIN command is issued. Under such conditions, the DRAIN command is issued to terminate the transfer of cartridges from the cartridge access port to the LSM 108 initiated by the enter command. Finally, an EJECT command can be issued to effect the transfer of cartridges 286 from the LSM 108 to the cartridge access port. The option of ejecting multiple or single volumes or cartridges 286 is also provided.

System commands are comprised generally of three types. These provide the operator the capability to start and terminate software processing. It should be noted at this juncture that job processing, MVS command alteration, and library commands only work while the host software component 110 is in operation. A START command is issued by the operator to cause the host software component 110 to start to function on a particular host computer 102. A SHUT DOWN command, on the other hand, is issued by the operator to terminate all library processing on a host computer 102. No new functions will be started by the host software component 110. When all current functions have been completed, any control data sets open will be closed and the host software component 110 will cease to function. In addition, a CANCEL command provides the capability to immediately terminate all processing and perform a dump.

Various utility programs are provided to aid the user in managing library resources. For manual removal of a volume or cartridge 286, a VOLSER to location utility program is provided to determine the location of the cartridge 286 when the operating system is not functioning. This allows the user to locate volumes that are required to make the operating system functional (e.g., retrieve the SYSRES backups).

A user with a tape management system often has a data base describing which tapes are scratch and which are not. The data base of necessity is periodically updated to indicate new scratch tapes. A scratch update utility program is provided that can use the information provided from the user's tape management system to update the library's list of scratched tapes. Such program can either add new scratch tapes to the existing list or, recreate the whole scratch list from the input provided by the tape management system. An eject cartridge utility program is also provided which can eject cartridges by accepting a list and effecting the ejection of those cartridges indicated.

A backup utility program may be provided to allow an installation to take complete and accurate backups of the control dataset. Optionally, if journalling is enabled, the journal is reset. This program executes with or without a functioning host software component 110. The control data set may be recreated from a previous backup copy and optionally applying the current journal through use of restore utility program which also executes with or without functioning host software component 110. Finally, an audit utility program is provided to generate a physical inventory of the entire library, and ACS 100 within the library, any given LSM 108 within a specified ACS 100, or a suitable combination of such elements. Under such circumstances, the control data sets are updated to reflect all observed changes in cell storage for the specified only.

Log processing is the function of storing data about events to permit later analysis and tracking of those events. As such, errors detected by the host software component 110 are placed in SYS1.LOGREC. The host software component 110 will not handle errors normally handle errors normally handled by the operating system, such as drive and control unit errors. Errors not normally handled by the operating system are logged by the host software component 110. Additionally, the host software component 110 will cause the logging of software failures in the error log. Records will be logged by MVS for each abnormal termination of the host software component 110. All recovery actions taken by the host software component 110 will be logged in the error log to provide an audit trail for recovery.

The primary recovery responsibility of the host software component 110 is to maintain the consistency of the controlled data sets. Such sets must correctly describe the state of the library at any given time and be recoverable to that time. A secondary responsibility of the host software component 110 is the detection, notification of, and recovery from library failures. These include loss of a host computer 102 in a multiple host computer complex, loss of one or both processors in the LMU 106, and so forth. The third area of responsibility of the host software component 110 is to work with the LMU 106 in order to recover LSM 108 after it has failed. In particular, this includes determining that there are volumes or cartridges 286 in the hand and finger assemblies 236, the pass through port, or elsewhere, discovering their VOLSER number, and disposing of them properly.

Common functions are those that can be envoked from several of the functions previously described. For example, the mounting of a volume or cartridge 286 is a function activated by job processing, operator mount command, or a utility program among others. Any additional processing required by specific (non common) functions is described herein below. The host software component must determine that a volume or cartridge needs to be mounted on a drive 150. If the mount involves a volume or cartridge 286 under library control, or a drive 150 attached to the library, the host software component 110 needs to take appropriate action. Dismount processing must also be determined by the host software component 110. That is, the host software component will determine that a volume or cartridge needs to be dismounted from a drive 150. If the dismount involves a drive attached to the library, the software component needs to take appropriate action.

The host software component 110 will also cause a volume, under common enter processing, to be entered into the library, thus placing the volume under library control. This may involve entering volumes with no external specification of the volser. The host software component 110 selects a "home" location for the cartridge 286 at enter time, with such selection being performed without user control. Finally, the host software component 110 will cause the LMU 106 to scan the cells of 132 of an LSM 108 to determine its contents. Audit processing can be envoked for a single LSM 108, a single ACS 100, or the entire library comprised of multiple ACSs 100. The audit uses the OCR label on a tape cartridge 286 to specify the VOLSER. Any tape cartridge with no OCR label or with a defective OCR label will be ejected from the ACS 100. Such cartridges 286 require manual verification of volume serial numbers prior to reentry into an ACS 100.

In order to increase the efficiency of the mounting process, the host software component 110 influences allocation of a drive 150 closest to the cell 132 in which a volume of cartridge 286 resides. Causing allocation to favor the closest drive 150 is called directed allocation. When a job's data set allocation requests a library controlled volume, directed allocation attempts to cause the closest available drive 150 to be allocated to the job. Directed allocation only pertains to volumes and drives under library control and excludes tape resources outside the library.

When a user needs to enter an LSM 108 to manually remove a volume or cartridge 286, a VOLSER to location utility is provided to generate a report that lists the location of volumes within the library. The location must be in a format that allows the user to locate a volume. As an alternative, the user can use the library display command to determine the location of a volume. The volume's location will subsequently be displayed with mount messages when the system operates in manual mode.

In order to allow the user to better utilize the library, an activity distribution utility program is provided that can generate a report showing relative activity by LSM 108 and/or by VOLSER. The user can then redistribute resources to balance the load. A scratch redistribution utility program is also provided to allow the user to redistribute and balance the number of scratch volumes per LSM 108 of an ACS 100. This program accepts an ACS ID and performs a redistribution of volumes within the specified ACS 100. Concurrent redistribution may be accomplished by multiple executions of the scratch redistribution utility program.

In order to allow the entering of nonlabeled tape cartridges 286 for the purposes of labeling, and initialize new cartridge utility program is also provided. This utility places a cartridge access port into "initialization mode". All entered cartridges 286 will be initialized to match their OCR label. The user can then specify the newly initialized cartridges should be ejected from the library or entered into the pool of scratch volumes. The cartridge access port will continue to initialize volumes until empty.

System management facility records will be created in accordance with the present invention for library events which affect the utilization of host software component 110 resources, for events which indicate cartridge insertion or deletion, and for performance data from the LMU 106/LSM 108. Information recorded in system management facility files thus better aid the user to manage his library resources.

As discussed herein above, the host software component 110 is capable of running on any host computer 102 that supports a IBM MVS/XA operating system, and must operate in a multi-host computer 102 environment with up to 16 host computers 102 sharing the library. All host computers 102 using a particular library share the same control files or control data set. Therefore, a given host computer 102 may be connected to only one library.

Since the ACS 100 according to the present invention may include non-library attached tape transports 150, the host software component 110 attempts to influence allocations such that non-library volumes do not get allocated to library attach drives 150, and library volumes do not get allocated to non-library attached drives.

The host software component 110 is supported by IBM MVS/XA only. As such, the host software component 110 provides a user exit to replace any user exits taken by itself. As much common code and data above the 16 megabyte line as possible is attempted to be maintained by the host software component 106. Common code and data refers to code or data shared among all address groups. No modification to the IBM code is necessary.

The JES2 portion of MVS/XA is not supported by the host software component 110 since JES2 does not require automated tape services. The only tape related function of JES2 is set up, which tells the operator to release the job when the specified volumes are available. However, JES2 does not request the operative to mount the volumes. The host software component 106, on the other hand, must be able to support the JES3 portion of MVS/XA, including having library tape resources set up and broken down by JES3. Additionally, the host software component 110 supports RACF, without compromise to its integrity. In addition, all utilities issue calls to RACF (if active) to determine if the job/user is authorized to envoke that utility. Usage of library control tape transports 150 as controlled by a hierarchical storage manager is also supportive by the host software component 110 through dynamic allocation of the tape drives 150.

Third party software is not explicitly provided support by the host software component 110. However, the host software component 110 supports conventional tape managing products known as Tape Management System (TMS) and Tape Library Management System (TLMS), using its knowledge of TMS and TLMS to determine the scratch status of library volumes. For other more customized tape management systems, the host software component 110 provides a documented interface to its scratch routine. As a result, the user must provide the interface routine between the tape management system and the scratch routine of the host software component 110. The host software component 110 will not support multiple scratch pools. Only requests for VOLSERS with "PRIVAT" or "SCRTCH" will be considered as requests for scratch volumes. If the volume chosen by the host software component 110 fails to satisfy the mount request, the operator is required to resolve the situation.

For correct operation of the library system, the host software component 110 must be operating on all host computers 102 which can allocate library volumes. By doing this, the host software component 110 is able to monitor requests for library volumes from non-library hosts, and requests operator intervention.

For JES2 shared spooled complexes, the host software component 106 need only be active on host computers 102 which have access to library controlled tape transports 150. This assumes that the host software component 110 will not perform JCL converter or interpreter processing, i.e., there will be no "SUBSYS=" clause on library tape DD statements. Correct operation can only be guaranteed for a JES3 complex if the host software component 110 executes on the global processor of JES 3, as well as all local processors capable of performing tape drive set up. In addition, the constraints which apply to JES2 shared spool complexes apply here as well.

Figure 48:
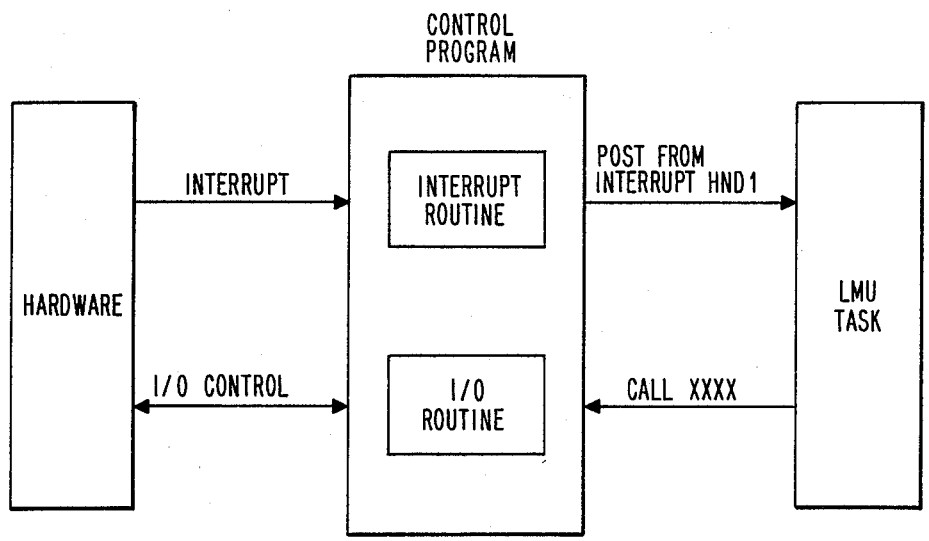
FIG. 48 shows input/output through LMU software.
Figure 43A:
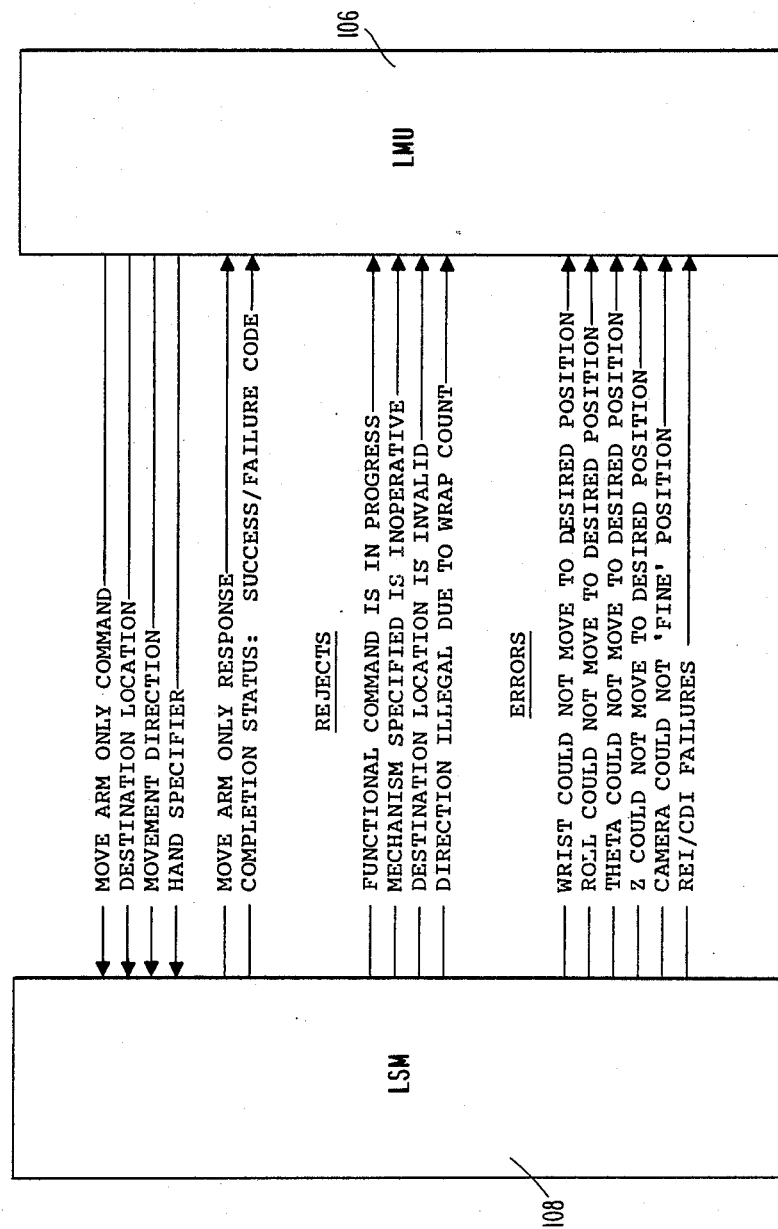
FIGS. 43a–43e illustrate commands, responses, rejects and error messages between the LMU and an LSM.
Figure 43B:
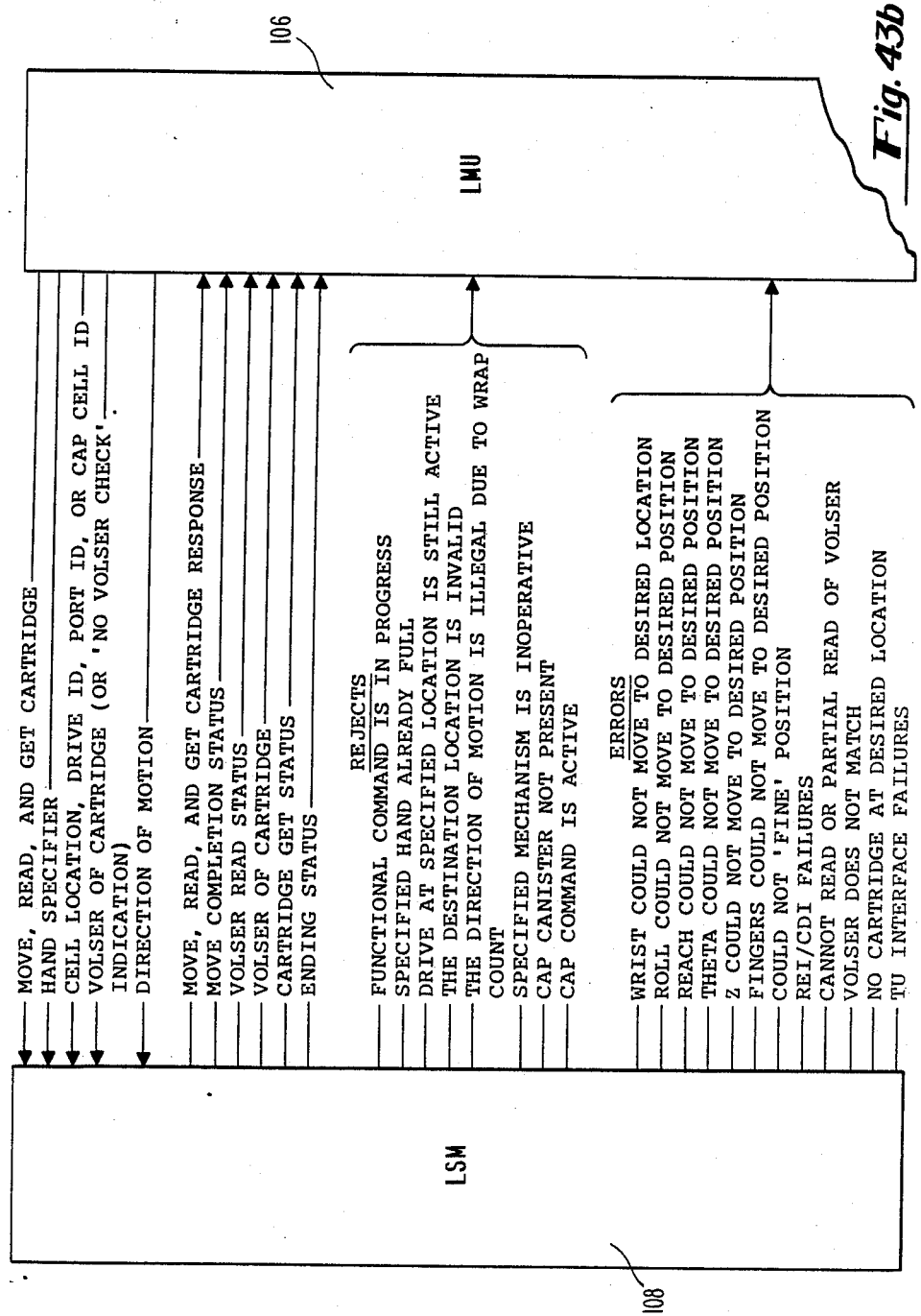
Figure 43C:
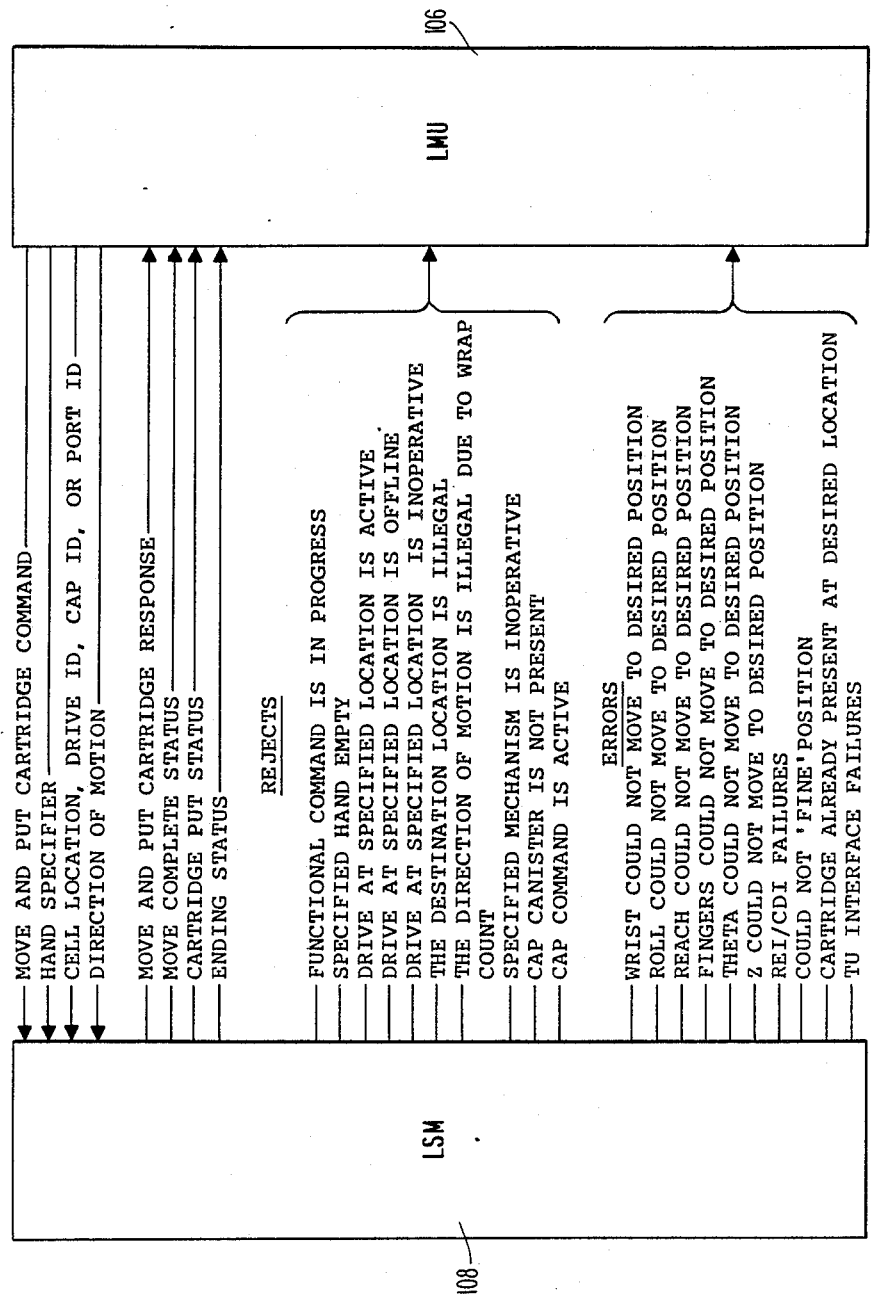
Figure 43D:
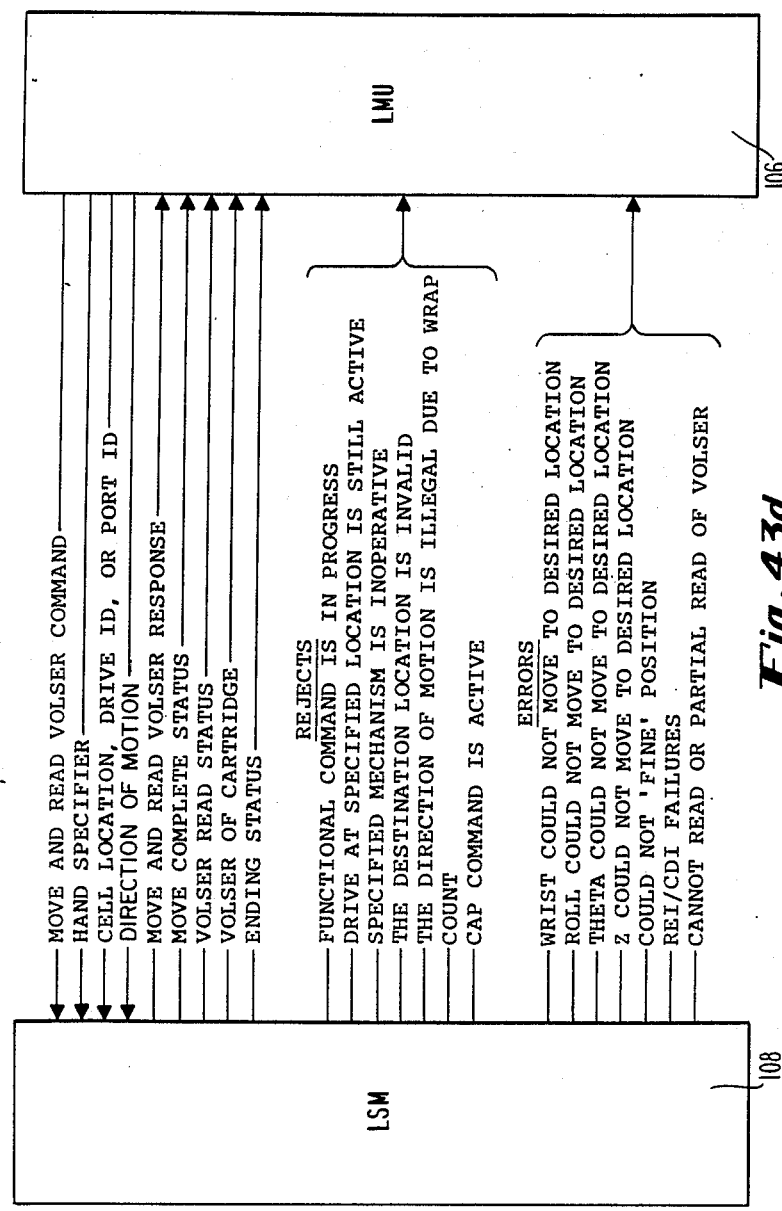
Figure 43E:
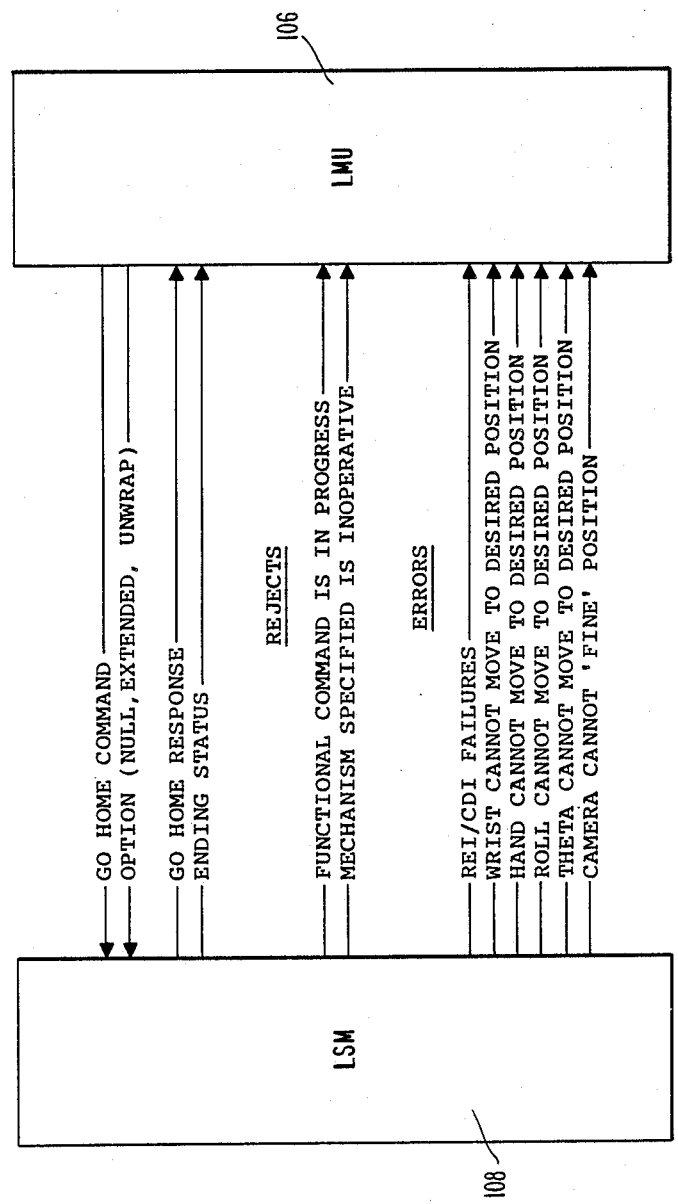
Figure 47:
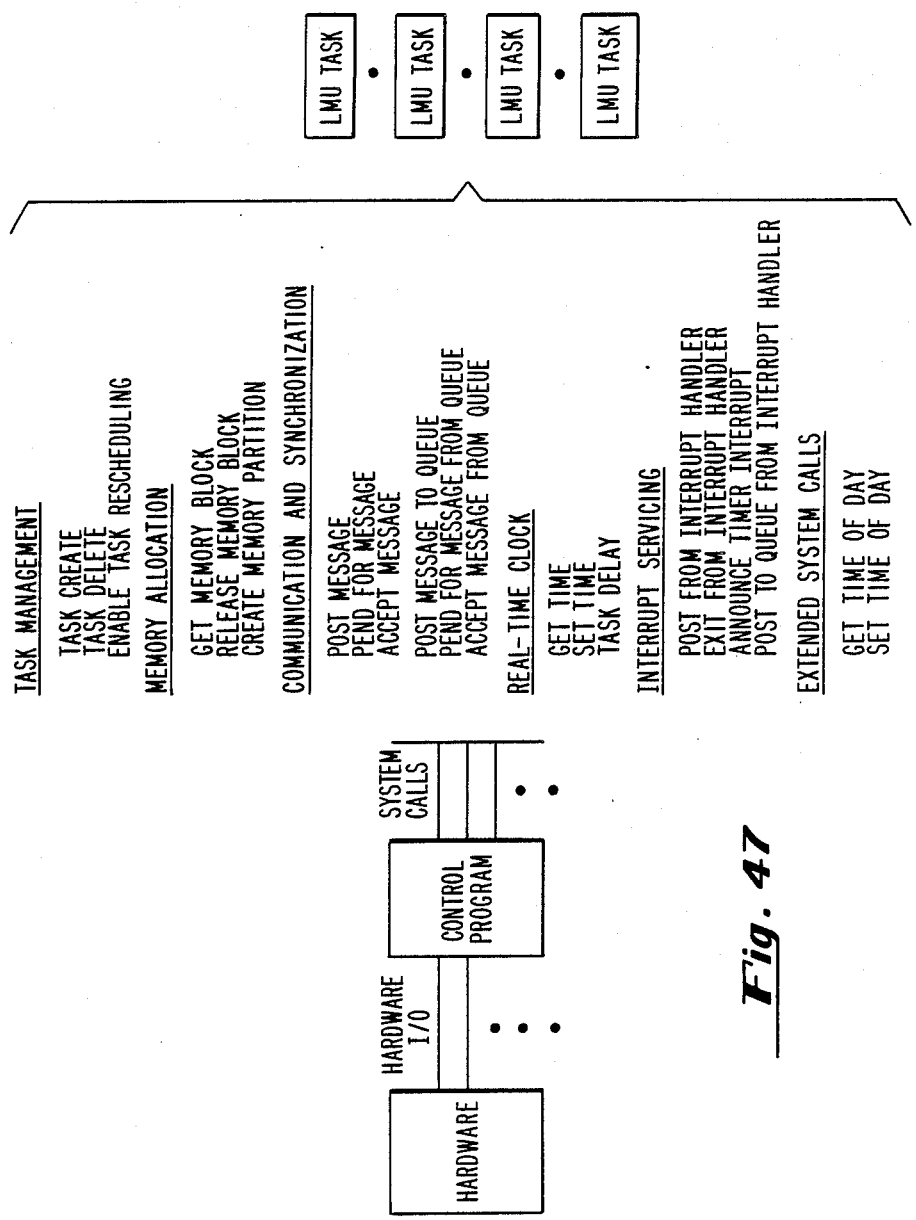
FIG. 47 describes control program interfaces to LMU tasks and hardware.

With reference now to FIGS. 47-49, the LMU software utilized for control of the ACS 100 will be described. On power up, the LMU 106 is controlled by software located in read only memory having two goals. That is, to verify that the processor and its immediate environment are working well enough to attempt the initial program load from mass storage, and to load LMU functional software as described in detail herein below from the mass storage device into random access memory and give it program control. The initial hardware checkout is of a "go/no go" nature. If the checkout fails, the failure indication must be easy to see and have a simple interface that has a high degree of reliability although much of the LMU 106 is not operating. This program, as a result, initializes, tests, and verifies the operation of the processor, the ROM, the ROM used for the initial software load, timers, interrupts, and the mass storage device.

Once the "go/no go" tests referred to above have been completed, initial software is loaded into the RAM by reading blocks of data from the mass storage device. The software, which is loaded, contains more extensive hardware check out routines and a secondary software loading program. Software loaded during the initial program load checks the full functionality of the LMU 106 including detection of non-fatal errors, as well as no go condition. This includes testing of hardware previously checked, plus initialization and testing of utility RS-232 interface, host interfaces, LSM interfaces, and the operating panel interface. Once LMU hardware operation has been verified, the entire functional software package as illustrated in FIG. 49 can be loaded from mass storage into RAM and control is passed from hardware initialization to software initialization.

The LMU system software consists of two major components: (1) the control program, and (2) the LMU functional software. The control program provides for the overall management of the individual tasks of the LMU functional software. Each LMU task is self-contained (i.e., one task does not directly control or call any other task). By using system calls, the tasks are able to communicate and coordinate with other tasks. The control program also provides a central point of control of the hardware contained in the LMU 106.

In a presently preferred embodiment of the invention, the control program is a multi-tasking control program (MTCP) for microprocessor 518. The MTCP is embedded for such application, and supplies multi-tasking support, interrupt driven, priority based scheduling, intertask communication and synchronization, dynamic memory allocation, real time clock control, and real time responsiveness. The control program supports interfaces to LMU tasks and hardware through one of three means: (1) basic MTCP system calls, (2) LMU extended systems calls, and (3) interrupt routine as shown in FIG. 47. LMU extended system calls are extensions to the MTCP that primarily provide tasks with the ability to interface with the LMU hardware. These input/output system calls are the central point of controlling hardware for the LMU functional software as shown in FIG. 49. Interrupt routines provide LMU specific handling of hardware interrupt, and are conceptually a part of the control program, not a part of user tasks. The primary function of the interrupt routines is to interpret the interrupt, perform any necessary hardware input/output, and notify the appropriate task of pending work, if any. Interrupts work outside the normal MTCP scheduling control and their activity is kept to a minimum.

At bring-up time, the LMU functional software requires initialization. At such time, it is assumed that only the control program is operational. The initialization, described below, brings the various LMU functional software tasks into existence. Also at bring-up, all queues used for task communication and all static tasks (i.e., tasks that. All required memory partitions are created at initialization using the "create memory partition" system call.

Tasks in the LMU functional software are comprised of either static tasks or dynamic tasks. Static tasks are created at initialization and are never deleted. They are dedicated to continually performing a specific function. Dynamic tasks, on the other hand, are created upon demand, exist until a task is completed, and then deleted. Each host request received creates a task for the duration of that host request. This allows the control program to manage multiple host requests of the same type. The system calls "task create" and "task delete" are used for the creation and deletion of tasks, respectively.

The MTCP allows each task to execute independently with each task having no direct control over any other. Communication type MTCP system calls allow a task to: (1) send messages to other tasks, and (2) receive messages from other tasks. The two basic means of communication provided by the MTCP are mailboxes and message queues.

In general, tasks remain suspended from execution until the task has a need to run. Tasks in the LMU functional software are designed to wait upon the occurrence of a single event, multiple events from one source, or multiple messages from multiple queues. A task can wait until single event occurs by using the system calls "pend for message" and "post message". By convention, several tasks agree to use a common mailbox or memory location for communication. A waiting task issues the "pend for message" system call to a particular mailbox. The task is suspended until the event is signalled by another task. When another task issues the "post message" system call to the common mailbox, the waiting task then becomes available for execution. This is the simplest form of inter-task communication.

A task can also wait on multiple events being communicated to it via a single message queue. The systems calls "pend for message from queue" and "post message to queue" are used in this scenario. By using the system call "pend for queue message", a task becomes suspended from execution for as long as the queue remains empty. Other tasks can then send multiple messages to the single queue by the system call "post message to queue". With the queue now having messages, the MTCP eventually resumes execution of the waiting task. After the first message is handled, the task again issues system call "pend for message from queue". If the MTCP determines another message is on the queue, and no other task has higher priority, the task will be given control again. If the task does not get immediate control back to process the next queue message, the task still remains ready to execute but will not be dispatched until later. If the queue is empty when the system call "pend for message from queue" issued, the task is suspended by the MTCP.

Many of the tasks in the LMU 106 must wait on multiple messages from multiple queues. This function is not directly supported by the MTCP and hence is implemented using a combination of system calls.

The waiting task tries to accept messages from all its queues. If any is found it is processed and the check is repeated. If none is found the task pends on the common mailbox. The sender posts a message to the desired queue and then posts it to the common mailbox. The message in the mailbox reactivates the pending task which then accepts messages from each of its queues until it finds one.

As described hereinabove, the control program provides the central point of controlling the LMU hardware. All LMU tasks use system calls when they need to request some activity of the hardware. Such system calls include "get time of day", and "set time of day". As shown in FIG. 48, these task initiated system calls are represented by "call XXXX". The control program takes this system call and manipulates the hardware to accomplish the request. Generally, a return code is returned to the task indicating completion status. The means by which the hardware notifies a task of them occurs differently from that of the task initiated input/output. Referring again to FIG. 48, the hardware interrupt the control program. If this interrupt requires a task to be notified, the system call "post to queue from interrupt handler" is used to post a specific message to the appropriate task's queue. At a later time, the receiving task will then process a message.

Interrupt routines are conceptionally a part of the control program. However, when an interrupt occurs, it is invoked outside the normal flow of task scheduling. The function of interrupt routines is to interpret the interrupt, notify the appropriate task of any work required (using the "post from interrupt handler" system call), manipulating necessary hardware controls, and exiting (using the "exit from interrupt handler" system call). The "exit from interrupt handler" system call causes rescheduling to occur, if any higher priority task became ready to execute as a result of the interrupt processing.

The LMU functional software relies on the control program to manage user memory for all variable data. The basic partitions of memory are established at initialization using the "create memory partition" system call. In order to make optimum use of memory, the LMU functional software uses dynamic allocation of memory. A task, when it needs memory, issues a "get memory block" system call to obtain the needed memory. When the task no longer needs the memory, the "release memory block" system call is issued releasing the memory for other use.

When any task issues the "get memory block" system call, it has the potential for being rejected due to memory being unavailable. The means of avoiding this error is described in greater detail hereinbelow, but if it occurs, the task issues the "task delay" system call to retry the memory request at a later time. If the task continually fails to obtain memory, the current request is aborted. A rejection message is sent to any waiting task.

The "post message to queue" system call can be rejected if the receiving queue is full, and is recovered using the same technique described hereinabove with reference to memory errors.

Time outs are needed for those tasks requiring a completion message within a certain amount of time. When a task initially sends a message to another task, it obtains a time-stamp with the "time" system call. When each task is suspended with the "pend for message from queue" system call, a time out is specified. This particular time out causes the task to be scheduled even if no other normal work is required. Either by the pend time out value or normal scheduling, the task will be dispatched. The task will then examine each of its outstanding items for a time out. Recovery of each time out is dependent on the specific task.

As discussed hereinabove, the utilization of various resources in the LMU functional software is dynamic in nature. Such resources may be comprised generally of message queues, memory blocks, and task control blocks. When a task reaches a resource limit, it cannot continue its normal execution. The recovery, as described immediately hereinabove, is not desirable. Therefore, the following considerations will be used in an attempt to avoid resource depletion.

Each task started from the host requires a certain amount of message queue space, a task control block, and various memory blocks. The primary means of avoiding depletion of these resources is by limiting the number of host requests that can be active at any given time. Since receipt of a host request causes a dynamic task to be created, the host requests are limited by limiting the total number of tasks. The HTCP thereafter rejects the "task create" system call when a predefined task limit, for example 64, is reached. The total number of task is somewhat greater when other static tasks are included. Other considerations of resource depletion involve controlling the scheduling between various tasks. The overall attempt is to avoid any blank times and keep the utilization of queues and memory to a minimum.

Avoiding queue overflow is also accomplished by establishing a priority within each task. Most tasks in the LMU 106 wait on multiple queues and mailboxes. For these tasks, an emphasis is placed on handling messages that are outbound to the host computer 102 before accepting messages that are inbound to the LMU 106.

In the following description, transformation definitions are included where appropriate. Such transformations depict the decomposition of an incoming request into a series of communications between the task being defined and its input and output queues and mailboxes. Referring now to FIG. 50, there is shown an example of a dismount for the process host request task. In this case, the task involves multiple LSMs 108 with the source drive 150 and destination cell 132 being located in different LSMs 108. The dismount command arrives at step (2) and is transformed into the transactions listed in steps (3) through (21). The first action taken is the posting (3) of a rewind unload drive command to the LSM request queue. Since the LSM response to this command, drive unloaded (5), may not be received immediately, a path allocation request (4) is issued so that it may be processed at the same time as the unload. The symbols surrounding and separating steps (5) and (7) indicate that reception of the two transmissions are independent, and that the order of their occurrence cannot be predicted. The task pends itself to both mailboxes and must receive both pieces of information before it can continue.

Once the drive 150 is unloaded and a pass-through port slot path has been allocated, the actual dismount may begin. A move get command with a drive parameter is posted to the LSM request queue (a) and the task pends to its LSM response mailbox for the move get complete response (9). When the response is received, a tape dismounted response is posted to the host response queue. Similarly, the move put to a slot (11) is posted and its response pended upon step (12). After the first slot, there may be zero or more slots to pass through in the allocated slot path. The symbols around steps (13) and (16) indicate that there may be zero of more slot-to-slot moves.

The tape cartridge 286 must be retrieved from the final slot using the move get command with a slot parameter (17), and the response must be pended upon step (18). The final command to the LSM 108 is a move put to the destination cell (19). Once the response for this command is received (20), the final host response (cell full) is posted to the host response queue at step (21) and the transformation is complete.

Referring again to FIG. 49, it can be seen that the host interface communications task sends and receives all data to and from the host interfaces. Its primary purpose is to act as a go-between for the host interfaces and the LMU functional software.

The host interface communications task is activated when data is available from a host interface. If the communication is a host request, a new copy of the task which handles that request is created. The host request is then transmitted to that task. Any other communications from the host interfaces must be a host message reply and will be sent on to the process host messages task. The host message replies are host acknowledgments to previously transmitted host messages.

Host responses are also received by the host interface communication task from the process host request task during and on completion of a host request. Such host responses carry status information associated with a specified host request. The data is subsequently transmitted to the appropriate host interface.

From the diagnostic interface, the host interface communication task also accepts host type requests. It processes these requests and the responses as it does for the host interface, except for the communications tasks. The process host messages task is used to post "host messages" to the host interface communications tasks. Host messages are communications from the LMU 106 to the host computer 102 that are not related to a specific host request. Such messages are described in detail hereinabove and are written to the appropriate host interface.

The process host request function shown in FIG. 49 is actually composed of a set of tasks, each of which handles a single type of host request or diagnostic request. Many copies of a single task may be active at any one time. A copy of the task is created by the host interface communications task and the host request which initiated it is sent to that task. The parameters of the request are checked, and if not valid, the request may be rejected.

If the request requires the movement of a cartridge 286 from one LSM 108 to another, or movement to a drive 150, a path must be requested from the allocate slot path task prior to the assurance of any LSM commands.

The host request is transformed into a series of "LSM commands" which are transmitted individually to the LSM interface communications task. Commands requiring allocatable resources (e.g., hand, arm or port mechanism) must not be issued until the allocate resource task has granted allocation rights for such resources. The host request task pends itself to each "LSM response".

When a "LSM response" containing request status is received from the LSM interface communications task, any necessary intermediate status, (e.g, "cell empty response") and/or completion status is sent to the host computer 102. This is done by issuing a "host response" to the host interface communications task. When a response is received, those resources which can be released must be returned to the allocate resource task so that other tasks may have their turn.

Any error conditions are recorded in the error log. Statistics on the executed command are gathered when the host request is complete, communications from the process host request tasks indicating whether the request was initiated by the host interface or the diagnostics interface.

The allocate resources task is responsible for all allocatable LSM resources in the ACS 100. Such resources include port slot paths, tape drive, LSM hands and arms, and pass-through port mechanisms. They also include entire LSMs 108 for the purpose of varying an LSM on-line, off-line or to maintenance mode.

Any host request, which needs to pass a cartridge from one LSM 108 to another or is moving a cartridge 286 to a drive 150, must request allocation of an entire "slot path" from this task before it can begin issuing any LSM motion requests. When a path from the source LSM 108 to the destination LSM 108 has been selected for which there is a non-allocated pass-through port in each of the connecting pass-through ports, that path in the form of the selected slots is allocated to the requesting task. A slot remains allocated until it has been used and emptied.

If the task has requested a drive 150 as its destination location, this task will not release a path allocation until the specified drive contains no cartridge. The drive 150 is then considered allocated during the requesting task and until a dismount or swap task removes the cartridge 286 from that drive 150.

Before a task can initiate a motion command, it must receive allocation of any resources needed to complete that command. Such resources are combinations of arms, hands, and pass-through port mechanisms. As a task completes the use of any resource at the end of an LSM command, it must relinquish its allocation of that resource. Some resources, such as an arm, must be returned at the end of each command which needs it. This allows other tasks a chance to use it. Others, such as a hand, must be retained across more than one LSM command.

The allocate resources task must maintain dynamic ACS configuration. Any resources added to this system, for example, as a LSM 108 goes on line, or removed from the system, for example, as the LSM 108 goes off line, are reported to this task by the task (i.e., host command or LSM message) which gets the information from the LSM 108. This task will reject resource requests initiated from host requests if the specified resources reside in an LSM 108 which is not on line. Similarly, requests initiated from diagnostic sources will be rejected unless the selected LSM 108 is in maintenance mode.

As is the processed host request task, the process LSM messages task is actually a set of tasks, each of which handles a single type of LSM message. Many copies of a single task may be active at any one time. A copy of the task is created by the LSM interface communications task, and the LSM message which initiated is sent to that task.

If the LSM message requires it, a series of "LSM commands" is created and transmitted individually into the LSM interface communications task. Any commands requiring allocatable resources (e.g., hand, arm or port mechanisms) must not be issued until the allocate resource task pend itself to each "LSM response".

An "LSM response", containing request status, is received from the LSM interface communications task. When such a response is received, those resources which can be released must be returned to the allocate resources task so that other tasks can have their turn. Most error conditions and manual intervention messages will be relayed as host messages to the host interface communications task. Some host messages, however, require acknowledgment from the host. But those host replies will be received from the host interface communications task. Any error conditions are recorded in the error log.

The LSM interface communications task sends all data to, and receives all data from, the LSM interface comprised of LAN. Its primary purpose is to act as go-between for the LAN and the rest of the LMU functional and diagnostic software.

The LSM interface communications task receives "LSM commands" from the process host requests task, the process LSM message task, or from the diagnostic interface. Commands are transmitted to the appropriate LSM 108 over the LAN. When these commands are complete, LSM responses are returned from the LSMs 108. This status is relayed back to the task which initiated the LSM command.

Unsolicited communications from the LSMs 108 in the form of LSM messages are also received on the LSM interface. When one is received, this task creates a new process LSM message task to handle that message. The initial message is then sent to the newly created task for processing.

Error handling within the ACS 100 is not centralized. It is distributed within the system with each portion responsible for the reporting and recovery of any error that it detects. Retries will occur at the "lowest" possible level. The LSM 108 is responsible for all retries involving a single LSM command. On the other hand, the LMU 106 will retry any portion of a host command which involves more than one LSM 108, or can use an alternative path (e.g., another hand or port). Every piece of the system is responsible for its own process recovery. Similarly, within the LMU 106, error recovery is distributed. Retries occur at the lowest level and each task is responsible for its own recovery.

A task which receives a request which is not understood or cannot be executed will issue a reject for that request. The rejection is returned in place of the normal response to the request. Rejections are logged in the error log. No recovery is possible at this level. A task which receives a rejection for a request may assume that the rejection has been logged, but is responsible for any recovery or retry of its own process. A task issues an error response for a request it receives on which it takes action but cannot complete. The error response is returned in place of the normal ending response to that request. Any error which is detected by a task must be logged by that task. This task is also responsible for any retry or recovery algorithm which may be appropriate. Tasks which become aware of a problem through an error response, need take no action on that error but must attend to any recovery of their own process that is possible.

Figure 52:
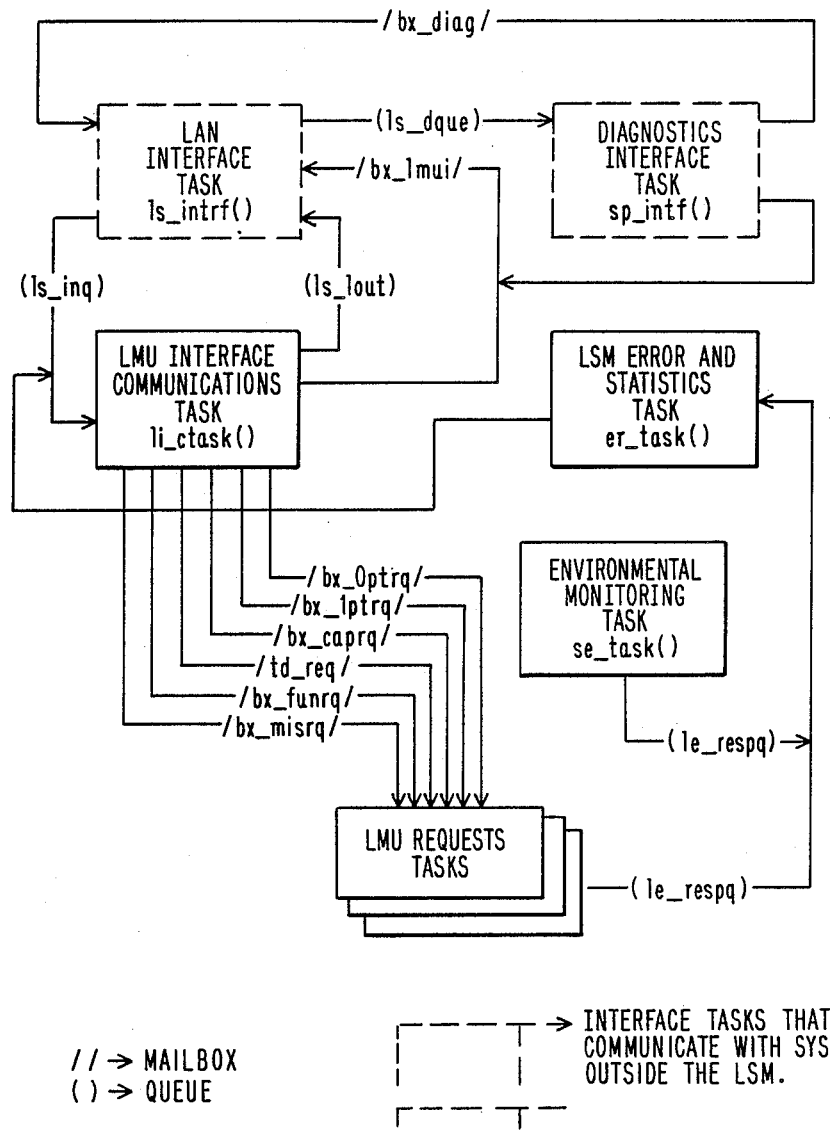
FIG. 52 shows a block diagram of LSM functional software architecture.

With reference now to FIGS. 51 and 52, a description of the software required for the LSM 108 will be described. On power up and after processor reset, the LSM 108 will begin execution out of the read only memory. The role of the read only memory code is two-fold, in that it verifies that all electronic systems work and can be communicated with, and that it requests and loads the functional software from the LMU 106. The code is transmitted from the LMU 106 to the LSM 108 via the local area network that connects the two. Once the functional code has been loaded, it runs additional tests against the electronic hardware. Tests are run to weed out marginal hardware and to determine field replaceable units. If such tests run with no errors, then control is turned over to the function main (which is responsible for "waking up" the operational software).

Like the LMU software, the LSM system software is segmented into two distinct components: a control program and the LSM functional software. The control program is responsible for controlling the flow of operations from the time an LMU command comes in, throughout the execution phase and into and through the ending response phase. Different tasks that are needed to satisfy LMU demands can communicate with the LMU and to each other through the control program. In a presently preferred embodiment of the invention, the control program is implemented with a MTCP for multi-tasking support, interrupt driven, priority-based synchronization, intertask communication and synchronization, direct memory allocation, real time clock control and real time responsiveness. The MTCP system calls, used by the control program, are shown in FIG. 51.

At bring-up time, the LSM functional software shown in FIG. 52 requires initialization, since it is assumed that only the control program is operational. The initialization described below brings the various LSM functional software tasks into existence.

The LAN is first shut off to prevent the old PROM code from being activated and the OP_PANEL lights are initialized. The current task is raised to the highest level to prevent rescheduling during the initialization procedure. All required memory partitions are created by ci_impart ( ), and all communication queues are created with ci_ques ( ). The USARTS, TIMERS and INTERRUPT chips are initialized, the servo data structures are initialized by ci_init ( ), and the DC_SERVO interrupt and MTCP Timer interrupt are enabled. All of the tasks are created by ci_ctask ( ). The STATE of the machine is then set to IPL_COMP ( IPL Complete ) or DOOR_AJAR ( if the Access Door is not closed ). Since the above described operations are performed in the ci_main ( ) task, the only dynamic task, it deletes itself at this point.

The MTCP allows each task to execute independently with each task having no direct control over any other. Communication type MTCP system calls allow a task to: (1) send messages to other tasks, and (2) receive messages from other tasks. As in the LMU functional software, the two basic means of communication provided by the MTCP are mailboxes and message queues.

In general, tasks remain suspended from execution until the task has a need to run. Tasks in the LSM functional software are designed to wait on the occurrence of a single event, multiple events from one source, or multiple messages from multiple queues. Detailed descriptions of those occurrences are described with reference to task communication with the LMU functional software.

There are two forms of interrupts in the LSM 108. The first form is hidden from the MTCP but linked to other functions through the MTCP. These types of interrupts are called system interrupts, the function of which is to figure out the interrupt, notify the appropriate task of any work required (using "post from interrupt handler" system call), manipulating necessary hardware controls, and exiting (using the "exit from interrupt handler" system call). The "exit from interrupt handler" system call causes rescheduling to occur if any higher priority task becomes ready to execute as a result of the interrupt processing.

The other type of interrupt is dedicated to the servo control of a mechanism or a group of mechanisms. These types of interrupts are called servo interrupts, the function of which is to control the position of the particular mechanism. It communicates to the LSM functional software and not at all to the control program. Hence, these interrupts are hidden from the MTCP and not linked to other functions through the MTCP. They communicate through a set of servo data structures without the aid of the MTCP.

Memory management and system errors within the LSM functional software are identical to those described herein above with reference to the LMU functional software.

Referring again to FIGS. 51 and 52 wherein the LSM functional architecture and functional software task processing are respectively shown, a description of those tasks will follow.

The LAN interface communications task, or ls_intrf( ), pends on: /bx_lmui/ with input from (ls_lout) and /bx_diag/. It is this function's job to be the interface between the LAN and two tasks: the Diagnostic Interface Task and the LMU Interface Communications Task. The data to be sent will be in (ls_lout) or /bx_diag/ depending on what the source is. The filling of bx)lmui/ signals this task that there is some information that it must send out to the LAN. It is responsible for putting the message on the LAN and handling all LAN error recovery. When information comes down the LAN to this LSM, an interrupt will wake up this task and it will get the message. ACL the sender and pass the information onto (ls_inq). It is this task's responsibility to release the memory blocks that are used as input buffers.

The diagnostic interface communications task, or sp_intf ( ), pends on (ls_dque). This task is the pathway between the diagnostic interface and LAN interface. Information comes from the LAN to the diagnostic interface via (ls_dque) where the address of the buffer containing the data is found. When information comes from the diagnostic interface, it is directed to the LAN using two mailboxes. The first mailbox /bx_diag/ is where the pointer to the data goes and the second mailbox has to be filled with any non zero data to signify that there is data in /bx diag/. It is this task's job to handle all the communications associated with the Diagnostic Port.

The LMU interface communications task, or li_etask ( ), pends on (ls_inq). Since this task is the main hub of the LSM functional software, commands come into from the LAN interface task. The LMU interface communications task checks certain parameters and responds to the LMU 106 E_CMND in the error field and if they are all available then they are reserved for this command. This is to prevent conflicts of resources between nonrelated commands. If a required resource is unavailable for any reasons then this function will return the correct end status back to the LAN Interface Task.

This task fills the appropriate mailbox or queue in order to start the job that was requested. This Task then waits on (ls inq) for job Completion Status or for another LMU command. When the Completion status comes in it is passed on to the LAN Interface Task and the resource is freed for use by another command.

The following types of commands are resource limited: (1) Passthru Port movement commands; (2) Tape Drive commands; and (3) Functional commands. The following types of commands are NOT resource limited: (1) Cartridge Access Port commands; and (2) Miscellaneous commands.

The LSM error and statistics, or er_task ( ), pends on (ie_respq). This task is responsible for keeping the local error log and statistic log. It transforms the data in the Response Buffer into data suitable for the LAN Interface Task. In addition, it will be monitoring the error rate of each mechanism and when necessary, it will make a mechanism inoperative. All communications that are directed to the LMU, pass through this task first. Only after this task has updated its logs will the information be passed to the LMU Interface Communications Task. If the response has caused a major state change, then an unsolicited message will be queued up for the LMU.

The two process pass through port tasks, Process PTP O Task and Process PIP 1 Task, are identical except for the ports they control. These tasks pend respectively on: /bx_ptOrq/ or /bx_ptlrq/, and are necessary to move a Passthru Port to the requested position and to respond to the LMU 106 with Ending Status.

The process CAP task, or ca_task ( ), pends on a cartridge access port request /bx_caprq/. This task is responsible for operating the cartridge access port, and generates an LMU message during cartridge access port door opening and closing events, such messages being sent via the (le_respq). The process CAP task is also the means by which the cartridge access port door gets locked and unlocked. The process CAP task is also responsible for satisfying the unlock CAP door and set CAP mode LMU commands.

The process operator panel task, or op_task ( ), pends on an up panel (op_indq), is responsible for controlling the operator panel, interpreting the message and modifying the operator panel displays accordingly. When any key on the operator panel is pressed, an interrupt will wake up the processor operator panel task and an LMU message will be sent up to the LAN via (le respq). This task is responsible for handling the access door open and closed messages, and for handling the power off request interrupt.

The process tape drive task, or td_rqst ( ), pends on a tape drive request (td-req), waiting for a command to be put into the (td_req). Any command is processed and the result of the command put in one of three places. If the command came from the process functional command task, the return information is placed into /bx_fresp/. If the command came from the process miscellaneous commands task, then the return information gets put into /bx_mresp/. On the other hand, if the command came from the LMU interface communications task, the information will be returned in (le_respq). Accordingly, the format of the command allows for determining where the command came from. The process tape drive task also is responsible for satisfying the rewind and unload tape drive and request time to unload LMU commands.

This task is responsible for satisfying the following LMU Commands: (1) Rewind and Unload Tape Drive; (2) Request Time to Unload; (3) Tape Drive reset; (4) Hold off load of Tape Drive; (5) Reset hold-off-load; (6) Blank out Tape Drive display; and (7) Tape Drive sense.

The process functional commands task, or fc_prorq ( ), pends on a functional command request (/bx_funrq/). Arm movement commands are referred to as functional commands and are controlled by such tasks. When the task wakes up, it finds an arm movement command pointed to by its mailbox and completes the movement. If the movement involves the tape drive, this function will send a command to the tape drive via (td_req). It then pends on /bx fresp/ for the information it wants and continues with its job. When the movement is completed, it sends ending status via (le respq). The process functional commands task also is responsible for satisfying the following LMU commands:
INITIALIZE LSM
MOVE ARM ONLY
MOVE, READ AND GET
MOVE AND PUT
MOVE AND READ VOLSER
GO HOME
VARY LSM ON LINE/OFF LINE
VARY LSM MAINTENANCE MODE ON/OFF
DIAGNOSTIC DOWN LOAD The process no activity time out task, or pn_noact ( ), pends on an arm in use /bx_armus/. When an arm movement is finished, the process functional commands task referred to above puts the current time in /bx-armus/ and signifies that it just finished a move. Thereafter, the process no activity time out task is awakened by that event and will put itself to sleep pending on the same mailbox but with a time out. The mailbox will be filled again whenever arm activity is initiated. If the task times out while the arm is idol, the arm has not been used during the time out. It will then send a message to the LMU 106 requesting that the arm be allowed to go home and unwind. The communications path to the LMU 106 is via (le_respq).

Figure 53A:
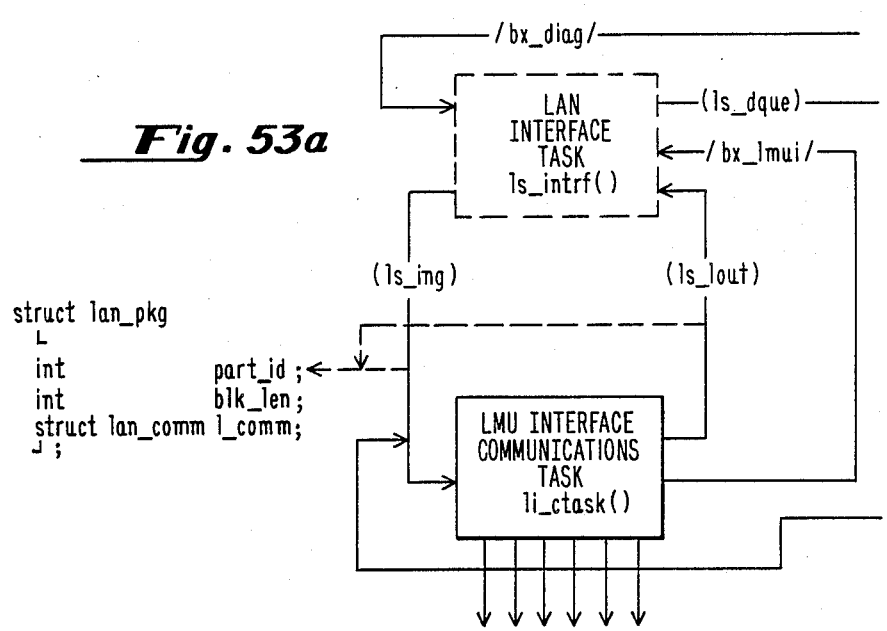
FIG. 53a–53c are block diagrams of LSM data flow.
Figure 53B:
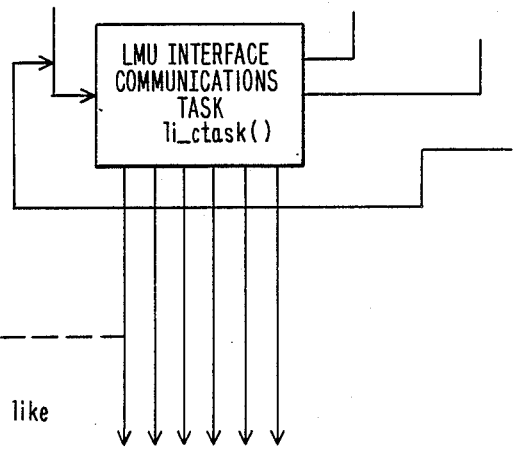
Figure 53C:
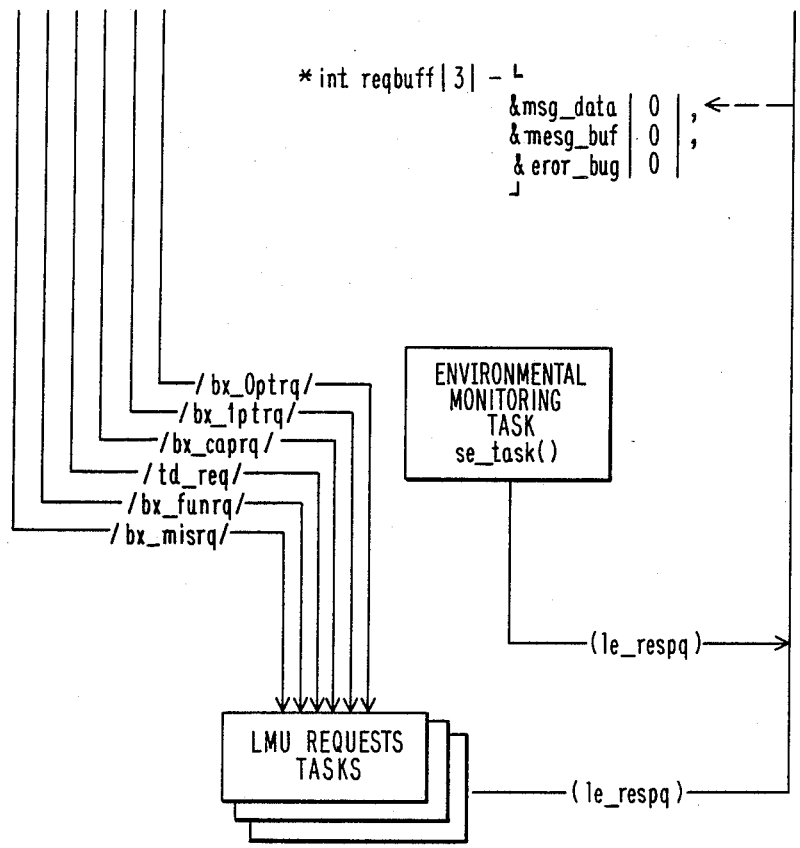

The process miscellaneous commands task, or mi_task ( ), pends on a miscellaneous commands request /bx_misrq/, and wakes up when a command is sent to its mailbox. The command is interpreted by the task and process, with ending status being returned via RESP. This task is responsible for satisfying the following LMU commands:
RECEIVE DOWN LOAD
REQUEST LSM CONFIGURATION
RESET DOOR OPEN INDICATOR
REQUEST LSM STATE Unlike the above described tasks, the environmental monitoring task does not pend on any mailbox or queue. It puts itself to sleep for a specific amount of time, and when it wakes up, it checks power supply voltages and various temperatures of the machine parts. If anything is out of specification, it will post an error code to the LSM error and statistics task, sending a message to the LMU. Software data flow for the LSM 108 is shown in FIGS. 53a, 53b, and 53c.

All error recovery from mechanical movements is contained in the LSM 108. If the LSM 108 tells the LMU 106 it could not fulfill a command, it can be assumed that it cannot be done. The LMU 106 should not resubmit the command since the LSM 108 did everything it could do to perform it the first time.

The LMU functional software must be cognizant of its performance when motion is in progress. In the event of a failure in a mechanism's movement, the software must automatically retry the motion. Each mechanism will have its own retry ability coded into the movement functions. If that fails, the higher level movement functions will envoke retries on multiple mechanisms in order to complete the job. If that in turn fails, then the job cannot be done and ending status will reflect the failure to complete the job.

While a particular embodiment of the invention has been shown and described, various modifications are within the true spirit and scope of the invention. The appended claims are, therefore, intended to cover such modifications.

What is claimed is:

1. In a data storage and retrieval subsystem of a data processing system, the subsystem including a library storage module for storing a plurality of magnetic tape cartridges in a pair of substantially cylindrical arrays disposed concentrically about a vertical axis, a robot for transferring the cartridges comprising:
   an arm mounted for rotation about the vertical axis;
   means, attached to the end of said arm, for raising and lowering the cartridges parallel to the vertical axis;
   a turntable mounted for rotation upon said raising and lowering means;
   a pair of hands mounted for extension and retraction in an opposed relationship upon said turntable, said hands being adapted for rotation about their axes of extension and restraction; means for rotating said turntable; and
   means for rotating said hands;
   wherein each of said arms, said means for raising and lowering the cartridges, said turntable, said hands, and said rotating means act independently one from the other thereby minimizing diagnostic control.

2. The robot according to claim 1, further comprising a plurality of tooling holes formed respectively in said arm, said means for raising and lowering the cartridges, said turntable, and said hands, each said tooling hole being adapted for insertion of a pin registering its respective component for individual alignment.

3. An object handling system for robotically storing and retrieving a plurality of objects therein comprising:
   first cylindrical array of object storage locations centered about a vertical axis;
   second cylindrical array of object storage locations concentrically arranged about said first cylindrical array;

one or more access means located in said second cylindrical array for transferring objects into/out of said object handling system;

robot means for transporting objects between said object storage locations and said one or more access means.

4. The system of claim 3, wherein each of said object storage locations in said first and said second cylindrical arrays include a front opening to accept objects to be stored therein, with said front opening of said object storage locations in said first cylindrical array outwardly directed in a radial direction and said front opening of said object storage locations in said second cylindrical array inwardly directed in a radial direction, said robot means is mounted for rotation about said vertical axis and includes:

means, positioned between said first and said second cylindrical arrays, for retrieving said objects stored in said first and second cylindrical arrays.

5. The system of claim 4 wherein said robot means further comprises:

a support column centered on said vertical axis;

arm means connected to said support column and rotatable around said vertical axis;

said retrieving means being connected to the distal end of said arm means.

6. The system of claim 5 wherein said retrieving means includes:

means for grasping one of said objects stored in one of said object storage locations.

7. The system of claim 6 wherein said retrieving means further includes:

means for extending said grasping means into and out of said object storage locations.

8. The system of claim 7 wherein said retrieving means further includes:

means for transporting said grasping and extending means along said vertical axis between said first and said second cylindrical arrays.

9. The system of claim 1 wherein said retrieving means further includes:

means for rotatably connecting said grasping and extending means to said transporting means to enable said grasping and extending means to access said object storage locations in both said first and said second cylindrical arrays.

10. An object handling system for robotically storing and retrieving a plurality of objects therein comprising:

a polygonal array of object storage locations, piecewise approximating a cylinder, centered about a vertical axis;

a second polygonal array of object storage locations, piecewise approximating a cylinder, concentrically arranged inside of said polygonal array wherein said front opening of said object storage locations in said second polygonal array are outwardly directed in a radial direction;

one or more access means located in said polygonal array for transferring objects into/out of said object handling system;

robot means for transporting objects between said object storage locations and said one or more access means.

11. The system of claim 10, wherein each of said object storage locations in said polygonal array include a front opening that is inwardly directed in a radial direction to accept objects to be stored therein, said robot means includes:

a support column centered on said vertical axis;

arm means connected to said support column and rotatable around said vertical axis;

means connected to the distal arm of said arm means for retrieving said objects stored in said polygonal array.

12. The system of claim 11 wherein said retrieving means includes:

means for grasping one of said objects stored in one of said object storage locations.

13. The system of claim 12 wherein said retrieving means further includes:

means for extending said grasping means into and out of said object storage locations.

14. The system of claim 13 wherein said retrieving means further includes:

means for transporting said grasping and extending means along said vertical axis juxtaposed to said front openings in said object storage locations in said polygonal array.

15. The system of claim 11 wherein said retrieving means are positioned between said polygonal array and said second polygonal array.

* * * * *